(12) United States Patent  
Weel et al.

(10) Patent No.: US 8,630,910 B2  
(45) Date of Patent: *Jan. 14, 2014

(54) MULTI-PARTY, MULTI-TIER SYSTEM FOR MANAGING PAPER PURCHASE AND DISTRIBUTION

(75) Inventors: Martin Weel, Coto de Caza, CA (US); Bao Tran, Irvine, CA (US); Mark Townsell, Modjeska Canyon, CA (US)

(73) Assignee: Verso Paper LLC, Memphis, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/600,382

(22) Filed: Aug. 31, 2012

(65) Prior Publication Data

US 2013/0073333 A1    Mar. 21, 2013

Related U.S. Application Data

(63) Continuation of application No. 11/652,037, filed on Jan. 11, 2007, now Pat. No. 8,260,672, which is a continuation of application No. 10/209,366, filed on Jul. 30, 2002, now abandoned.

(51) Int. Cl.
G06Q 20/00        (2012.01)

(52) U.S. Cl.
USPC .............................................. 705/23; 705/28

(58) Field of Classification Search
USPC .......................................................... 705/23
See application file for complete search history.

(56) References Cited

U.S. PATENT DOCUMENTS

| | | | |
|---|---|---|---|
| 5,590,417 A | 12/1996 | Rydbeck | |
| 6,049,453 A | 4/2000 | Hulsebosch | |
| 6,157,916 A | 12/2000 | Hoffman | |
| 6,249,774 B1 | 6/2001 | Roden et al. | |
| 6,341,271 B1 | 1/2002 | Salvo et al. | |
| 6,405,178 B1* | 6/2002 | Manchala et al. | 705/29 |
| 6,556,890 B2 | 4/2003 | Whaley | |
| 6,876,980 B2 | 4/2005 | Reid et al. | |
| 2002/0004732 A1 | 1/2002 | Quigg | |
| 2002/0156707 A1* | 10/2002 | Reid et al. | 705/28 |
| 2003/0078850 A1 | 4/2003 | Hartman et al. | |
| 2003/0126028 A1 | 7/2003 | Kaufman et al. | |

FOREIGN PATENT DOCUMENTS

| | | |
|---|---|---|
| WO | WO 97/28506 | 8/1997 |
| WO | WO 97/39491 | 10/1997 |
| WO | WO 01/29722 | 4/2001 |

* cited by examiner

*Primary Examiner* — Garcia Ade

(74) *Attorney, Agent, or Firm* — Bass, Berry & Sims PLC

(57) ABSTRACT

A system, including apparatuses and methods, for paper production and distribution in a communication network environment with multi-party and multi-level production and distribution relationships. The system receives, from one or more communicatively connected paper purchaser computers, parameters representative of the total surface area and physical characteristics of paper products required for printing tasks. The system determines an estimated quantity of the paper products to order based at least in part on the received parameters. Then, the system displays the estimated quantity of the paper to order and communicates orders to production facilities for obtaining such quantity.

20 Claims, 58 Drawing Sheets

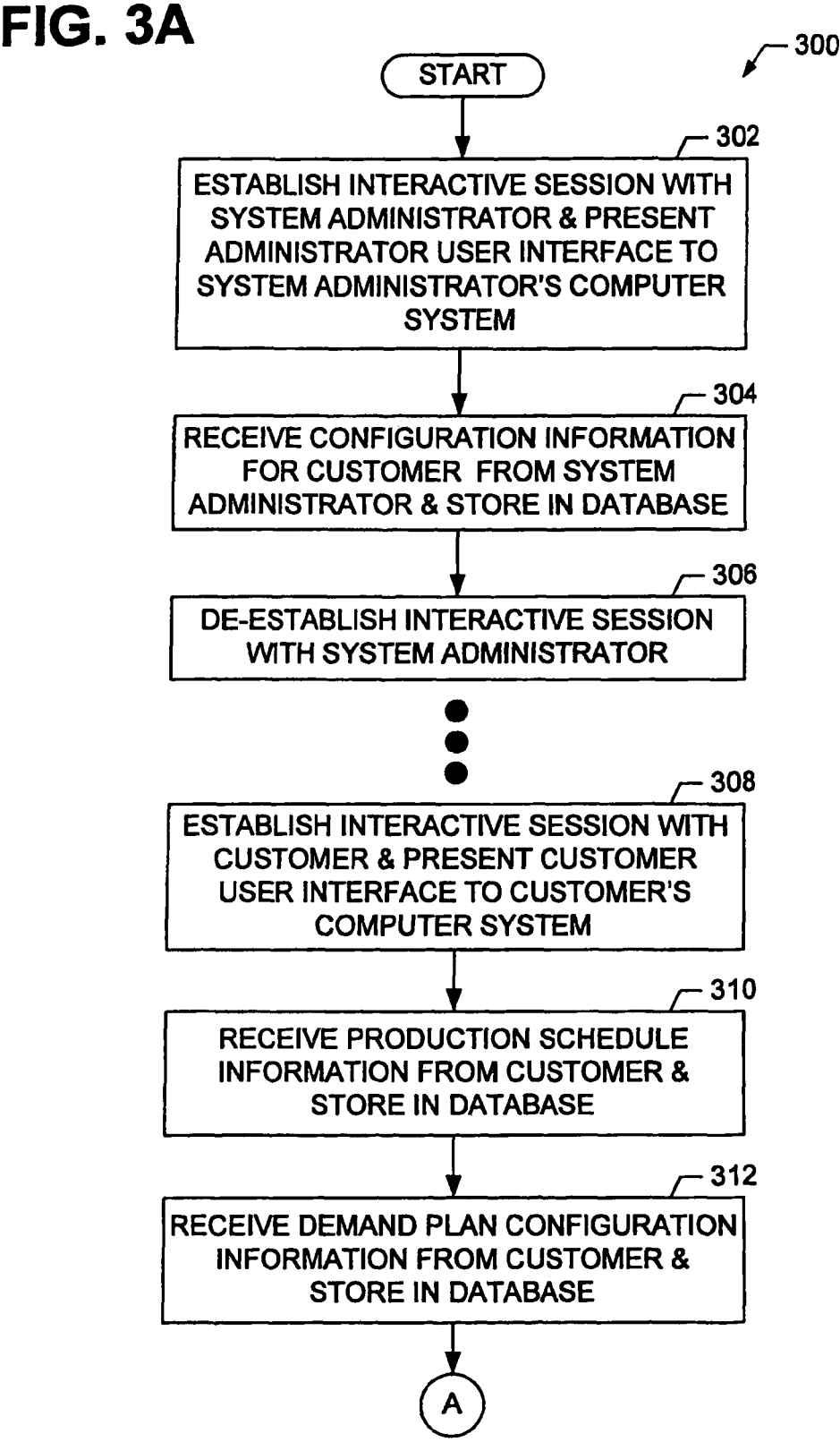

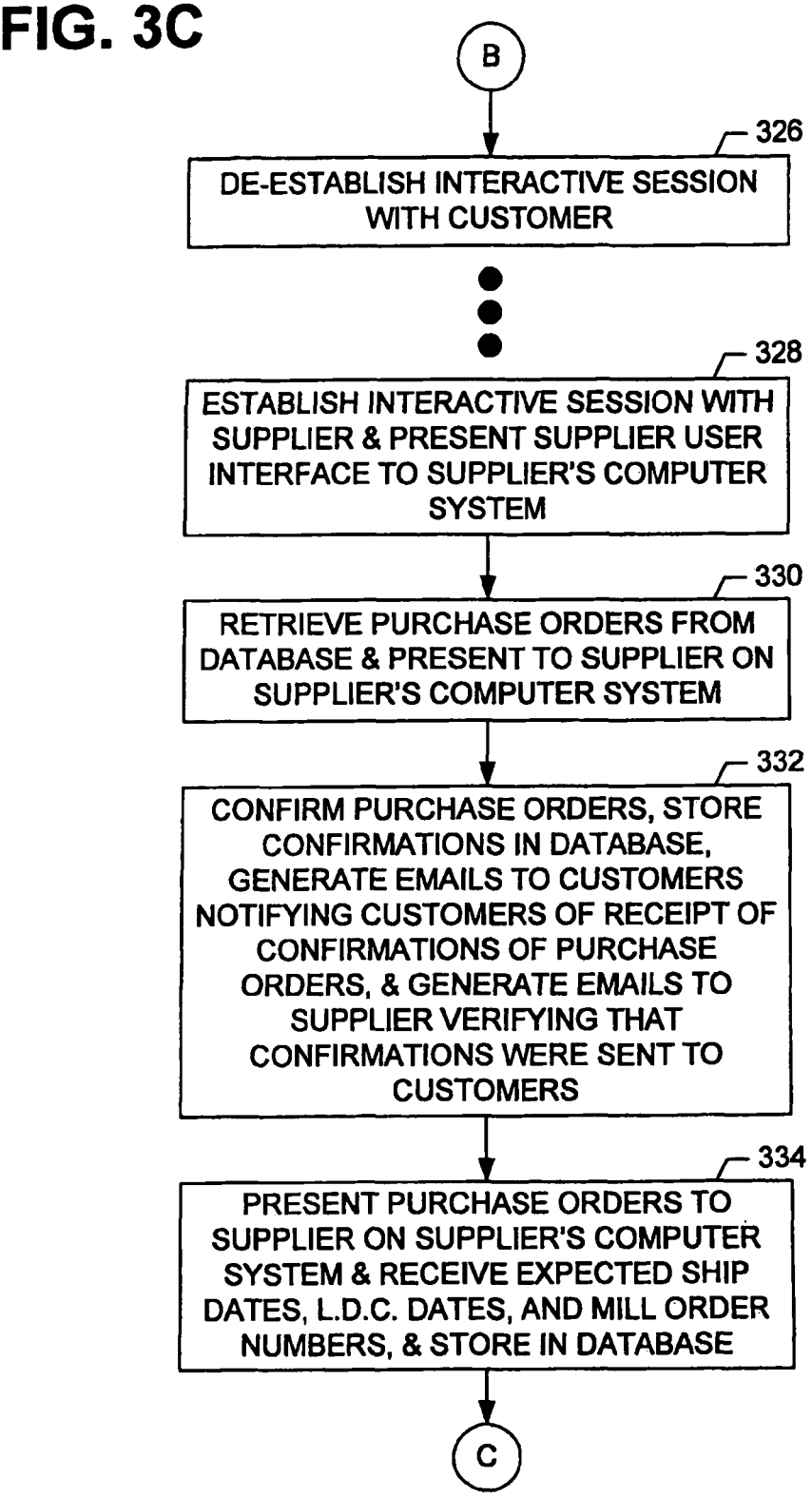

H Admin  Action  View  Production  Tools  Inventory  Reporting  Help       In-Season Publications | Beverly Nardone | 7/27/2002 | v2.3

XYZ, Inc.

| Order Status | Shipping | Alerts | News | Personalize | Order Status |
|---|---|---|---|---|---|
| ⊞ Orders to be placed in next 90 days. | | | | | |
| ⊞ Order Status | | | | | |

FIG. 4A

Peter Printer | 7/30/02 1:48:36 PM | v2.3

H action shipments events inventory help viewing events from 7/28/2002 – 8/3/2002 | Previous | Next

| date | customer | publication | issue | event | status |
|---|---|---|---|---|---|
| | | | | | shipments |
| | | | | | You currently have 2 in-transit shipments. |
| | | | | | consumption |
| | | | | | There are currently 189 items awaiting consumption |

FIG. 4C

H Admin Action View Production Tools Inventory Reporting Help In-Season Publications | Beverly Nardone |7/27/2002 4:02:10 PM | v2.3

| order Information | order no:217 | type: NEW | status: PRE SUBMITTED | | | order options |
|---|---|---|---|---|
| billing info | shipping info | approvals | | Add Paper |
| In-Season Publications<br>221 West 57th Street<br><br>New York, NY 10019 | Sea Breeze Printing - Nashville<br>51245 Ink Drive<br><br>Nashville, TN 37219 | Created: 7/27/2002 (Beverly Nardone)<br><br>Sent to Supplier:<br><br>Supplier Confirmed:<br><br>Completed: | | Add Notes<br><br>Change Order<br><br>Cancel Order<br><br>Change<br>Customer PO |
| trading partners | order numbers | order dates | | View Order<br>Trans. |
| Customer: In-Season Publications<br>Printer: Sea Breeze Printing - Nashville<br>Supplier: | Customer PO: 217<br>Distributor PO: 217<br>Terms: | Paper Due: 7/30/2002<br>Press Date: 8/31/2002 | | Print Order |
| paper details | | | | detail options |

Available Paper List

| supplier name | paper name | price/cwt | effective date |
|---|---|---|---|
| Blue River Paper Company | 34# Olympus Matte | $50.00 | 7/30/2002 |
| Blue River Paper Company | 70# Daylight | $39.00 | 8/1/2000 |
| Distributed Papers | 38# Super Gloss | $38.00 | 11/1/2000 |
| Green Tree Paper Company | 80# Green Gloss | $40.00 | 11/1/2000 |
| Sky Papers | 38# Pearlkote | $32.00 | 11/1/2000 |
| Sky Papers | 70# Vision Gloss | $45.00 | 11/1/2000 |

[ Cancel ]

H Admin  Action  View  Production  Tools  Inventory  Reporting  Help       In-Season Publications | Beverly Nardone | 7/27/2002 4:05:04 PM | v2.3 order Information | order no:217 | type: NEW | status: PRE SUBMITTED (LOCAL)

| billing info | shipping info | approvals | | order options |
|---|---|---|---|---|
| In-Season Publications<br>221 West 57th Street<br>New York, NY 10019 | Sea Breeze Printing – Nashville<br>51245 Ink Drive<br>Nashville, TN 37219 | Created: 7/27/2002(Beverly Nardone)<br>Sent to Supplier:<br>Supplier Confirmed:<br>Completed: | | Add Paper<br>Add Notes<br>Process Order<br>Change Order |

| trading partners | order numbers | order dates | | |
|---|---|---|---|---|
| Customer: In-Season Publications<br>Printer: Sea Breeze Printing – Nashville<br>Supplier: | Customer PO: 217<br>Distributor PO: 217<br>Terms: | Paper Due: 7/30/2002<br>Paper Date: 8/31/2002 | | Cancel Order<br>Change Customer PO<br>View Order Trans.<br>Print Order |

| paper details | | | | detail options |
|---|---|---|---|---|
| Item 1 | | | | Change |
| Qty Ordered (lbs): | 50,000 | Exp Ship Date: | Price/cwt: $50.00 | |
| Qty Shipped (lbs): | | L.D.C.: | Total Price: $25,000.00 | |
| Weight/Grade: | 34# Olympus Matte | Confirmed: | Cost/cwt: $50.00 | |
| Roll Size(in): | 33 | Completed: | Mill Order #: | |
| Stencil: | | Total Manifests: 0 | | Remove |
| Core End: | Plain | Diameter(in): 36 | Tolerance: Standard | |
| Core Material: | Paper | Special Requests: | | |
| Core Diameter Inside(in): | 3 | | | |

Result

Order Updated

FIG. 8

H Admin Action View Production Tools Inventory Reporting Help     In-Season Publications | Beverly Nardone |7/27/2002 4:55:16 PM | v2.3

Viewing Pre Submitted Orders

Go to page: 1

| supplier | printer | customer po | distributor po | ▼paper due | expected shipdate | idc | roll size | papergrade |
|---|---|---|---|---|---|---|---|---|
| Green Tree Paper Company | Quantum Press - Baltimore | fall main | | 10/27/2002 | | | 17 1/2 | 80# Green Gloss |
| | Sea Breeze Printing - Nashville | 214 | | 7/31/2002 | | | | |
| | Sea Breeze Printing - Nashville | 215 | | 7/31/2002 | | | | |
| | Sea Breeze Printing - Nashville | 216 | 216 | 7/31/2002 | | | | |
| | Sea Breeze Printing - Nashville | 211 | | 6/19/2002 | | | | |
| | Sea Breeze Printing - Nashville | 7112 | | 6/9/2002 | | | 17 1/2 | 70# Daylight |
| Sky Papers | Sea Breeze Printing - Nashville | 123 | | 2/25/2001 | 2/20/2001 | 2/12/2001 | 32 1/2 | 38# Pearlkote |

Go to page: 1

FIG. 10

H Admin Action View Production Tools Inventory Reporting Help   In-Season Publications | Beverly Nardone | 7/27/2002 4:57:52 PM | v2.3 order information | order no:213 | type: CHANGE | status: PRE SUBMITTED

| billing Info | shipping Info | approvals | | order options |
|---|---|---|---|---|
| In-Season Publications<br>221 West 57th Street<br>New York, NY 10019 | Quantum Press – Baltimore<br>1524 Eagle Rock<br>Baltimore, MD 21224-4774 | Created: 7/15/2002 (Beverly Nardone)<br>Sent to Supplier:<br>Supplier Confirmed:<br>Completed: | | Add Paper<br>Add Notes<br>Process Order<br>Change Order | trading partners | | order numbers | order dates | |

| Customer: In-Season Publications<br>Printer: Quantum Press - Baltimore<br>Supplier: Green Tree Paper Company | Customer PO: fall main<br>Distributor PO:<br>Terms: 2% 20 days | Paper Due: 10/27/2002<br>Press Date: | Cancel Order<br>Change Customer PO<br>View Order Trans.<br>Print Order | paper details | | | | detail options

Item 1 | | | | Change

| Qty Ordered (lbs): | 1,320,000 | Exp Ship Date: | Price/cwt: | $40.00 |
| Qty Shipped (lbs): | | L.D.C.: | Total Price: | $528,000.00 |
| Weight/Grade: | 80# Green Gloss | Confirmed: | Cost/cwt: | $40.00 |
| Roll Size(In): | 17 1/2 | Completed: | Mill Order #: | |
| Stencil: | | Total Manifests: 0 | | |
| Core End: | | Diameter(In): | Tolerance: | |
| Core Material: | | Special Requests: | | Remove |
| Core Diameter Inside(In): | | | | |

FIG. 11

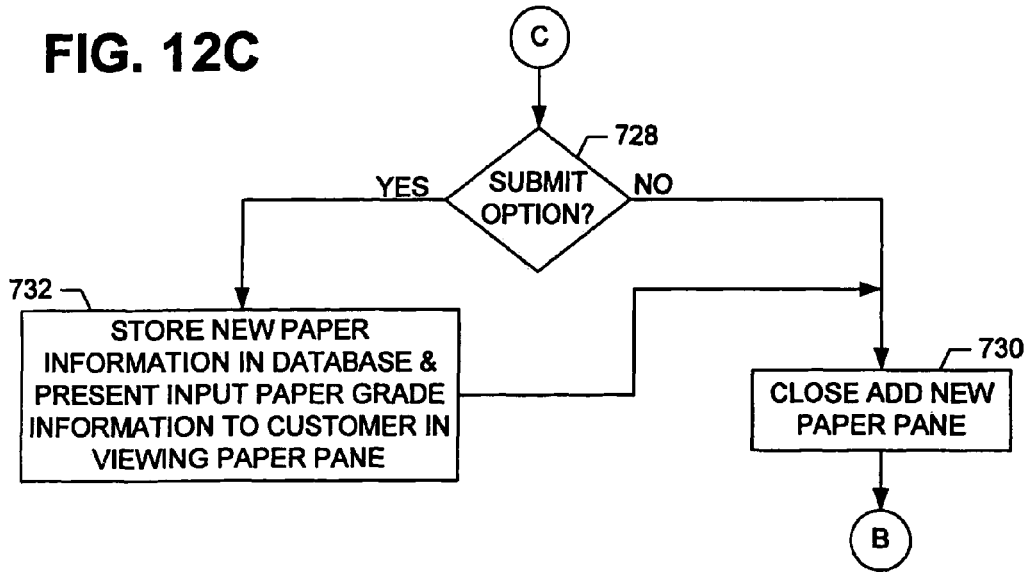
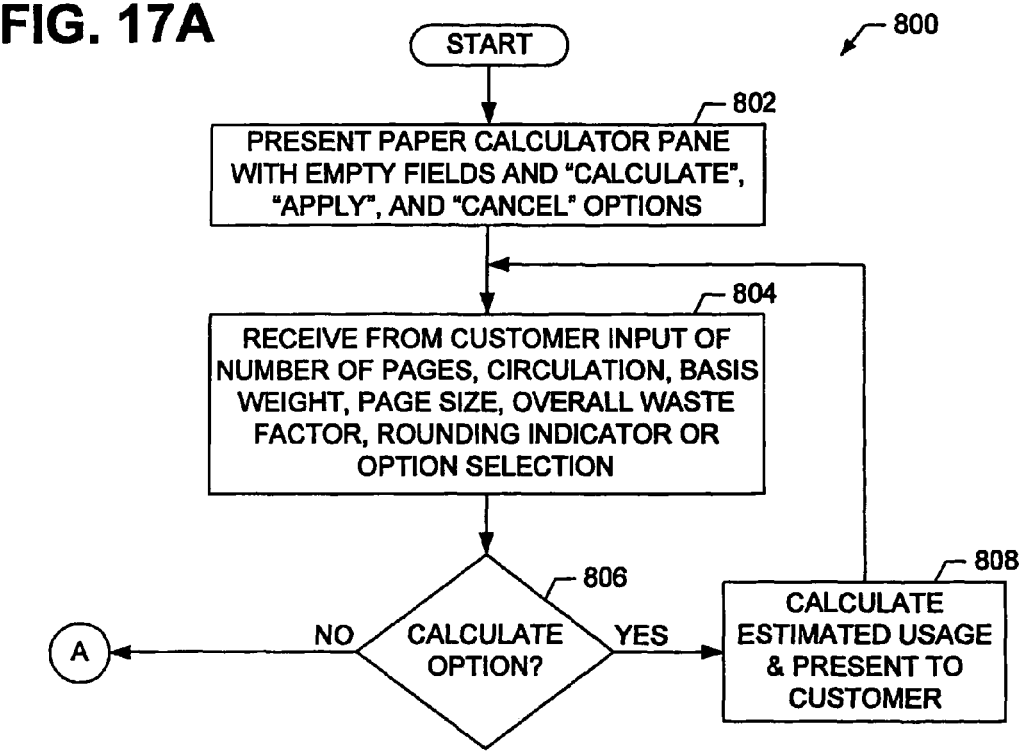

H Admin Action View Production Tools Inventory Reporting Help   In-Season Publications | Beverly Nardone | 7/27/2002 | v2.3

Production Scheduling

Publication: [          ]   Issue: [▪]   Printer: [          ]   [view]   [new issue]

Completed: ☐

FIG. 13

Production Scheduling

H Admin Action View Production Tools Inventory Reporting Help In-Season Publications | Beverly Nardone | 7/27/2002 | v2.3

Publication: [In-Season] Issue: [ ] Printer: [Sea Breeze Printing - Nashville ■] [view] [new issue]

Completed: ☐

Issue Detail – Sea Breeze Printing – Nashville [In-Season]

Issue:
Press Date:
Ad Prelim:
Ad Close:
Materials Due:
Print Order:
Paper Due:
Film Due:
On Sale Date:
notes:

[Submit] [Close]

FIG. 14

H  Admin  Action  View  Production  Tools  Inventory  Reporting  Help   In-Season Publications | Beverly Nardone | 7/27/2002 | v2.3

Production Scheduling

Publication: [In-Season ▼]   Issue: [5/1/2002 ▼]   Printer: [Sea Breeze Printing - Nashville ▼]   [view]  [new issue]

Completed: ☐

| publication | printer | issue | press date | ad prelim | ad close | materials due | print order | paper due | film due | on sale date | edit |
|---|---|---|---|---|---|---|---|---|---|---|---|
| In-Season | Sea Breeze Printing-Nashville | 5/1/2002 | 3/9/2002 | 2/2/2002 | 2/9/2002 | 2/15/2002 | 2/19/2002 | 3/1/2002 | 3/5/2002 | 3/12/2002 | [dates] [paper [0/2]] |

Viewing Paper for Issue 3/9/2002

| paper grade | component | roll size | est. usage | actual usage | active in planner | created by | completed |
|---|---|---|---|---|---|---|---|
| 70# Daylight | Cover | 17 1/2 | 75,000 | | yes | | no |
| 38# Super Gloss | Body | 33 | 750,000 | | yes | | no |

[Add Paper]   [Close]

FIG. 15

Production Scheduling

H  Admin  Action  View  Production  Tools  Inventory  Reporting  Help    In-Season Publications | Beverly Nardone | 7/27/2002 | v2.3

Publication: [In-Season]  Issue: [5/1/2002]  Printer: [Sea Breeze Printing - Nashville]  [view]  [new issue]

Completed: ☐

| publication | printer | issue | press date | ad prelim | ad close | materials due | print order | paper due | film due | on sale date | |
|---|---|---|---|---|---|---|---|---|---|---|---|
| In-Season | Sea Breeze Printing- Nashville | 5/1/2002 | 3/9/2002 | 2/2/2002 | 2/9/2002 | 2/15/2002 | 2/19/2002 | 3/1/2002 | 3/5/2002 | 3/12/2002 | edit | paper [0/2] [dates]

Viewing Paper for Issue 3/9/2002

| paper grade | component | roll size | est. usage | actual usage | active in planner | created by | completed |
|---|---|---|---|---|---|---|---|
| 70# Daylight | Cover | 17 1/2 | 75,000 | | yes | | no |
| 38# Super Gloss | Body | 33 | 750,000 | | yes | | no |

[Add Paper]  [Close]

Add New Paper

Paper: [          ]

Component Type: [   ]

Component Notes: [          ]

Roll Size: [   ]    [Paper Calculator]

Estimated Usage (lbs): [          ]

Active In Planner: ⦿ Yes ○ No

Actual Usage: [          ]

Actual Usage Date: [   ]

Consumption Completed: ○ Yes ○ No

[Submit]    [View in Demand Planner]    [Close]

FIG. 16

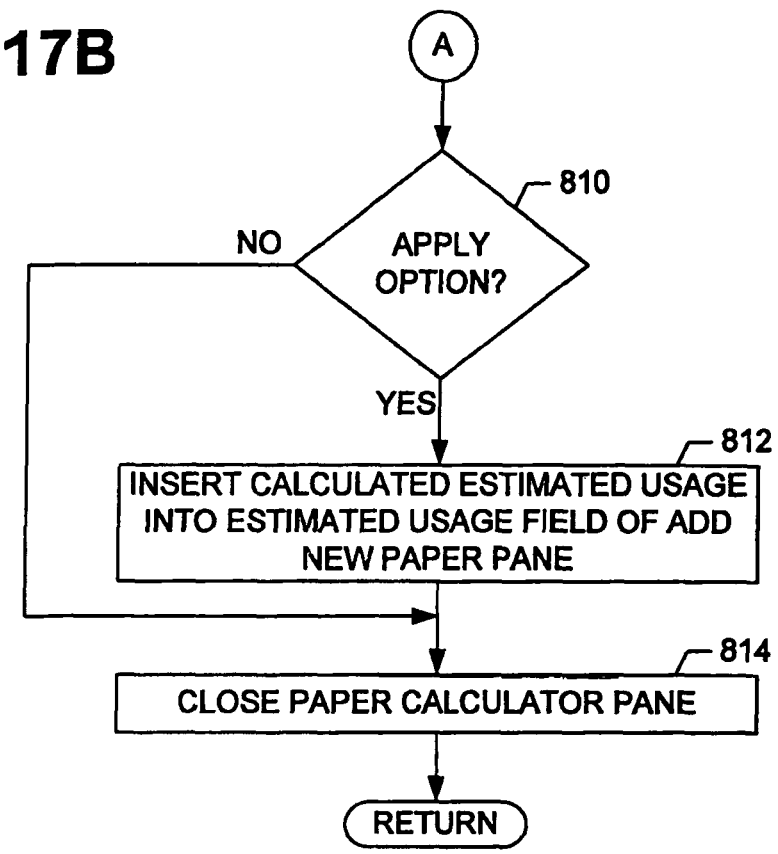

H  Admin  Action  View  Production  Tools  Inventory  Reporting  Help   In-Season Publications | Beverly Nardone | 7/27/2002 | v2.3

Production Scheduling

Publication: [In-Season]  Issue: [5/1/2002]  Printer: [Sea Breeze Printing - Nashville]  [view] [new issue]
Completed: ☐

| publication | printer | issue | press date | ad prelim | ad close | materials due | print order | paper due | film due | on sale date | edit |
|---|---|---|---|---|---|---|---|---|---|---|---|
| In-Season | Sea Breeze Printing- Nashville | 5/1/2002 | 3/9/2002 | 2/22/2002 | 2/9/2002 | 2/15/2002 | 2/19/2002 | 3/1/2002 | 3/5/2002 | 3/12/2002 | [dates] | paper [0/2]

Viewing Paper for Issue 3/9/2002

| paper grade | component | roll size | est. usage | actual usage | active in planner | created by | completed |
|---|---|---|---|---|---|---|---|
| 70# Daylight | Cover | 17 1/2 | 75,000 | | yes | | no |
| 38# Super Gloss | Body | 33 | 750,000 | | yes | | no |

[Add Paper]  [Close]

Add New Paper

| | | Paper Calculator | |
|---|---|---|---|
| Paper: | [___] | Number of Pages: | [___] |
| Component Type: | [___] | Circulation: | [___] |
| Component Notes: | [___] | Basis Size: | 25 x 38 |
| Roll Size: | [___] | Basis Weight: | [___] |
| Estimated Usage (lbs): | [___] | Page Size: | [___] x [___] |
| Active In Planner: | ⦿ Yes  ○ No | Overall Waste Factor: | [___] % |
| Actual Usage: | [___] | Round (to nearest 1000 lbs): | ☐ |
| Actual Usage Date: | [___] | [Calculate] [Apply] [Cancel] | |
| Consumption Completed: | ○ Yes  ○ No | | |

[Submit]  [View in Demand Planner]  [Close]

FIG. 18

H Admin Action View Production Tools Inventory Reporting Help In-Season Publications | Beverly Nardone | 7/27/2002 6:57:39 PM | V2.3

Demand Planner                               View: [Active Planners]

| ▲ printer | roll size | paper configuration | min level | target level | min. order qty | full increments | order lead time | last paper duedate |
|---|---|---|---|---|---|---|---|---|
| Sea Breeze Printing - Nashville | 33 | 38# Super Gloss | 5 | 100000 | 20000 | No | 60 | 12/2/2002 |
| Sea Breeze Printing - Nashville | 17 1/2 | 70# Daylight | 1 | 1.5 | 44000 | Yes | 60 | 12/2/2002 |
| Quantum Press - Baltimore | 32 1/2 | 38# Pearlkote | 1.25 | 1.75 | 132000 | Yes | 60 | 11/2/2002 |
| Quantum Press - Baltimore | 17 1/2 | 80# Green Gloss | 1 | 1.5 | 22000 | Yes | 65 | 11/2/2002 |

FIG. 20

H Admin Action View Production Tools Inventory Reporting Help In-Season Publications | Beverly Nardone | 7/27/2002 6:57:59 PM | V2.3

Demand Planner

View: [Active Planners]

| ▲ printer | roll size | paper configuration | min level | target level | min. order qty | full Increments | order lead time | last paper duedate |
|---|---|---|---|---|---|---|---|---|
| Sea Breeze Printing - Nashville | 33 | 38# Super Gloss | 5 | 100000 | 20000 | No | 60 | 12/2/2002 |
| Sea Breeze Printing - Nashville | 17 1/2 | 70# Daylight | 1 | 1.5 | 44000 | Yes | 60 | 12/2/2002 |
| Quantum Press - Baltimore | 32 1/2 | 38# Pearlkote | 1.25 | 1.75 | 132000 | Yes | 60 | 11/2/2002 |
| Quantum Press - Baltimore | 17 1/2 | 80# Green Gloss | 1 | 1.5 | 22000 | Yes | 65 | 11/2/2002 |

Edit Planner Information

Min. Level: [5]   Min. Order Qty.: [20000]   Increment in Full Loads?  ○ Yes  ● No Target Level: [100000]   Order Lead Time (days): [60]

Managed by "Issue on floor" method

[Submit]  [Delete]  [View Planner]

FIG. 21

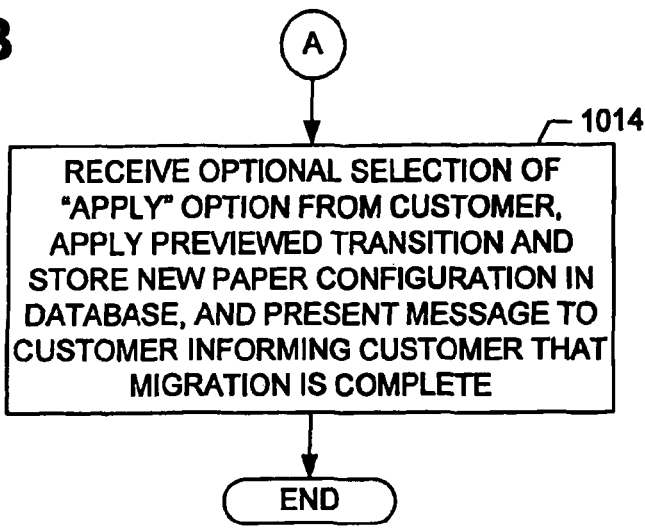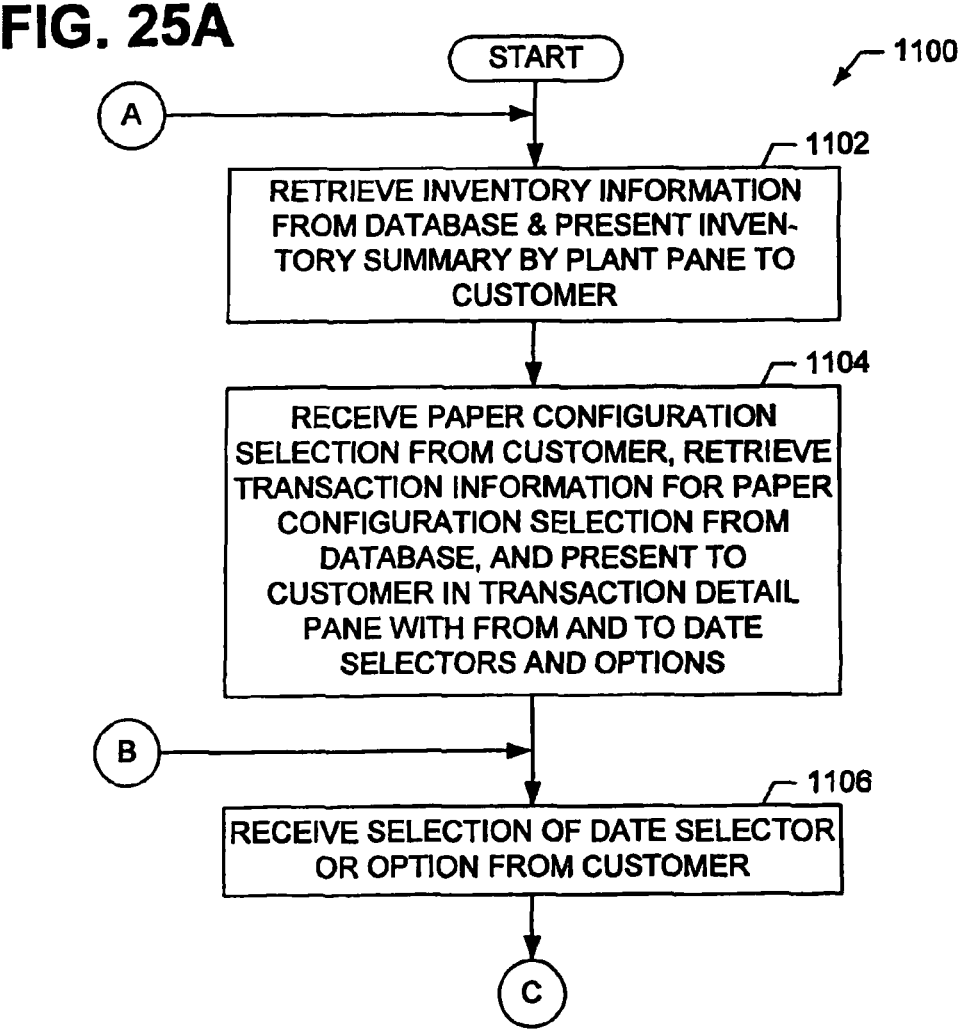

H Admin  Action  View  Production  Tools  Inventory  Reporting  Help    In-Season Publications | Beverly Nardone | 7/27/2002 8:24:26 PM | v2.3

Paper Migration

Please select the items that you would like to transition:

| Source Configuration | | Destination Configuration |
|---|---|---|
| Printer: | Sea Breeze Printing - Nashville → | Sea Breeze Printing - Nashville |
| Paper Grade: | 34# Olympus Matte → | 38# Pearlkote |
| Roll Size: | 33 → | 33 |
| Paper Due Date: | to | |
| Publication: | In-Season | |

[Preview Transition >>]

Preview

| press date | paper due | publication | printer | roll size | paper grade | estimated qty (lbs) |
|---|---|---|---|---|---|---|
| 3/9/2002 | 3/1/2002 | In Season | Sea Breeze Printing - Nashville | 33 | 34# Olympus Matte | 10000 |
| | | New Configuration: | Sea Breeze Printing - Nashville | 33 | 38# Pearlkote | 11176 |

[Apply]  [Round]

If you would like to transition the new items

FIG. 24

H Admin Action View Production Tools Inventory Reporting Help In-Season Publications | Beverly Nardone | 7/27/2002 8:32:07 PM | v2.3

Inventory Summary By Plant

Sea Breeze Printing - Nashville

| roll size | paper grade | current Inventory (lbs.) |
|---|---|---|
| 2 | 34# Olympus Matte | 1000 |
| 17 1/2 | 70# Daylight | 152190 |
| 33 | 38# Super Gloss | -2030879 |
| 32 1/2 | 38# Pearlkote | 2129536 |
| 33 1/2 | 38# Pearlkote | 45950 |

Quantum Press - Baltimore

| roll size | paper grade | current Inventory (lbs.) |
|---|---|---|
| 17 1/2 | 80# Green Gloss | -44117 |
| 32 1/2 | 38# Pearlkote | -1292110 |

Elwood Printing - Pittsburg

| roll size | paper grade | current Inventory (lbs.) |
|---|---|---|
| 33 | 34# Olympus Matte | -566647 |
| 16 1/2 | 80# Green Gloss | -172534 |
| 33 | 38# Pearlkote | -11000 |
| 17 1/2 | 70# Vision Gloss | 36422 |

Click on an item to view transaction history

FIG. 26

H Admin Action View Production Tools Inventory Reporting Help    In-Season Publications | Beverly Nardone  | 7/27/2002 8:33:28 PM | v2.3

Transaction Detail 7/27/2002

Printer: Sea Breeze Printing - Nashville
Paper: 70# Daylight
Rollsize: 17 1/2

Transaction History From: [7/27/2001]   To: [7/27/2002]   [View]   Go To Page: 1 2 3

Current Inventory: 152,190

| date | transaction type | quantity (lbs) | cost/cwt | notes |
|---|---|---|---|---|
| 7/24/2002 | Receipt | 132,520 | | |
| 4/1/2002 | Usage (Floral Weekly) | -181,930 | | |
| 12/13/2001 | Usage (In-Season) | -74,985 | | |
| 12/11/2001 | Receipt | 175,980 | | |
| 12/11/2001 | Receipt | 484,900 | | |
| 12/11/2001 | Receipt | 43,950 | | |
| 12/11/2001 | Receipt | 132,090 | | |
| 12/11/2001 | Receipt | 175,960 | | |
| 12/11/2001 | Receipt | 132,090 | | |
| 12/11/2001 | Receipt | 175,985 | | |

[New Adjustment Entry]   [Inventory Summary]

FIG. 27

H Admin Action View Production Tools Inventory Reporting Help In-Season Publications | Beverly Nardone | 7/27/2002 8:48:25 PM | v2.3

Adjustment Entry

Printer: Sea Breeze Printing - Nashville

Paper: 70# Daylight

Roll Size: 17  1/2

Date : 7/27/2002

Qty (+/-) (lbs.): -1000

Cost/cwt: 45

Account Code: 100039 - Scrap

Notes:

[ Submit ]   [ New Entry ]   [ Inventory Summary ]

| Order Status | Shipping | Alerts | News | Personalize |
|---|---|---|---|---|

H Admin Action View Production Tools Inventory Reporting Help In-Season Publications | Beverly Nardone | 7/27/2002 | v2.3

XYZ, Inc.

Alerts

Legend: 🚩 Urgent Alerts ▲ Warnings

| | date | category | summary |
|---|---|---|---|
| 🚩 ☐ | 10/22/2001 | L.D.C. | PO #132 has passed the LDC and has not been firmed up |
| 🚩 ☐ | 12/20/2001 | L.D.C. | PO #170 has passed the LDC and has not been firmed up |
| 🚩 ☐ | 3/6/2002 | L.D.C. | PO #122 Item #1 has passed the LDC and has not been firmed up |
| 🚩 ☐ | 10/22/2001 | L.D.C. | PO # iuio has passed the LDC and has not been firmed up |
| 🚩 ☐ | 10/22/2001 | L.D.C. | PO #8652 has passed the LDC and has not been firmed up |
| 🚩 ☐ | 10/22/2001 | L.D.C. | PO #45654 has passed the LDC and has not been firmed up |
| 🚩 ☐ | 10/22/2001 | L.D.C. | PO #245 has passed the LDC and has not been firmed up |
| 🚩 ☐ | 10/22/2001 | L.D.C. | PO #45645 has passed the LDC and has not been firmed up |
| 🚩 ☐ | 10/22/2001 | L.D.C. | PO #2164 has passed the LDC and has not been firmed up |
| 🚩 ☐ | 10/22/2001 | L.D.C. | PO #456456 has passed the LDC and has not been firmed up |
| 🚩 ☐ | 10/22/2001 | L.D.C. | PO #215648 has passed the LDC and has not been firmed up |
| 🚩 ☐ | 10/22/2001 | L.D.C. | PO #2165 has passed the LDC and has not been firmed up |
| 🚩 ☐ | 10/22/2001 | L.D.C. | PO #1269 has passed the LDC and has not been firmed up |
| 🚩 ☐ | 10/22/2001 | L.D.C. | PO #345p has passed the LDC and has not been firmed up |
| 🚩 ☐ | 10/22/2001 | L.D.C. | PO #3689 has passed the LDC and has not been firmed up |
| 🚩 ☐ | 10/22/2001 | L.D.C. | PO #45698 has passed the LDC and has not been firmed up |

FIG. 31

| Order Status | Shipping | Alerts | News | Personalize |
|---|---|---|---|---|

- Orders to be placed in the next 90 days

| Supplier | printer | passdue | today | next 1-5 days | next 5-15 days | next 15-30 days | next 31-60 days | next 61-90 days | after 90 days |
|---|---|---|---|---|---|---|---|---|---|
| Blue River Paper Company | Sea Breeze Printing – Nashville | 1 | 0 | 0 | 1 | 1 | 2 | 1 | 5 |
| Blue River Paper Company | Elwood Printing – Pittsburg | 0 | 0 | 1 | 0 | 0 | 1 | 2 | 4 |
| Sky Papers | Quantum Press – Baltimore | 0 | 0 | 0 | 1 | 1 | 1 | 1 | 4 |
| Sky Papers | Elwood Printing – Pittsburg | 0 | 0 | 1 | 0 | 0 | 0 | 1 | 4 |
| Middle Papers | Sea Breeze Printing – Nashville | 1 | 0 | 0 | 1 | 1 | 2 | 1 | 5 |

Click the order status you would like to view

- Order Status

FIG. 33

| | | | | | | | |
|---|---|---|---|---|---|---|---|
| Full load ordering | | | | | | | |
| From Supplier: | Distributed Papers | | | | | | |
| To Printing Plant: | Sea Breeze Printing - Nashville | | | | | | |
| orders from demand plan | | | | | | | |
| supplier | printer | roll size | papergrade | Actual (lbs) | Demand (lbs) | Qty to order | days left | Paper due date |
| Distributed Papers | Sea Breeze Printing - Nashville | 33 | 38# Super Gloss | 10,298,635 | 10,200,000 | 10,200.0 ☑ | -5 | 2/24/2002 |
| Distributed Papers | Sea Breeze Printing - Nashville | 33 | 38# Super Gloss | 3,348,635 | 1,320,000 | ☐ | 9 | 3/10/2002 |
| Distributed Papers | Sea Breeze Printing - Nashville | 33 | 38# Super Gloss | 3,378,635 | 1,330,000 | ☐ | 23 | 3/24/2002 |
| Distributed Papers | Sea Breeze Printing - Nashville | 33 | 38# Super Gloss | 1,558,635 | 1,440,000 | ☐ | 30 | 3/31/2002 |
| Distributed Papers | Sea Breeze Printing - Nashville | 33 | 38# Super Gloss | 1,368,635 | 1,320,000 | ☐ | 37 | 4/7/2002 |
| Distributed Papers | Sea Breeze Printing - Nashville | 33 | 38# Super Gloss | 1,398,635 | 1,560,000 | ☐ | 65 | 5/5/2002 |
| Distributed Papers | Sea Breeze Printing - Nashville | 33 | 38# Super Gloss | 1,578,635 | 1,200,000 | ☐ | 72 | 5/12/2002 |
| Distributed Papers | Sea Breeze Printing - Nashville | 33 | 38# Super Gloss | 1,368,635 | 2,160,000 | ☐ | 79 | 3/18/2002 |
| Distributed Papers | Sea Breeze Printing - Nashville | 33 | 38# Super Gloss | 2,168,635 | 1,200,000 | ☐ | 93 | 6/2/2002 |
| Distributed Papers | Sea Breeze Printing - Nashville | 33 | 38# Super Gloss | 1,258,635 | 1,200,000 | ☑ | 100 | 6/9/2002 |
| | | | Total Qty (lbs) | 23,626,350 | 23,040,00 | 10,200,000 | | | place order

FIG. 34

Edit Purchase Order Number

Purchase Order #: _____

Terms: _____

[submit] [cancel]

FIG. 35

| order information \| order no:217 \| type: NEW \| status: PRE SUBMITTED ||||
|---|---|---|---|
| billing info | shipping info | approvals | order options |
| In-Season Publications<br>221 West 57th Street<br><br>New York, NY 10019 | Sea Breeze Printing - Nashville<br>51245 Ink Drive<br><br>Nashville, TN 37219 | Created: 7/2/2001 (Serena Flowers)<br><br>Sent to Supplier:<br><br>Supplier Confirmed:<br><br>Completed: | Add Paper<br>Add Notes<br>Change Order<br>Cancel Order<br>Change Customer PO<br>View Order Trans.<br>Print Order |
| trading partners | order numbers | order dates | |
| Customer: In-Season Publications<br>Printer: Sea Breeze Printing - Nashville<br>Supplier: | Customer PO: 999 | L.D.C:<br>Order Firmed:<br>Paper Due: 7/8/2001<br>Press Date: | |
| paper details ||| detail options |
| Qty ordered (lbs): 24,360,000<br>Qty shipped (lbs):<br>Weight/Grade: 38# Super Gloss<br>Roll Size: 33<br>Stencil: | Exp Ship Date:<br><br>Price/cwt: $38.00<br>Total Price: $9,256,800.00<br>Terms: 2.5% 5 | | Change<br><br>Remove |
| Qty ordered (lbs): 3,360,000<br>Qty shipped (lbs):<br>Weight/Grade: 38# Super Gloss<br>Roll Size: 33<br>Stencil: | Exp Ship Date:<br><br>Price/cwt: $38.00<br>Total Price: $1,276,800.00<br>Terms: 2.5% 5 | | Change<br><br>Remove |

FIG. 36

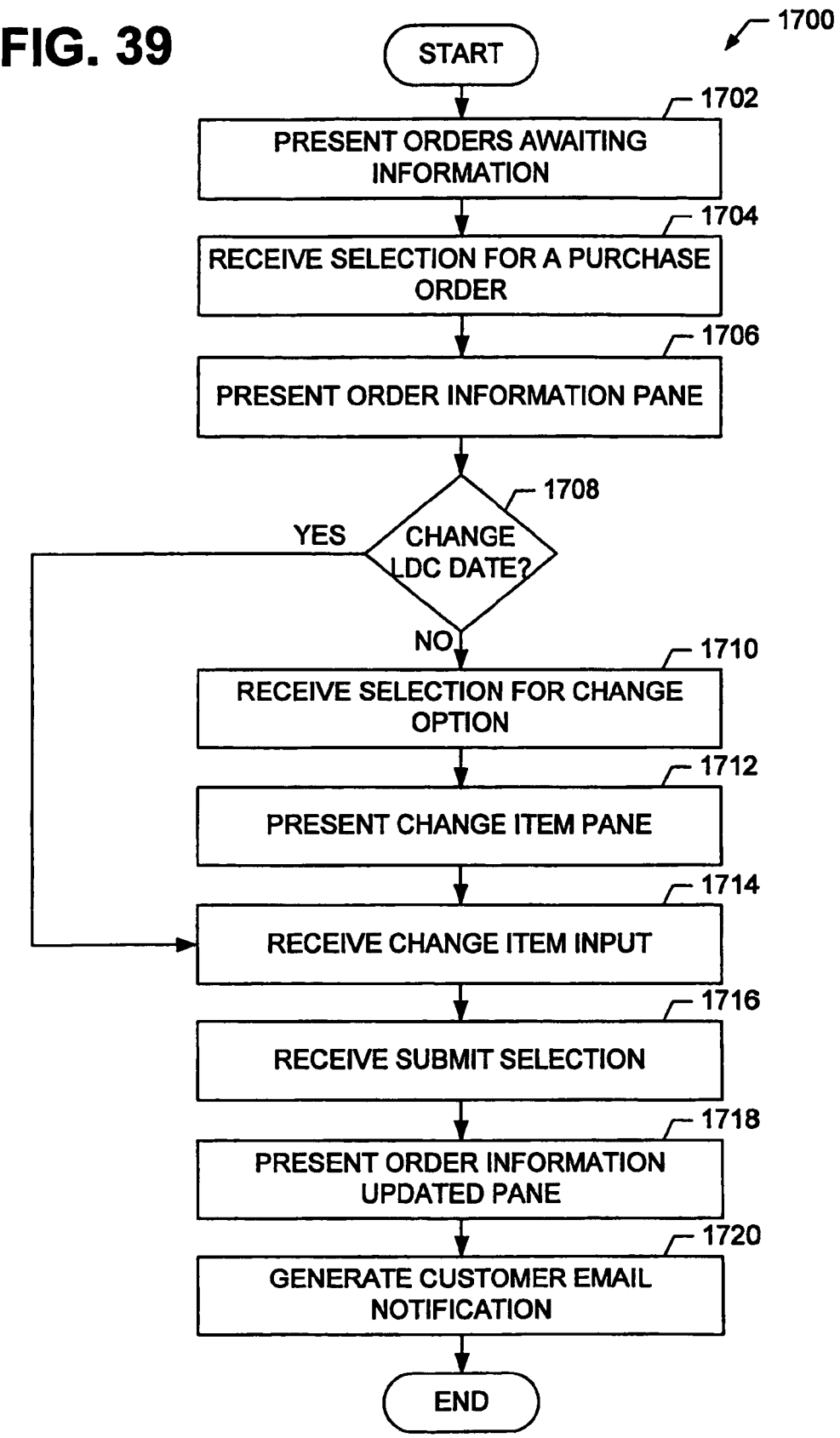

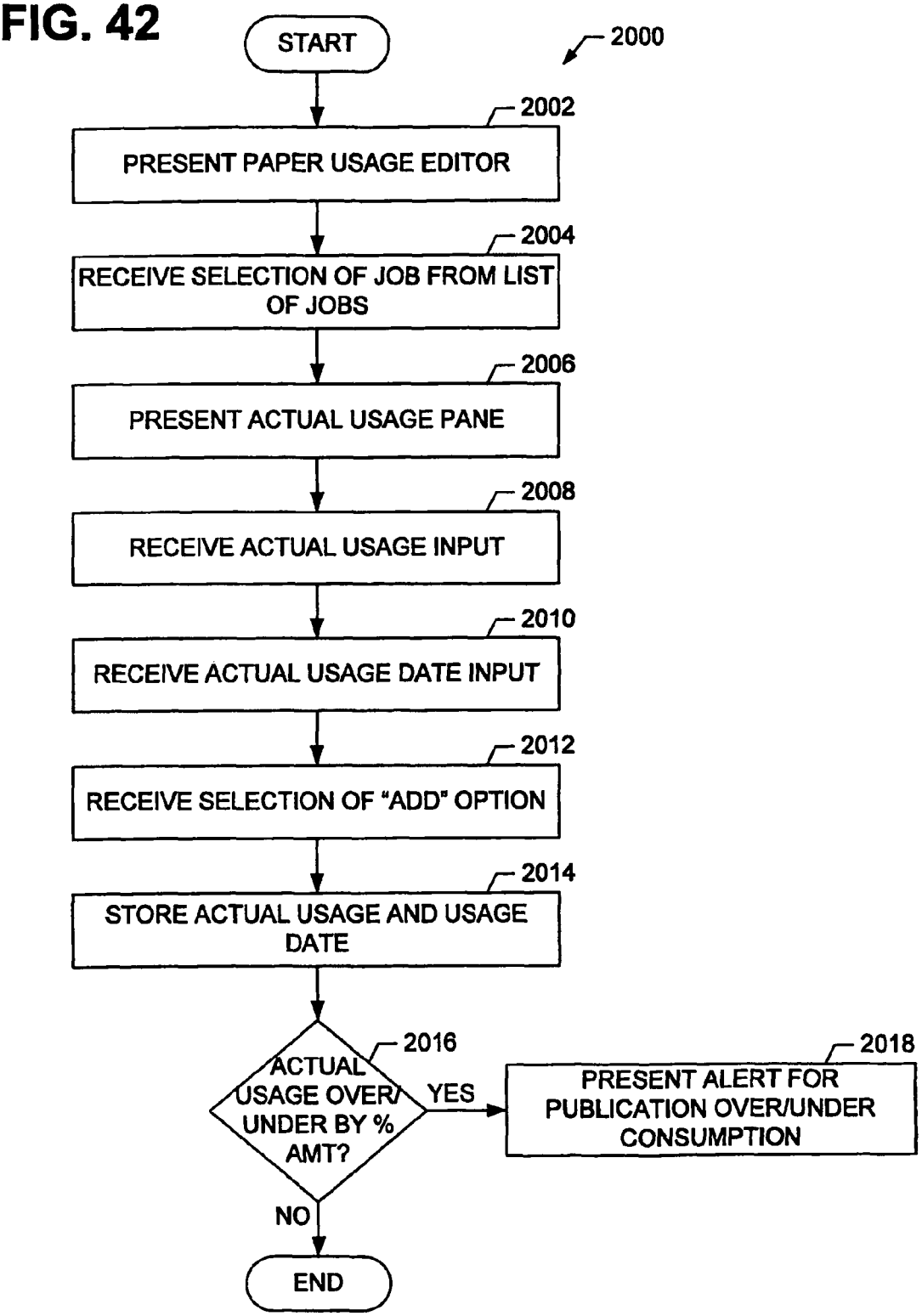

MULTI-PARTY, MULTI-TIER SYSTEM FOR MANAGING PAPER PURCHASE AND DISTRIBUTION

PRIORITY INFORMATION

This U.S. Continuation Application claims priority under 35 U.S.C. §120 to U.S. patent application Ser. No. 11/652,037, filed Jan. 11, 2007, now U.S. Pat. No. 8,260,672, which is a continuation application of U.S. patent application Ser. No. 10/209,366 filed Jul. 30, 2002 now abandoned, the entire contents of which are hereby incorporated by reference.

BACKGROUND OF THE INVENTION

1. Field of the Invention

The present invention relates, generally, to the field of paper purchasing and distribution and, more specifically, to a multi-party, multi-tier system for managing paper purchase and distribution.

2. Description of the Related Art

For many years, publishers, paper suppliers, and printers have worked together to meet production schedules for paper publications which require paper to be delivered to printers in sufficient quantities and at appropriate times. Unfortunately, for a variety of reasons, the paper procurement and distribution channels do not always operate efficiently, leaving printers ready to go to press with inadequate paper inventories on hand. Often, the problems may be traced to publishers ordering too little paper or placing orders for paper too late for a paper supplier to make delivery to printers by press time. At other times, the problems may result from suppliers shipping paper to the wrong printer or shipping the wrong paper to the correct printer. On still other occasions, the problems may be traced to printers failing to properly manage on-hand paper inventories. However, more often than not, the problems may be attributed to failures in the communication between publishers, suppliers, and printers.

Therefore, there is a need in the industry for a system which improves the paper procurement and distribution process and which resolves these and other related problems and deficiencies.

SUMMARY OF THE INVENTION

Briefly described, the present invention comprises a system, including apparatuses and methods, for more efficient paper product production and distribution in a communication network environment with multiparty and multilevel production and distribution relationships. By better managing paper production and distribution as opposed to inaccurate methods generally prone to errors, the present invention is more efficiently used to provide for paper inventory management.

More particularly, in a first form, the method of the present invention comprises a computer-implemented method of managing multiparty, multilevel production and distribution relationships for a quantity of paper products. The method further comprises receiving, at a server computer from one or more communicatively connected paper purchaser computers, at least one parameter representative of the tool surface area of paper products required for one or more printing tasks. The method further comprises receiving at least one parameter representative of a physical characteristic of the paper products. The method further comprises determining an estimated quantity of the paper products to order from one or more manufacturers thereof, based at least in part on the received parameters. The method further comprises communicating the estimated quantity of the paper products to order to one or more appropriate paper purchaser computers. The method further comprises displaying at the paper purchaser computers the estimated quantity of the paper to order and communicating orders to one or more production facilities for obtaining such quantity.

In architecture, the present invention overcomes the above-described problems by providing a system for managing multiparty, multilevel production and distribution of paper inventory. The system includes a host server operable for data communication via a communication network. The host server being configured to receive from the communication network input data related to a printing task and to a paper product for use in completing the task. The host server is further configured to determine, based at least in part upon the input data, an estimate of the quantity of the paper product to order for completing the task and to transmit the estimate to the communication network.

In another form, the method of the present invention comprises a computer-implemented method of managing production, distribution and inventory control of printed paper products that includes receiving, from a communication network, production schedule information for each publication issue of a plurality of publication issues. The production schedule information for each publication issue includes an identification of the printer thereof. The method further comprises receiving at least one paper configuration for each publication issue of the plurality of publication issues and selecting a method of paper inventory management. The method further comprises automatically recommending order quantities for each paper configuration at each printer based at least in part on the selected method of paper inventory management.

The present invention further provides a system for managing multiparty, multilevel production, distribution, and control of printed paper products that comprises a host server operable to receive, from a communication network, production schedule information for each issue of a plurality of publication issues. The production schedule information for each issue includes an identification of the printer thereof. The host server is configured to receive from the communication network at least one paper configuration for each issue of the plurality of issues. The host server is then further configured to select a method of paper inventory management and to automatically recommend order quantities for each paper configuration at each printer, based at least in part on the selected method of paper inventory management.

Other advantages of the present invention will become apparent upon reading and understanding the present specification when taken in conjunction with the appended drawings.

BRIEF DESCRIPTION OF THE DRAWINGS

FIGS. 3A, 3B, 3C, and 3D display a flowchart representation of an overall system method of the system of FIG. 1.

FIG. 4A displays a pictorial representation of a home web page of a customer manager application of the system of FIG. 1.

FIG. 4C displays a pictorial representation of a home web page of a printer manager application of the system of FIG. 1.

FIG. 6 displays a pictorial representation of an order editor web page of the system of FIG. 1 showing an available papers list.

FIG. 7 displays a pictorial representation of an order editor web page of the system of FIG. 1 showing an empty item detail form.

FIG. 8 displays a pictorial representation of an order editor web page of the system of FIG. 1 showing paper details for a first paper configuration.

FIG. 10 displays a pictorial representation of an order viewer web page of the system of FIG. 1 showing pre-submitted orders.

FIG. 11 displays a pictorial representation of an order details pane of an order viewer web page of the system of FIG. 1 showing paper details for a pre-submitted order.

FIGS. 12A, 12B, and 12C display a flowchart representation of a production scheduler method of the system of FIG. 1.

FIG. 13 displays a pictorial representation of a production scheduler web page of the system of FIG. 1 having list boxes for the receipt of publication; issue, and printer selections.

FIG. 14 displays a pictorial representation of a production scheduler web page of the system of FIG. 1 having an empty issue detail pane.

FIG. 15 displays a pictorial representation of a production scheduler web page of the system of FIG. 1 having a viewing paper pane showing paper configurations.

FIG. 16 displays a pictorial representation of a production scheduler web page of the system of FIG. 1 having an empty add new paper pane.

FIGS. 17A and 17B display a flowchart representation of a paper calculator method according to the system of FIG. 1.

FIG. 18 displays a pictorial representation of a production scheduler web page of the system of FIG. 1 having paper calculator pane.

FIG. 20 displays a pictorial representation of a demand planner pane of the system of FIG. 1 showing active planners.

FIG. 21 displays a pictorial representation of an edit planner pane of the system of FIG. 1 showing a demand plan configuration.

FIGS. 22A and 22B display a flowchart representation of a paper migratory method system of FIG. 1.

FIG. 24 displays a pictorial representation of a paper migration pane of the system of FIG. 1 showing preview information.

FIGS. 25A, 25B and 25C display a flowchart representation of an inventory viewer method 1100 of the system of FIG. 1.

FIG. 26 displays a pictorial representation of an inventory summary by plant pane of the system of FIG. 1 showing paper inventories for different printers.

FIG. 27 displays a pictorial representation of an inventory transaction details pane of the system of FIG. 1 showing inventory transactions for a printer.

FIG. 28 displays a pictorial representation of an inventory adjustment pane of the system of FIG. 1 showing an adjustment to paper inventory.

FIG. 29B displays a pictorial representation of an alert configuration pane of the system of FIG. 1.

FIG. 31 displays a pictorial representation of an alert viewer pane of the system of FIG. 1 showing alerts.

FIG. 33 displays a pictorial representation of a recommended orders summary panel of the system of FIG. 1 showing a summary of recommended purchase orders.

FIG. 34 displays a pictorial representation of an order details pane of the system of FIG. 1 showing recommended purchase order details for a supplier.

FIG. 35 displays a pictorial representation of an edit purchase order number pane of the system of FIG. 1.

FIG. 36 displays a pictorial representation of an order detail pane of the system of FIG. 1 showing purchase order details.

FIG. 39 displays a flowchart representation of an awaited information editor method of the system of FIG. 1.

FIG. 42 displays a flowchart representation of a paper usage editor method of the system of FIG. 1.

DETAILED DESCRIPTION OF THE PREFERRED EMBODIMENT

Figure 1:
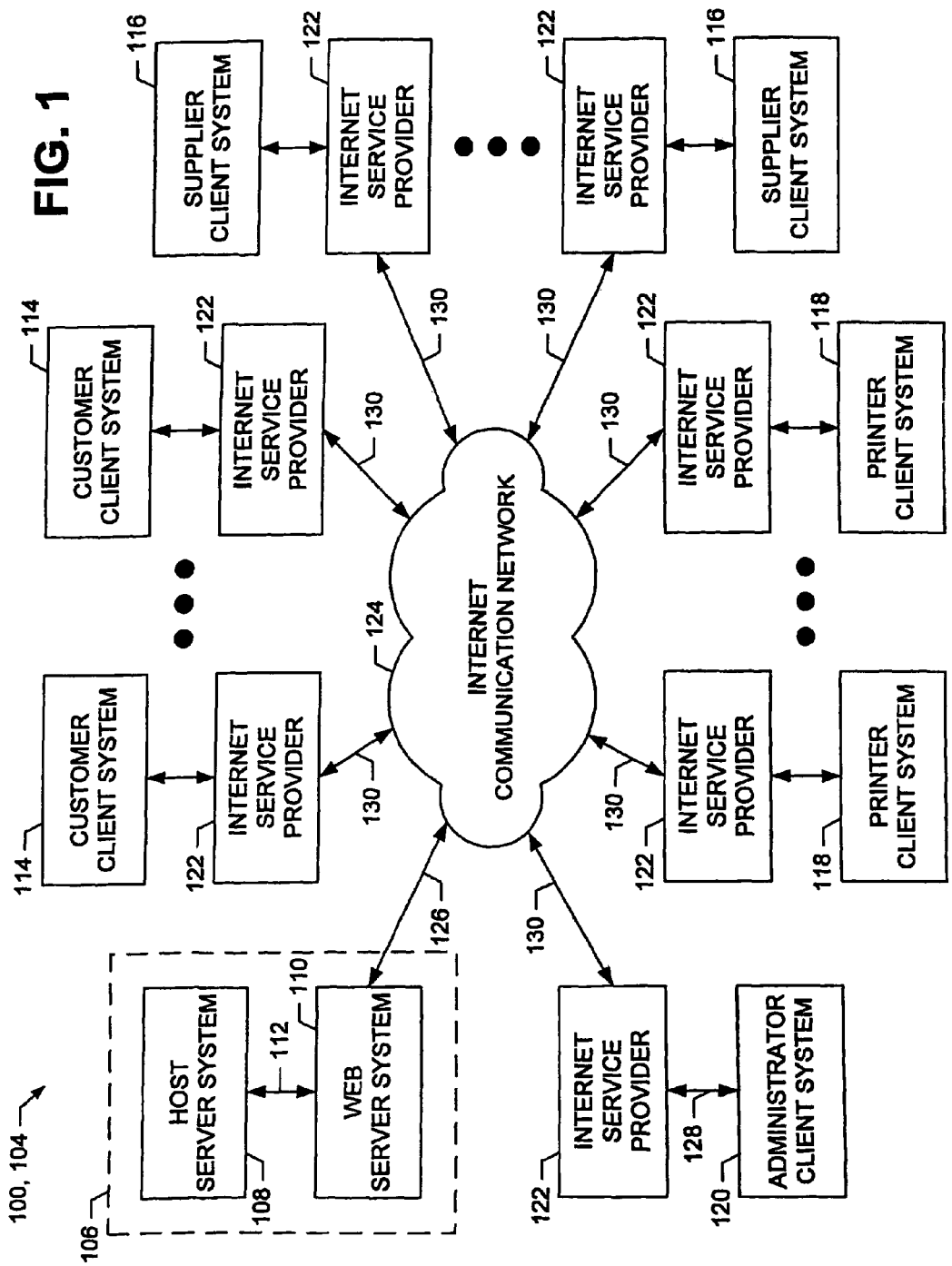
FIG. 1 displays a block diagram representation of a multi-party, multi-tier system for managing paper purchase and distribution system according to the preferred embodiment of the present invention.

Referring now to the drawings in which like numerals represent similar elements or steps throughout the views, the multi-party, multi-tier system for managing paper purchase and distribution system 100 (also sometimes referred to herein as the "paper purchase and distribution system 100") of the preferred embodiment of the present invention enables trading partners (including, but not limited to, customers, suppliers, and printers) to conduct commerce related to the purchase, supply, and printing of paper publications through electronic data exchange. The paper purchase and distribution system 100 comprises, according to the preferred embodiment, an application service provider system having a computer hardware and data communication environment 102 and a computer software environment 104. FIG. 1 displays a block diagram representation of the computer hardware and data communication environment 102 which comprises a host server system 106 including an applications server computer system 108 (also sometimes referred to herein as "applications server 108") and a web server computer system 110 which are communicatively connected, via data communication link 112, for bi-directional data communication therebetween. The computer hardware and data communication environment 102 further comprises a plurality of paper customer client systems 114 (also sometimes referred to herein as "customer systems 114"), a plurality of paper supplier client systems 116 (also sometimes referred to herein as "supplier systems 116"), a plurality of paper printer client systems 118 (also sometimes referred to herein as "printer systems 118"), an administrator client system 120, a plurality of Internet service providers 122, and the Internet communication network 124.

The applications server computer system 108 hosts a plurality of software applications and modules thereof having a plurality of software instructions which, when executed by the applications server computer system 108, cause the applications server computer system 108 to provide customers, suppliers, and printers with the various capabilities and functionality as described herein. The web server computer system 110 is connected to the Internet communication network 124 through data communication link 126 and provides bi-directional data communication exchange capabilities between the applications server computer system 108 and the customer systems 114, supplier systems 116, and printer systems 118 known as "web hosting." The web server computer system 110 also provides electronic mail ("email") services for the applications server computer system 108.

Preferably, the applications server computer system 108 and the web server computer system 110 include server computer systems appropriately configured from a hardware and software (including, without limitation, database management, data communications, web hosting, and email hosting software) perspective to provide the capabilities and functionality described herein. Exemplary server computer systems may include: one or more processing units for executing software program instructions; various forms of memory (including, for example and not limitation, random access memory, read-only memory, and flash memory) for storing data and software program instructions; various forms of non-volatile program and data storage devices (including, but not limited to, magnetic disk drives, optical disk drives, magneto-optical drives, CD ROM drives, and DVD drives) for storing databases and database management software, web hosting software, email hosting software, data communication software, operating system software, software application programs and modules, configuration data, and other forms of data; various high and low speed data communication interfaces (including, for example and not limitation, local area network interfaces, wide area network interfaces, serial interfaces, and parallel interfaces); at least one display interface and video monitor; user input devices such as a keyboard and/or mouse; and, one or more buses to enable appropriate data communication between the foregoing components. The general operation of applications server computer systems and web server computer systems in an application service provider ("ASP") model for providing data processing and communication services is well known in the art and, therefore, it is not necessary to include herein a detailed discussion of their operation according to an ASP model. Also preferably, a data communication link 126 acceptable according to the preferred embodiment includes, but is not limited to, T1 links, satellite links, and other present and future forms of, generally, high-speed, multi-channel, dedicated, cabled and non-cabled bi-directional data communication links.

The customer, supplier, printer, and administrator systems 114, 116, 118, 120 are possessed and operated, respectively, by customers, suppliers, printers, and system administrators and connect to the Internet communication network 124 through Internet service providers 122 and bi-directional data communication links 128, 130. Preferably, data communication links 128 include, but are not limited to, public switched telephone links, DSL links, broadband cable links, cellular links, satellite links, and other forms of bi-directional cabled and non-cabled, dedicated and non-dedicated data communication links available now or in the future. Also preferably, data communication links 130 include, without limitation, T1 links, satellite links, and other present and future forms of, generally, high-speed, multi-channel, dedicated, cabled and non-cabled bi-directional data communication links. The respective Internet service providers 122 provide data communication interfaces between the various customer, supplier, printer, and administrator systems 114, 116, 118, 120 and the Internet communication network 124, and also provide email services for the customer, supplier, printer, and administrator systems 114, 116, 118, 120. When connected, as desired, to the host server system 106 via data communication links 126, 128, 130, Internet service providers 122, and the Internet communication network 124, the customer, supplier, printer, and administrator systems 114, 116, 118, 120 are operable to bi-directionally exchange data and emails, as clients, with the applications and web server computer systems 108, 110.

The customer, supplier, printer, and administrator systems 114, 116, 118, 120 include, generally, desktop or portable computer systems equipped with Internet browser software which is operable to receive and display web pages and other data received from the applications server computer system 108 and to receive and communicate user inputs from a keyboard or mouse to the applications server computer system 108. Internet browser software, acceptable according to the preferred embodiment, includes Internet Explorer® software available from Microsoft® Corporation. The customer, supplier, printer, and administrator systems 114, 116, 118, 120 further include data and client email communication software. Preferably, the customer, supplier, printer, and administrator systems 114, 116, 118, 120 comprise: one or more processing units for executing software program instructions; various forms of memory (including, for example and not limitation, random access memory, read-only memory, and flash memory) for storing data and software program instructions; various forms of non-volatile program and data storage devices (including, but not limited to, magnetic disk drives, optical disk drives, magneto-optical drives, CD ROM drives, and DVD drives) for storing operating system software, application programs, Internet browser software, data communication software, client email communication software, configuration data, and other forms of data; various high and/or low speed data communication interfaces (including, for example and not limitation, DSL interfaces, broadband cable interfaces, cellular interfaces, satellite interfaces, local area network interfaces, serial interfaces, and parallel interfaces); at least one display interface and video monitor; user input devices such as a keyboard and/or mouse; and, one or more buses to enable appropriate data communication between the foregoing components.

It should be understood that the scope of the present invention includes customer, supplier, printer, and administrator systems which are Internet-enabled, but which do not comprise desktop or portable computer systems. It should be further understood that the scope of the present invention includes communication networks other than the Internet.

Figure 2:
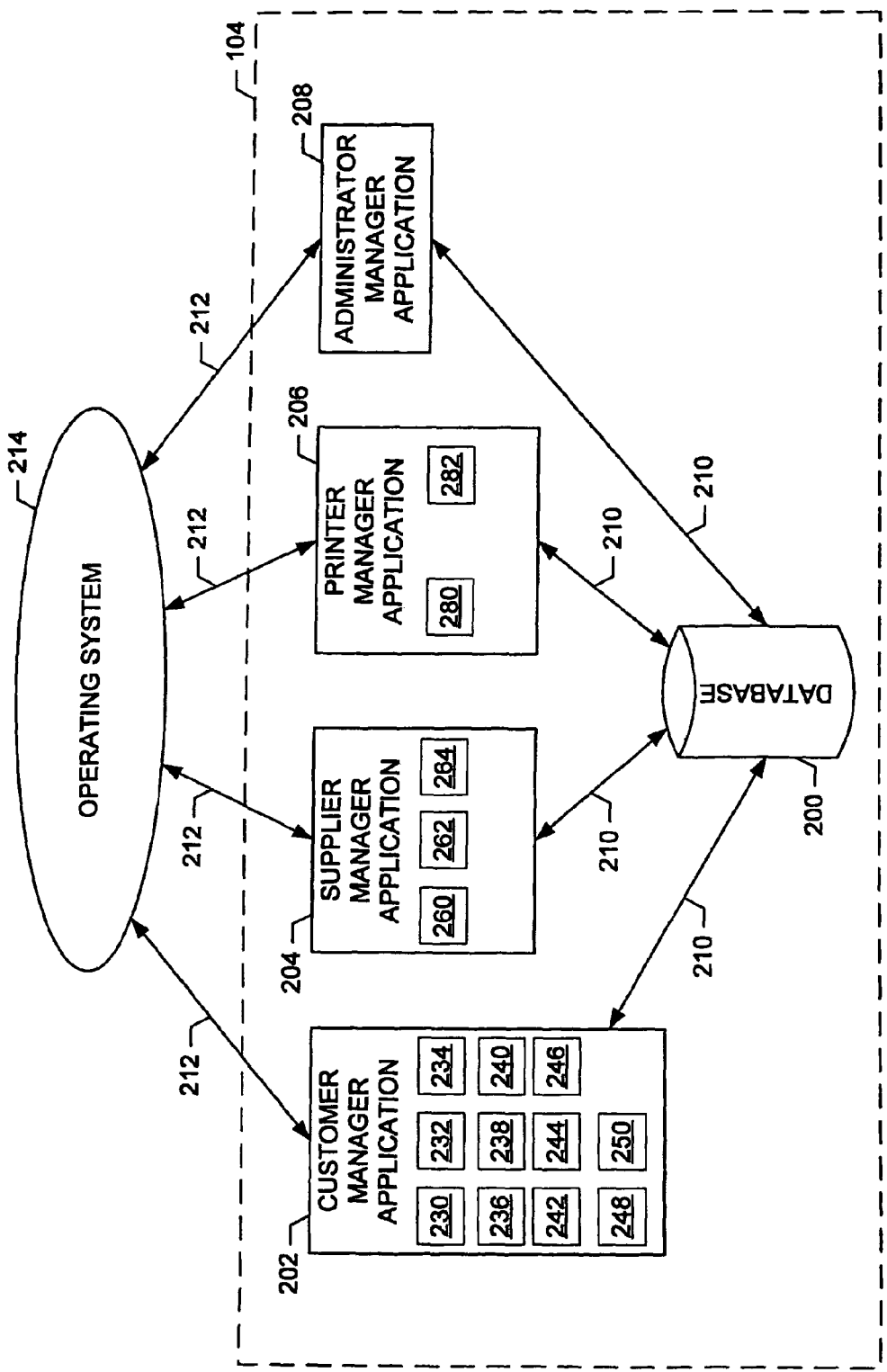
FIG. 2 displays a block diagram representation of the computer software environment of the paper purchase and distribution system of FIG. 1.
Figure 3B:
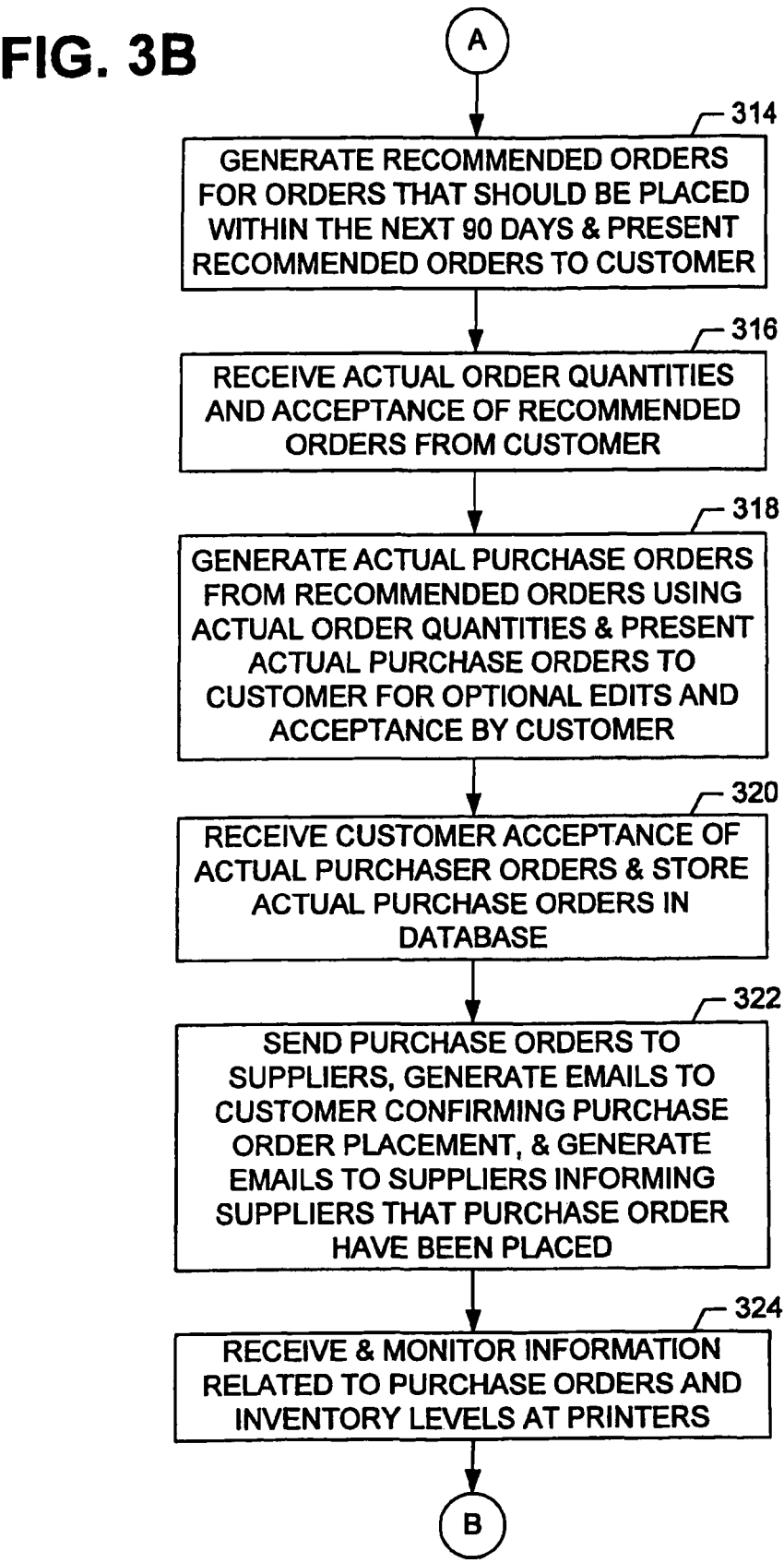
Figure 3D:
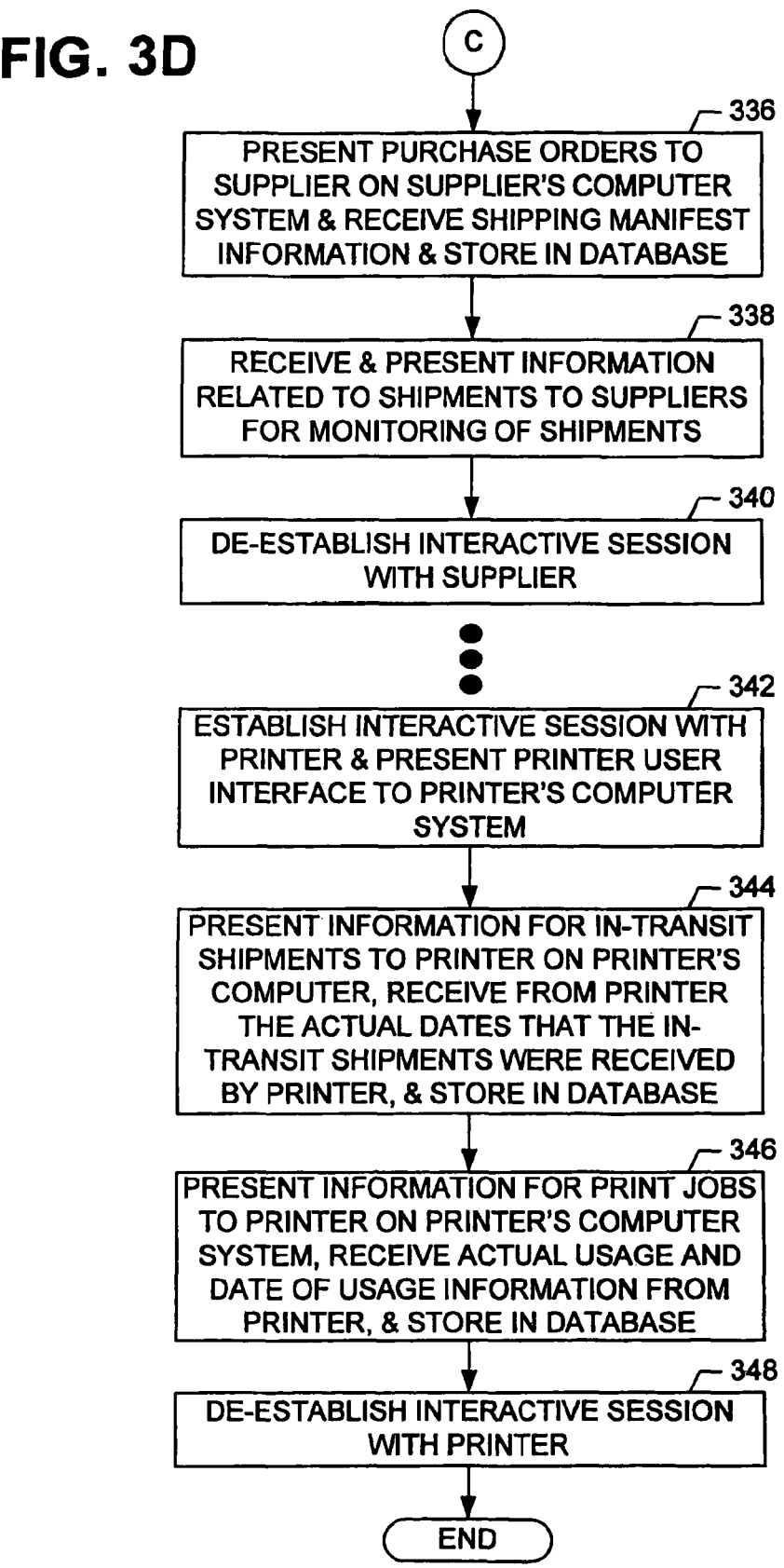

FIG. 2 displays a block diagram representation of the computer software environment 104 of the paper purchase and distribution system 100 in accordance with the preferred embodiment of the present invention. The computer software environment 104 comprises a database 200 (i.e., managed by back-end database management software which is not shown) for storing the data received and processed by the paper purchase and distribution system 100 and a plurality of computer software application programs (i.e., including computer software instructions) which each reside on a media of a data storage device of the applications server computer system 108. Each of the computer software application programs includes a plurality of software instructions which when executed, during operation, by the one or more processing units of the applications server computer system 108 provide the capabilities, functionality, and features described herein. The computer software application programs include a customer manager application 202 (also sometimes referred to herein as the "customer manager 202"), a supplier manager application 204 (also sometimes referred to herein as the "supplier manager 204"), a printer manager application 206 (also sometimes referred to herein as the "printer manager 206"), and an administrator manager application 208 (also sometimes referred to herein as the "administrator manager 208") which provide the paper purchase and distribution system's capabilities, functionality, and features, respectively, to customers, suppliers, printers, and system administrators using the paper purchase and distribution system 100 via the Internet browsers of respective customer, supplier, printer, and system administrator computer systems 114, 116, 118, 120 communicatively connected to the host server system 102.

Database 200 resides on a media of a data storage device of the applications server computer system 108 and comprises a central repository for data of the paper purchase and distribution system 100. Preferably, database 200 includes a relational database having a plurality of related and unrelated data tables which store the system's data. Also preferably, the database management software includes a back-end, relational database management program residing on a data storage device of the applications server computer system 108 which controls access to and from the database 200. It should be understood that the scope of the present invention includes paper purchase and distribution systems 100 having multiple databases 200 residing on one or more data storage devices and having a split database 200 residing on one or more data storage devices.

The computer software application programs, during operation, retrieve, store, and update appropriate data stored in the database 200 as depicted by data communication paths 210. Once data is stored in the database 200 by a customer, supplier, or printer, the data is almost instantly accessible to other trading partners. Thus, for instance, when a customer elects to process (i.e., place) a purchase order for paper via the customer manager application 202 as described below, the supplier identified in the purchase order will almost instantaneously be able to review the purchase order information via the supplier manager application 204 and the supplier's computer system.

The computer software application programs, via data communication paths 212, also bi-directionally communicate data, during operation, with an operating system 214 of the applications server computer system 108 and utilize various operating system capabilities and features, as necessary, to accomplish respective tasks. Operating together, but with respect to their appropriate users, the computer software application programs of the paper purchase and distribution system 100 comprise an overall system method 300 for purchasing paper, distributing paper, and consuming paper through, at least, the electronic managing and monitoring of paper inventories and shipments.

FIGS. 3A, 3B, 3C, and 3D display a flowchart representation of system method 300 in accordance with the preferred embodiment of the present invention. As seen FIGS. 3A, 3B, 3C and 3D, the method 300 comprises a plurality of steps which are, generally, executed by the applications server computer system 108 during a plurality of interactive sessions, first with a system administrator, then with a customer, next with one of the customer's suppliers, and finally with one of the customer's printers. Respective interactive sessions for the system administrator, customer, supplier, and printer are separated in FIGS. 3A, 3B, 3C, and 3D by ellipsis to indicate that time may, and usually does, elapse between the respective interactive sessions. Each interactive session comprises a period of time during which a computer system 114, 116, 118, 120 of a respective customer, supplier, printer, or system administrator is communicatively connected to the host server system 106 and exchanges data with the host server system 106 through execution of the Internet browser software of computer systems 114, 116, 118, 120 and under the control of the appropriate customer, supplier, printer, or administrator manager applications 202, 204, 206, 208 executing continually on the applications server computer system 108.

Typically, during an interactive session, a customer, supplier, printer, or system administrator performs one or more tasks associated with the purchase, supply, and consumption of paper which are enabled by the paper purchase and distribution system 100. Because tasks must usually be performed on a daily basis, a particular customer, supplier, printer, or system administrator may conduct a session every day and may conduct more than one session on a given day. It should be noted that during a particular session, a customer, supplier, printer, or system administrator may desire to perform certain tasks and not others, leaving remaining tasks to be performed during a subsequent session (although such subsequent sessions are not shown in FIGS. 3A, 3B, 3C, and 3D). It should also be noted that the paper purchase and distribution system 100 is operable to allow numerous different customers, suppliers, and printers to manage their purchase, supply, and consumption of paper and, hence, is operable to conduct pluralities of sessions with numerous different customers, suppliers, printers, and system administrators in a substantially simultaneous manner or at various different times. Further, it should be noted that while FIGS. 3A, 3B, 3C, and 3D are intended to display a general plurality of steps which are, substantially, representative of an overall method 300 of the present invention, many other steps may be performed by customers, suppliers, printers, and system administrators during interactive sessions which are not shown in FIGS. 3A, 3B, 3C, and 3D for purposes of clarity, but which may be described herein.

Generally, during an interactive session, the appropriate customer, supplier, printer, and administrator manager application 202, 204, 206, 208 communicates appropriate web page data representative of web pages (i.e., appropriate for the user's status as a customer, supplier, printer, or system administrator) and paper purchase and distribution system data associated in context with the web pages (i.e., retrieved from database 200) to the customer, supplier, printer, or system administrator computer systems 114, 116, 118, 120. Upon the receipt thereof, the customer, supplier, printer, or system administrator computer systems 114, 116, 118, 120 display the web pages and associated system data using their Internet browser software, thereby enabling the paper purchase and distribution system 100 to "present" appropriate information or data to the respective customer, supplier, printer, or system administrator. The customers, suppliers, printers, and system administrators interact with the paper purchase and distribution system 100, during a session, by providing input information to their respective computer systems 114, 116, 118, 120, typically, via a keyboard or mouse thereof. After receiving the input information, the computer systems 114, 116,

118, 120 communicate the input information, via their Internet browsers, to the appropriate customer, supplier, printer, and administrator manager application 202, 204, 206, 208 for the session.

Method 300, as illustrated in FIGS. 3A, 3B, 3C, and 3D, begins at step 302 where the host server system 106 and administrator manager 208 establish an interactive session with a system administrator in response to an administrator computer system 120 being pointed to the Internet web site address for the administrator manager 120 by the system administrator, and receiving and confirming a valid user name and password for the system administrator. The applications server 108 then presents a home web page of the administrator manager 208 to the system administrator. The applications server 108 then, at step 304, receives configuration data from the system administrator for customers and their suppliers and printers (i.e., trading partners), appropriately associates the configuration data, and stores the configuration data in appropriate data tables of database 200. Configuration data must be received and stored for each customer, supplier, and printer who may have access to, and utilize, the paper purchase and distribution system 100, including user names and passwords which are used to control access to the system 100.

Preferably, configuration data for a customer comprises information including, but not limited to: the customer's name; the customer's billing address for the receipt of bills associated with paper purchases and printing jobs; the customer's email address for the receipt of confirmation and verification emails from suppliers and printers; the customer's paper suppliers, including their names, plant locations and addresses, email addresses, terms, paper grades supplied to the customer, and be price/cwt for each paper grade with the effective date thereof; for the customer's publications which are in production or soon to be in production, the names of the issues and the paper requirements for each issue (i.e., including the various configurations (e.g., paper grade and roll size) and the quantities (e.g., in pounds) therefor), the supplier for each of the paper configurations of each issue, the relevant dates associated with each issue (e.g., press date, ad prelim date, ad close date, materials due date, print order date, paper due date, film due date, and on-sale date), and the printer for each issue; and the issued purchase orders for paper and their associated data. It should be understood that the above-list of configuration data is not inclusive and, hence, the configuration data includes additional information not presented in the list. Once the configuration information is received and stored, the applications server 108 receives a log-off request from the system administrator and in response, de-establishes the interactive session with the system administrator at step 306.

After the passage of a period of time, the host server system 106 and customer manager 202 establish an interactive session with a customer, at step 308, in response to the customer's computer system 114 being pointed to the Internet web site address for the customer manager 202 by the customer, and receiving and confirming a valid user name and password for the customer. The applications server 108 then presents a home web page of the customer manager 202 (see FIG. 4A) to the customer. As seen in FIG. 4A, the web page includes a menu bar at the top of the web page and a dashboard located slightly below the menu bar. The menu bar and the dashboard each have a plurality of drop-down menus which include names associated with the plurality of customer manager software modules. At this point, the customer may randomly select, via a mouse, a particular customer manager software module for execution by the applications server 108 in accordance with the function that the customer desires to perform. More detailed description of the individual customer manager software modules and the customer's interaction therewith is provided below.

Continuing with method 300 in an order which substantially follows, over time, a conventional course of use of the system 100 by the customer, the applications server 108 receives production schedule information from the customer and stores the information in database 200 at step 310. Then, at step 312, the applications server 108 receives demand plan information and stores it in database 200. The applications server 108 then generates, at step 314, recommended orders for paper that should be placed within the next ninety days and presents the recommended orders to the customer. In response, the applications server 108 receives actual order quantities for the orders and acceptance of the recommended orders from the customer at step 316. Then, at step 318, the applications server 108 generates actual purchase orders from the recommended orders using the actual paper order quantities received from the customer. The applications server 108 presents the actual purchase orders to the customer. At step 320, the applications server 108 receives customer acceptance of the actual purchase orders and stores the actual purchase orders in database 200. Upon receiving such acceptance, at step 322, the applications server 108 sends the actual purchase orders to the suppliers thereof, generates emails to the customer confirming placement of the actual purchaser orders, and generating emails to the suppliers informing the suppliers that purchase orders have been placed with them. Over time, the applications server 108, as indicated by step 324, receives and monitors information related to the purchase orders and related inventory levels at the printers associated with the purchase orders. When the applications server 108 receives a log-off request from the customer, the applications server 108 de-establishes the interactive session with the customer at step 326.

Figure 4B:
FIG. 4B displays a pictorial representation of a home web page of a supplier manager application of the system of FIG. 1.

After the passage of another period of time, the host server system 106 and supplier manager 204 establish an interactive session with a supplier, at step 328, in response to the supplier's computer system 116 being pointed to the Internet web site address for the supplier manager 204 by the supplier, and receiving and confirming a valid user name and password for the supplier. The applications server 108 then presents a home web page of the supplier manager 204 (see FIG. 4B) to the customer. As seen in FIG. 4B, the web page includes a menu bar at the top of the web page and a dashboard located slightly below the menu bar. The menu bar and the dashboard each have a plurality of drop-down menus which include names associated with the plurality of supplier manager software modules. At this point, the supplier may randomly select, via a mouse, a particular supplier manager software module for execution by the applications server 108 in accordance with the function that the supplier desires to perform. More detailed description of the individual supplier manager software modules and the supplier's interaction therewith is provided below.

Continuing with method 300 at step 330 in an order which substantially follows, over time, a conventional course of use of the system 100 by the supplier, the applications server 108 retrieves purchase orders for the supplier from database 200 and presents them to the supplier on the supplier's computer system 116. Then, at step 332, the applications server 108 receives confirmations of the purchase orders from the supplier (and stores the confirmations in database 200), generates emails to the customers associated with the purchase orders notifying the customers of their receipt of confirmations of the purchase orders, and generates emails to the supplier verifying that confirmations were sent to the customers. At step 334, the applications server 108 presents the purchase orders to the supplier on the supplier's computer system 116 and receives from the supplier expected ship dates, L.D.C. dates, and mill order numbers for the purchase orders. The applications server 108 then stores the received information in database 200. Next, over time, the applications server 108, as indicated at step 338, receives and monitors information related to shipments associated with purchase orders. When the applications server 108 receives a log-off request from the supplier, the applications server 108 de-establishes the interactive session with the supplier at step 340.

After the passage of another period of time, the host server system 106 and printer manager 206 establish an interactive session with a printer, at step 342, in response to the printer's computer system 118 being pointed to the Internet web site address for the printer manager 206 by the printer, and receiving and confirming a valid user name and password for the printer. The applications server 108 then presents a home web page of the printer manager 206 (see FIG. 4C) to the printer. As seen in FIG. 4C, the web page includes a menu bar at the top of the web page and a dashboard located slightly below the menu bar. The menu bar and the dashboard each have a plurality of drop-down menus which include names associated with the plurality of printer manager software modules. At this point, the printer may randomly select, via a mouse, a particular printer manager software module for execution by the applications server 108 in accordance with the function that the supplier desires to perform. More detailed description of the individual printer manager software modules and the printer's interaction therewith is provided below.

Continuing with method 300 at step 344 in an order which substantially follows, over time, a conventional course of use of the system 100 by the printer, the applications server 108 retrieves information for in-transit shipments to the printer from database 200 and presents the information to the printer on the printer's computer system 118. In response thereto, the applications server 108 receives, from the printer, the actual dates that the in-transit shipments were received by the printer and stores the dates in database 200. Then, at step 346, the applications server 108 retrieves information related to print jobs from database 200 and presents the information to the printer. The applications server 108 then receives actual usage quantities and actual usage dates from the printer and stores them in database 200. Next, when the applications server 108 receives a log-off request from the printer, the applications server 108 de-establishes the interactive session with the printer at step 348.

The customer manager 202 comprises a plurality of software modules, or procedures, having associated methods, when executed by the applications server 108, enable a customer to perform a number of tasks associated with: the generation, editing, submission, and monitoring of purchase orders for paper; production planning of publication issues and paper configurations therefor; demand planning related to maintenance of desired paper inventory levels housed at various printer locations and to the automatic generation of recommended orders to maintain such desired inventory levels; and, the monitoring of publication issues, paper shipments from numerous suppliers, and paper inventories housed at various printer locations. Such software modules include, preferably, a purchase order entry module 230, an order viewing module 232, a production scheduling module 234, a paper calculator module 236, a demand planning module 238, a paper migration module 240, an inventory viewing module 242, an alert configuration module 244, an alert viewing module 246, a recommended order viewing module 248, and a recommended order generation module 250 (see FIG. 2). The various software modules are accessible to and selectable by a customer (i.e., except for the recommended order generation module 250) upon establishing a session with the customer manager 202 (i.e., by connecting the world wide web address for the customer manager 202 and validly logging-in) from the customer manager's home page (see FIG. 4A) via the page's pull-down menus and dashboard. Once selected by a customer, the respective methods of the modules are executed by the applications server 108.

The purchase order entry module 230 (also sometimes referred to herein as the "order editor 230") allows a customer to create new purchase orders on an ad hoc basis, to assign the paper of the new purchase order to a printer, to add paper configurations to a new purchase order, to process the new purchase order to the paper's supplier, and to edit an existing order. When creating a new order, the order editor 230 automatically presents the billing and shipping information and receives the terms, paper due date, press date, and purchase order number from the customer. Paper-related information such as paper grade, quantity ordered, and roll size are also received from the customer. When initially created, a new purchase order has a status set to "pre-submitted" and changes may be made to the new purchase order or the new purchase order may be cancelled without confirmation from the supplier. However, once the new purchase order is processed to the supplier, the status is set to "awaiting supplier confirmation" and any changes to the order or cancellation of the order must be confirmed by the supplier.

Generally, the paper purchase and distribution system 100 supports a number of different purchase order types and statures. Valid order types, preferably, include: "new" meaning that the order has not been modified; "change" meaning that a request for change order has been made after the supplier confirmed the order; "change cancel" meaning that a request for cancel order was made after receipt of the confirmed the order (note—once the supplier confirms a request for cancel order, the type is set to "cancel"; and, "cancel" meaning that a request for cancel order has been made after the supplier confirmed the order and that the request for cancel order has been confirmed by the supplier). Valid order statuses, preferably, include: "pre-submitted" meaning that the order has not been processed to the supplier; "awaiting supplier confirmation" meaning that the order has been processed to the supplier and is awaiting review and confirmation by the supplier; "supplier confirmed" meaning that the order has been confirmed by the supplier; and, "completed" meaning that the order has been fulfilled and shipped by the supplier.

Figure 5A:
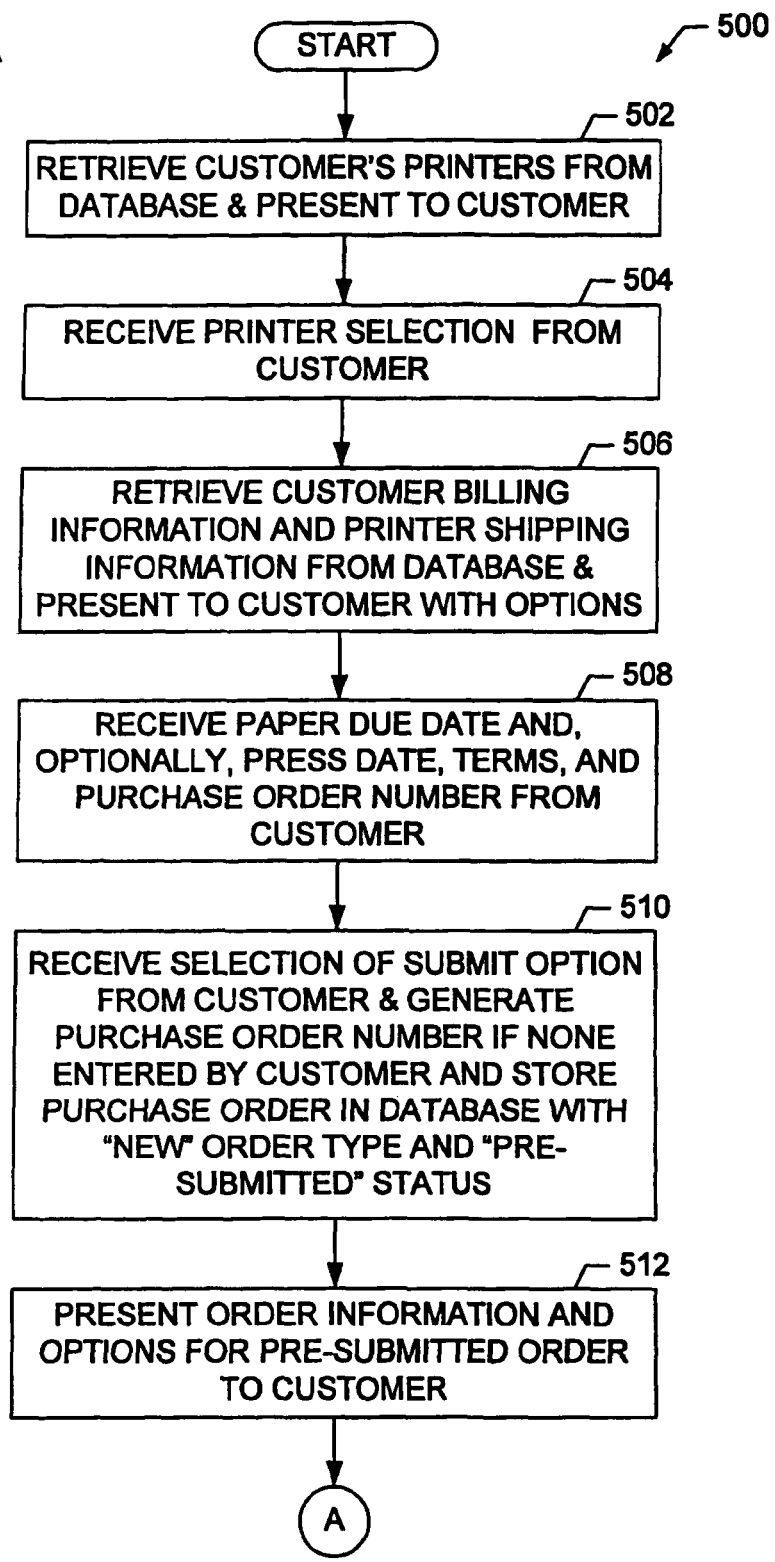
FIGS. 5A, 5B, and 5C display a flowchart representation of a method of an order editor of the system of FIG. 1.
Figure 5B:
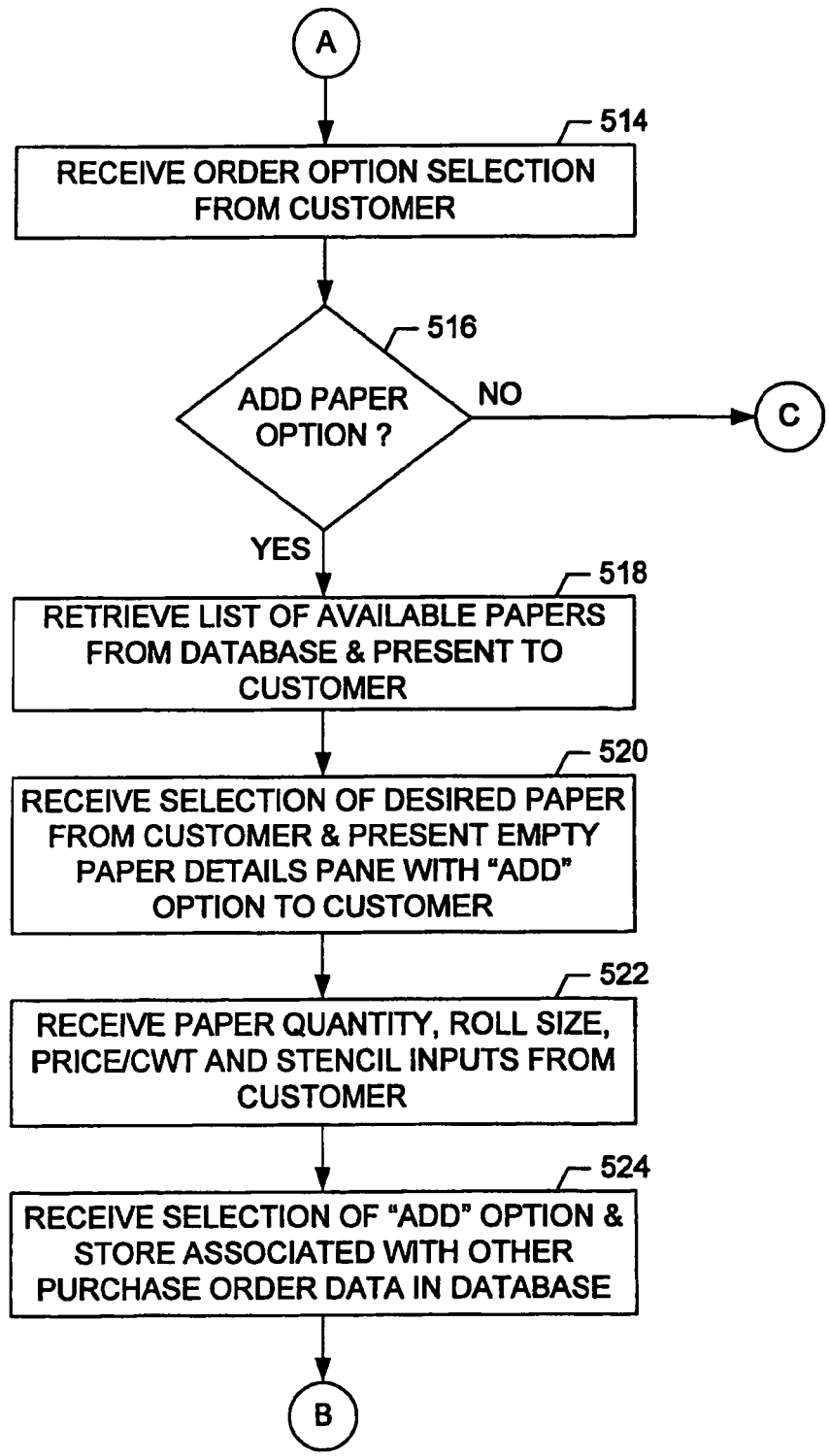
Figure 5C:
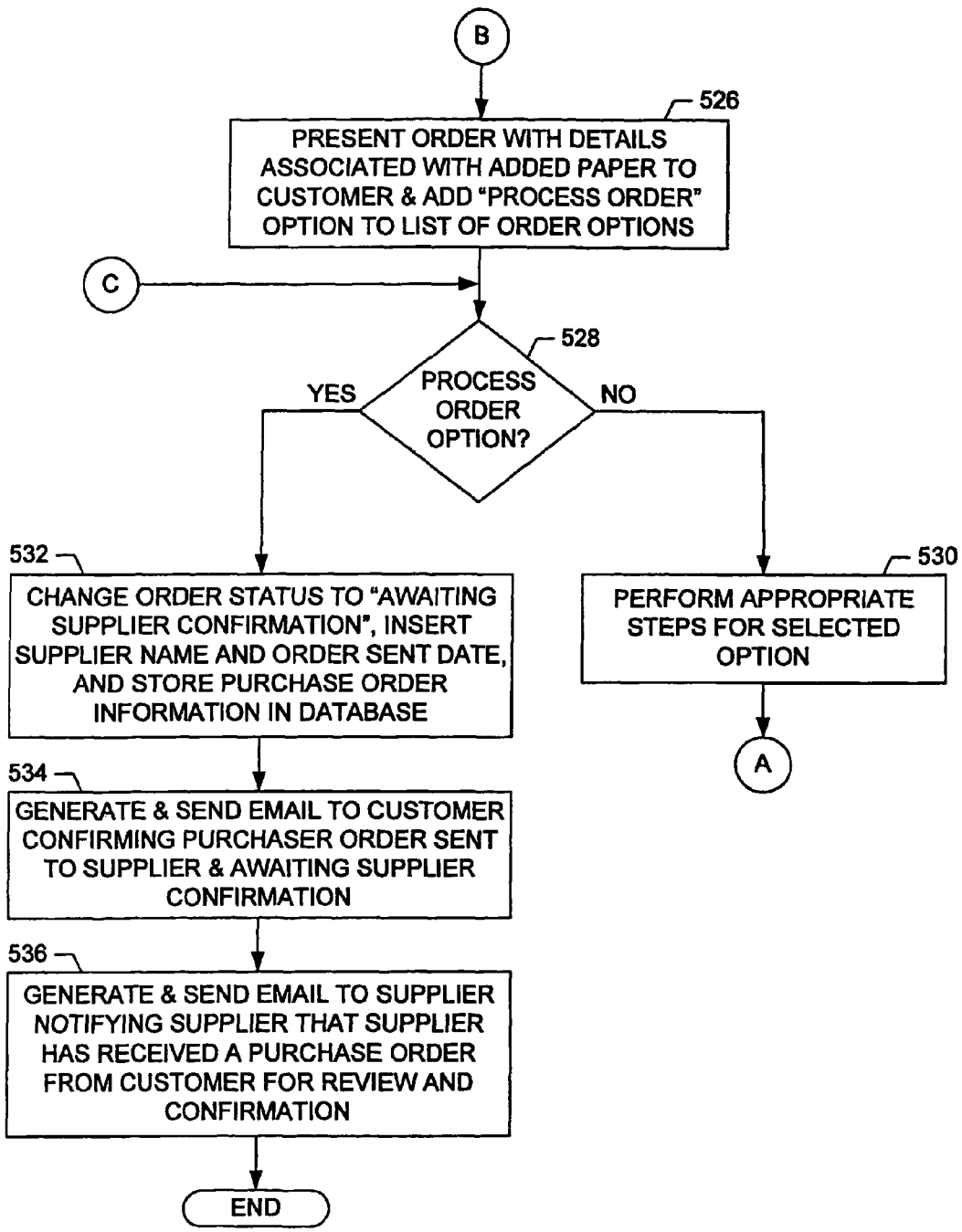

FIGS. 5A, 5B, and 5C display a flowchart representation of a method 500 of the order editor 230 according to the preferred embodiment of the present invention. After starting, the applications server 108, at step 502, retrieves information pertaining to the customer's pre-approved printers from database 200 and presents a listing of the printers, via a web page for the order editor 230 to the customer for selection of a printer (i.e., the paper of the order will be shipped directly from the supplier to the printer, hence, a printer must be selected) by the customer. At step 504, the application server 108 receives a printer selection from the customer. The application server 108 then, at step 506, retrieves the customer's billing information and the printer's shipping information from database 200 and presents the information to the customer, in the new order creator's web page, with fields for the input of a required paper due date and for the optional input of the press date, terms, customer purchase order number, and supplier purchase order number, and with an option to "submit" or "cancel". The application server 108 receives the information provided by the customer at step 508 and receives the selection of the "submit" option at step 510. In response, the applications server 108 generates a purchase order number if none was received and stores the purchase order in database 200 with its order type set to "new" and its order status set to "pre-submitted".

Figure 7:
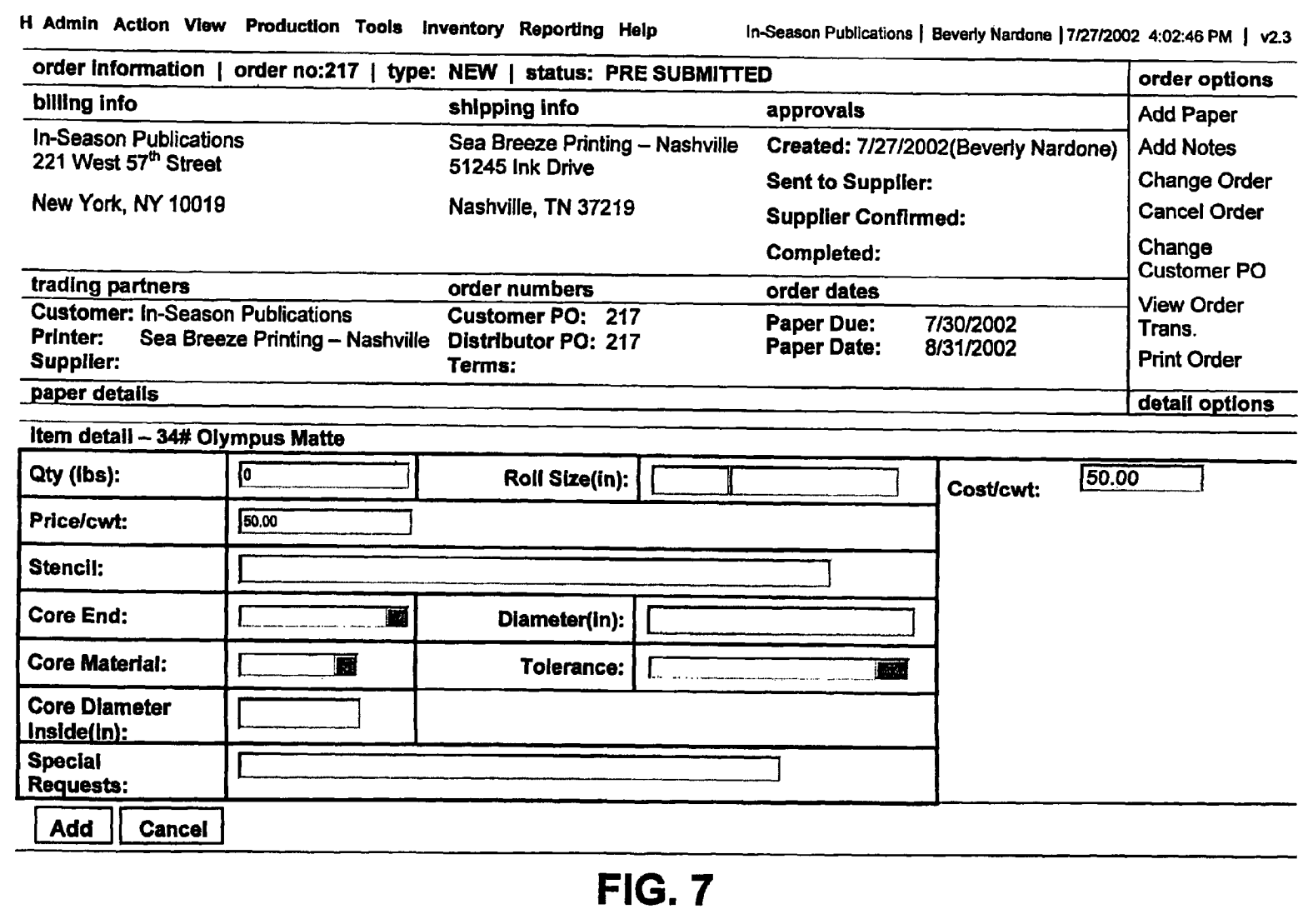

Proceeding to step 512, the applications server 108 presents the order information and various order options (e.g., "add paper", "add notes", "change order", "cancel order", "change customer purchase order", "view order transactions", and "print order" to the customer via the module's web page. Then, at step 514, the applications server 108 receives an order option selection from the customer. At step 516, the applications server 108 determines whether the "add paper" option was selected by the customer. If not, the applications server 108 branches to step 528 described below. If so, the applications server 108 retrieves a list of the customer's available papers from database 200 at step 518 and presents the list to the customer in a paper details pane of the order editor's web page (see FIG. 6). At step 520, the applications server 108 receives a selection of a desired paper from the customer and presents an empty paper details pane on the order editor's web page (see FIG. 7). The paper details pane includes fields for the receipt of customer input of a quantity (in pounds), the price/cwt, stencil, a core end type, a core material type, an inside core diameter, a roll size, a roll diameter, a tolerance type, special requests. The pane also includes "add" and "cancel" options. At step 522, the applications server 108 receives, at least, a paper quantity, roll size, price/cwt and stencil inputs from the customer. Next, the applications server 108 receives the selection of the "add" option by the customer at step 524 and stores the input data associated with the other date for the new purchase order in database 200.

Continuing at step 526, the applications server 108 presents the new purchase order to the customer, with the paper details received at step 522, on the order editor's web page (see FIG. 8). The applications server 108 also adds the "process order" option to the list of order options at the right side of the web page. Then, at step 528, the applications server 108 decides whether the customer has selected the "process order" option. If not, the customer selected one of the other order options described above and, in response thereto, the applications server 108 performs appropriate steps and actions for the selected option before returning to step 514 to await receipt of another order option. If the applications server 108 decides, at step 528, that the customer selected the "process order" option, the applications server 108 branches to step 532 where it changes the order status for the new purchase order to "awaiting supplier confirmation" and inserts the supplier name and order sent date (i.e., the date the order was sent to the supplier) into the purchase order before storing the new purchase order and its data in database 200. The applications server 108 also generates and sends an email to the customer (i.e., using the customer's email address stored in database 200 during configuration of the paper purchase and distribution system 100) confirming that the new purchase order has been sent to the supplier and is awaiting supplier confirmation. In addition, the applications server 108 generates and sends an email to the supplier notifying the supplier that it has received a purchase order from the customer for review and confirmation.

The customer manager's order viewing module 232 (also sometimes referred to herein as the "order viewer 232") enables a customer to retrieve existing purchase orders from database 200 according to various criteria, to review the orders for certain information, and to edit the orders if desired. The criteria, preferably, include order status (i.e., pre-submitted, awaiting supplier confirmation, supplier confirmed, and completed), L.D.C. status (i.e., awaiting L.D.C. from supplier or firming of the order), shipping date status (i.e., awaiting expected ship date or upcoming ship date), or by customer-specified selection criteria (i.e., customer purchase order number, mill order number, mill, expected ship date, L.D.C. date, paper due date, roll size, paper grade, order type, stencil, printer, or finned date). Thus, existing purchase orders may be selected from the database 200 and reviewed: if their order status is "pre-submitted", "awaiting supplier confirmation", "supplier confirmed", or "completed" (i.e., a "completed" order includes the amount of paper ordered and the amount of paper shipped for each paper configuration); if the orders are awaiting L.D.C. from supplier or firming; if the orders' shipping date status is "awaiting expected ship date" or "upcoming ship date"; or, if the orders have data which matches the customer-specified selection criteria.

Once retrieved, the order viewer 232 presents the orders as separate line items containing summary information about the order (e.g., supplier, printer, customer purchase order number, supplier purchase order number, paper due date, expected ship date, L.D.C. date, roll size, and paper grade) sorted by descending paper due dates, and allows the customer to select an order to see detailed order information. Various order options are presented to the customer which, upon their selection, allow the customer to edit the order, cancel the order, firm a paper configuration of an order (i.e., which causes the applications server 108 to set the order firmed date associated with that paper configuration to the current date, and to generate and send an email to the supplier notifying it that the customer has firmed the L.D.C. for the paper configuration), add notes or view notes on the order, view the orders transaction history, and view the order's manifest details.

Figure 9:
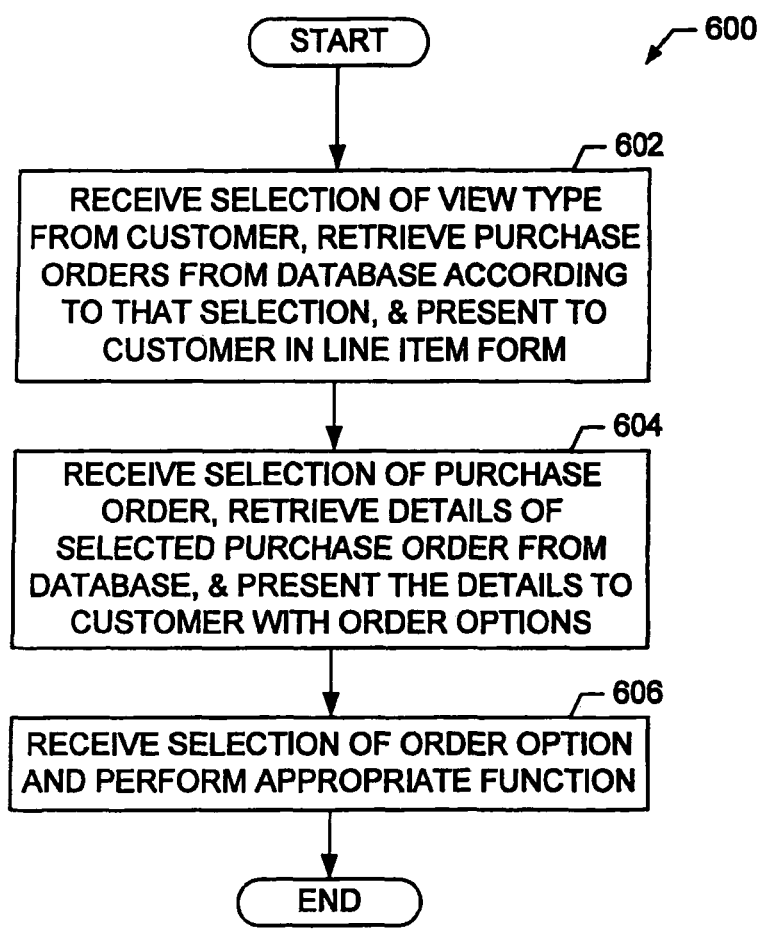
FIG. 9 displays a flowchart representation of an order viewer method of the system of FIG. 1.

FIG. 9 displays a flowchart representation of a method 600 of the order viewer 232 according to the preferred embodiment of the present invention. After starting, the applications server 108, at step 602, receives the customer's selection of a view type (i.e., either by selection of a drop-down menu item which automatically causes certain criteria to be used in retrieving the orders; or by specification of criteria via an initial viewer web page) and retrieves orders and associated information from database 200 according to the selected view type. The applications server 108 presents the orders to the customer in an order viewer web page in a line item form (see FIG. 10 for a view of pre-submitted orders). At step 604, the applications server 108 receives selection of a purchase order line item from the customer, retrieves the details associated with the purchaser order from database 200, and presents the details to the customer in an order details pane of the order viewer's web page. The applications server 108 also presents various order options (e.g., "add paper", "add notes", "process order", "change order", "cancel order", "change customer purchase order number", "view order transaction details", and "print order") and detail order options (e.g., "change" and "remove") at the right side of the viewer web page (see FIG. 11) for selection by the customer. Next, at step 606, the applications server 108 receives the selection of an order or detail option from the customer and performs the selected function (including, but not limited to, enabling the customer to edit the order) before ending operation according to method 600.

The customer manager's production scheduling module 234 (also sometimes referred to herein as the "production scheduler 234") enables a customer to assign a publication to a printer and to create production schedules for each of the issues of the customer's publications. The production schedules store information used by the recommended order viewer 248 and the demand planner 238 to generate recommended orders for paper as described below. A paper schedule is created for each issue and includes a plurality of milestone dates (e.g., press date, ad prelim date, ad close date, materials due date, print order date, paper due date, film due date, and on sale date) related to the overall process of printing the issue. The paper due date is critical to the generation of recommended orders since it defines when the appropriate paper must be at the printer of the issue. The production schedule for each issue also includes one or more paper configurations (e.g., paper grade and roll size) required for the issue. Each paper configuration includes an estimated usage quantity for that paper configuration (i.e., which may input by the user or generated by the paper calculator 236 described below) and a supplier therefor. The paper configurations of a production schedule also influence the generation of recommended orders for paper by the recommended order viewer 248 and the demand planner 238. Other factors for generating recommended orders for each paper configuration, as described below, include paper inventories on hand, pending orders for paper, shipments of paper actually received, actual consumption of paper, and the inventory method used to determine how much paper must be kept on hand at a printer's location.

The production scheduler 234 also enables each paper configuration of a production schedule to be identified by the customer as "active" or "inactive". If a paper configuration is "active", the recommended order viewer 248 will consider the paper configuration during its processing of demand plan configurations and, potentially, generate a recommended order for the paper configuration. Alternatively, if a paper configuration is "inactive", the recommended order viewer 248 will not consider the paper configuration during its processing of demand plan configurations and will not generate a recommended order for the paper configuration. The production scheduler 234 additionally enables editing of production schedules, deletion of issues, and viewing of issues assigned to a printer.

Figure 12A:
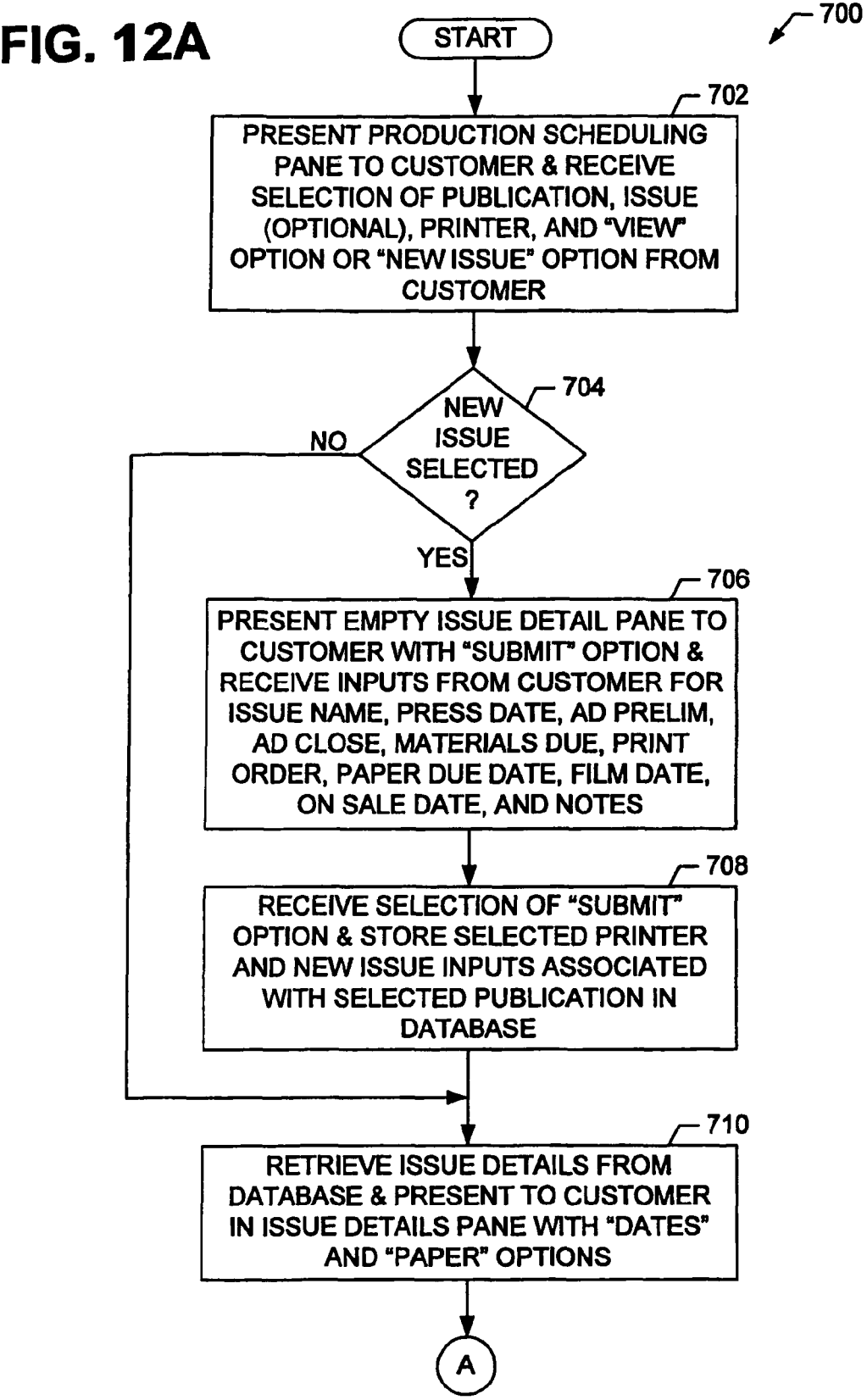
Figure 12B:
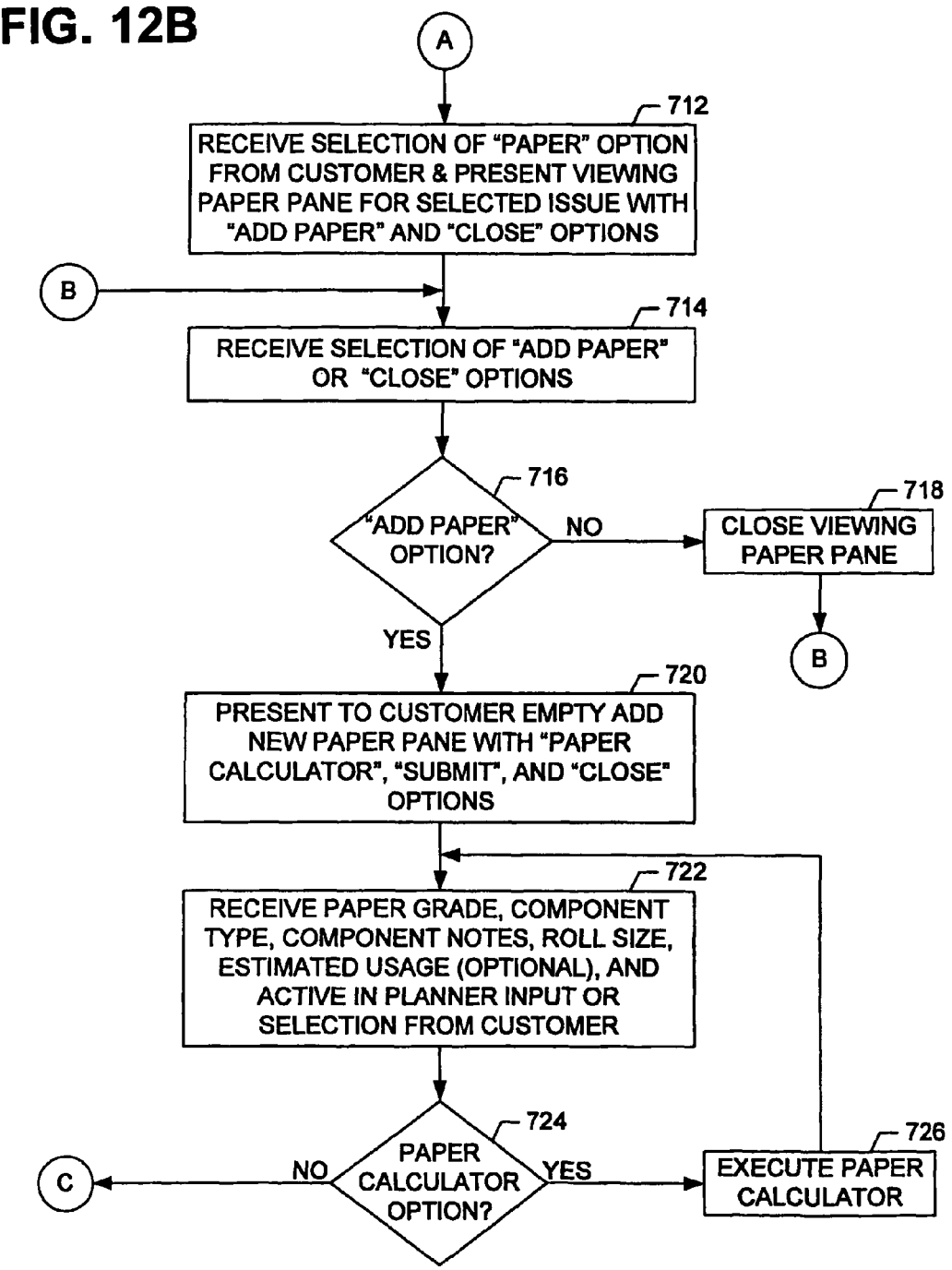

FIGS. 12A, 12B, and 12C display a flowchart representation of a method 700 of the production scheduler 234 according to the preferred embodiment of the present invention. After starting, the applications server 108, at step 702, presents a production scheduler web page to the customer having list boxes for the receipt of publication, issue, and printer selections (i.e., the lists of current publications, issues, and printers having been previously set up during system configuration for the customer) and "view" and "new issue" options (see FIG. 13). The applications server 108 receives a selection of a publication and printer (i.e., thereby assigning the publication to the printer) and may receive a selection of an issue of the publication. Also, the applications server receives the selection of either the "view" or the "new issue" options. Next, at step 704, the applications server 108 determines whether the "new issue" option was selected by the customer. If not, the applications server 108 branches to step 710 of method 700 described below. If so, the applications server 108 advances to step 706 where it presents an empty issue detail pane of the production scheduler's web page to the customer with "submit" "close" options. The application server 108 then, preferably, receives inputs from the customer for the issue name, press date, ad prelim due date, ad close due date, materials due date, print order date, paper due date, film due date, on sale date, and notes. Upon receipt of the "submit" option from the customer at step 708, the applications server 108 stores the selected printer and new issue data in association with the selected publication in database 200.

At step 710, the applications server 108 retrieves issue details for the selected or recently entered issue from database 200 and presents them to the customer in an issue details pane of the production scheduler's web page with "dates" and "paper details" options. In response, the applications server 108 receives, at step 712, the selection of the "paper details" option from the customer, indicating that the customer desires to enter or edit a paper configuration or estimated paper usage for the issue. The applications server 108 presents a viewing paper pane for the selected issue in the production scheduler's web page with options to "add paper" or "close" the pane. If paper configurations have already been added to the issue's production schedule, these paper configurations are displayed in the viewing paper pane as seen in FIG. 15.

Continuing at step 714 of method 700, the applications server 108 receives a selection from the customer of either the "add paper" or "close" options. Then, at step 716, the applications server 108 determines whether the "add paper" option was selected by the customer. If not, the applications server 108 closes the viewing paper pane at step 718 and returns to step 714 to await further customer input. If so, the applications server 108 advances to step 720 where it presents an empty add new paper pane (see FIG. 16) to the customer with "paper calculator", "submit", and "close" options. Then, at step 722, the applications server 108 receives paper grade, component type (i.e., referring to whether the paper will be used as a cover, insert, or other part of a publication issue), component notes, roll size, estimated usage (optional), and a paper configuration active or inactive status (i.e., to indicate whether or not the paper configuration is to be used in generating recommended orders by the recommended order viewer described below). Next, at step 724, the applications server 108 ascertains whether the customer has selected the "paper calculator" option. If so, the applications server 108 branches to step 726 where it executes the paper calculator module 236 (described below) to compute an estimated usage quantity for inclusion with the other received paper configuration data. If not, applications server 108 determines, at step 728, whether the "submit" option was selected by the customer. If the applications server 108 determines that the "submit" option was not selected, the applications server 108 branches to step 730 where it closes the add new paper pane and returns to step 714 to await customer input. If the "submit" option was selected, the applications server 108 stores the new paper information in database 200, presents the input paper configuration to the customer in the viewing paper pane, and closes the add new paper pane.

FIGS. 17A and 17B display a flowchart representation of a method 800 of a paper calculator module 236 according to the preferred embodiment of the present invention. The paper calculator module 236 (also referred to sometimes herein as the "paper calculator 236") determines an estimated usage quantity, in pounds, for provided input parameters corresponding to the usage of a particular paper configuration in a publication issue. After starting, the applications server 108, at step 802, presents a paper calculator pane with empty fields and "calculate", "apply", and "cancel" options to the customer adjacent the add new paper pane as seen in FIG. 18. Next, at step 804, the applications server 108 receives input of a number of pages, circulation, basis weight, page size, overall waste factor, a rounding indicator or an option selection from the customer. At step 806, the applications server 108 determines whether the "calculate" option has been received and, if so, it calculates the estimated usage and presents the estimated usage to the customer via the paper calculator pane. If not the applications server 108 branches to step 810 of method 800 where it ascertains whether the "apply" option was selected by the customer. If the "apply" option was not selected, the applications server 108 closes the paper calculator pane at step 814. If the "apply" option was selected, the applications server 108 inserts the estimated usage into the paper configuration being added or edited and into the estimated usage field of the add new paper pane. The applications server 108 then closes the paper calculator pane at step 814.

In calculating the estimated usage, the paper calculator 236 computes an intermediate result from the inputs received from the customer according to the following equation:

Intermediate Result =
(number of pages × circulation × page width × page height × basis weight)/(basis height × basis width × 1000)

where the basis height and basis width are, preferably, fixed values (i.e., in another embodiment, the basis height and basis width may not be fixed values). Then, the amount of anticipated waste paper is computed according to the following equation:

Waste Paper=waste factor×Intermediate Result/100

Next, the estimated usage is computed using the computed Intermediate Result and the computed Waste Paper values as follows:

Estimated Usage=Intermediate Result+Waste Paper

If the rounding indicator, or option, has been selected by the customer, the Estimated Usage is rounded up to the next one thousand pounds.

The customer manager's demand planning module 238 (also sometimes referred to herein as the "demand planner 238") enables a customer to input and/or edit information for demand plan configurations which are used by the recommended orders viewer 248 (described below) to generate, for each demand plan configuration associated with an active paper configuration, recommended orders on a week-by-week basis that may be converted into pre-submitted purchase orders by the recommended orders viewer 248. Each demand plan configuration is associated in one-to-one correspondence with a paper configuration of a production schedule. Each demand plan configuration includes a minimum level, target level, minimum order quantity, order lead time, an increment in full loads indicator, and an order lead time. The minimum level represents the minimum inventory of the respectively associated paper configuration that a printer may have on hand for any given week. The target level is the maximum inventory of the respectively associated paper configuration that a printer may have on hand for any given week. The minimum order quantity represents the minimum quantity of paper, in pounds, that may be ordered in a single purchase order from the paper's supplier. Typically, the minimum order quantity is determined by the paper's supplier and may have a value equal to the weight of paper normally carried by a truck or rail car. The increment in full loads indicator determines whether paper quantities must be ordered in multiples of the minimum order quantity. Thus, for example, if the increment in full loads indicator is set to "yes" and the minimum order quantity is set to 2,000 pounds and the recommended orders viewer 248 determines that an order of 3,000 pounds is needed, the recommended orders viewer 248 will increase the recommended ordered amount to 4,000 pounds since that amount is the next higher multiple of the minimum order quantity. The order lead time represents the number of days required by the supplier to process an order, manufacture the order, and ship the order to a printer.

It should also be noted that in generating recommended order quantities, the recommended orders viewer 248 utilizes the value of the minimum level to determine whether to use an "issue on floor" or "weight on floor" inventory management method. If the value of the minimum level in a given demand plan configuration is less than 10, the recommended orders viewer 248 will utilize the "issue on floor" method. If the value of the minimum level in a given demand plan configuration is greater than or equal to 10, me recommended orders viewer 248 will utilize the "weight on floor" method. Under the issue on floor method, the recommended orders viewer 248 interprets the value of the minimum level to refer to the minimum number of issues of paper for the associated paper configuration that a printer should have on hand during any given week and recommends an order quantity accordingly. According to the weight on floor method, the recommended orders viewer 248 interprets the value of the minimum level as the minimum weight of paper for the associated paper configuration that a printer should have on hand during any given week and recommends an order quantity accordingly.

Figure 19A:
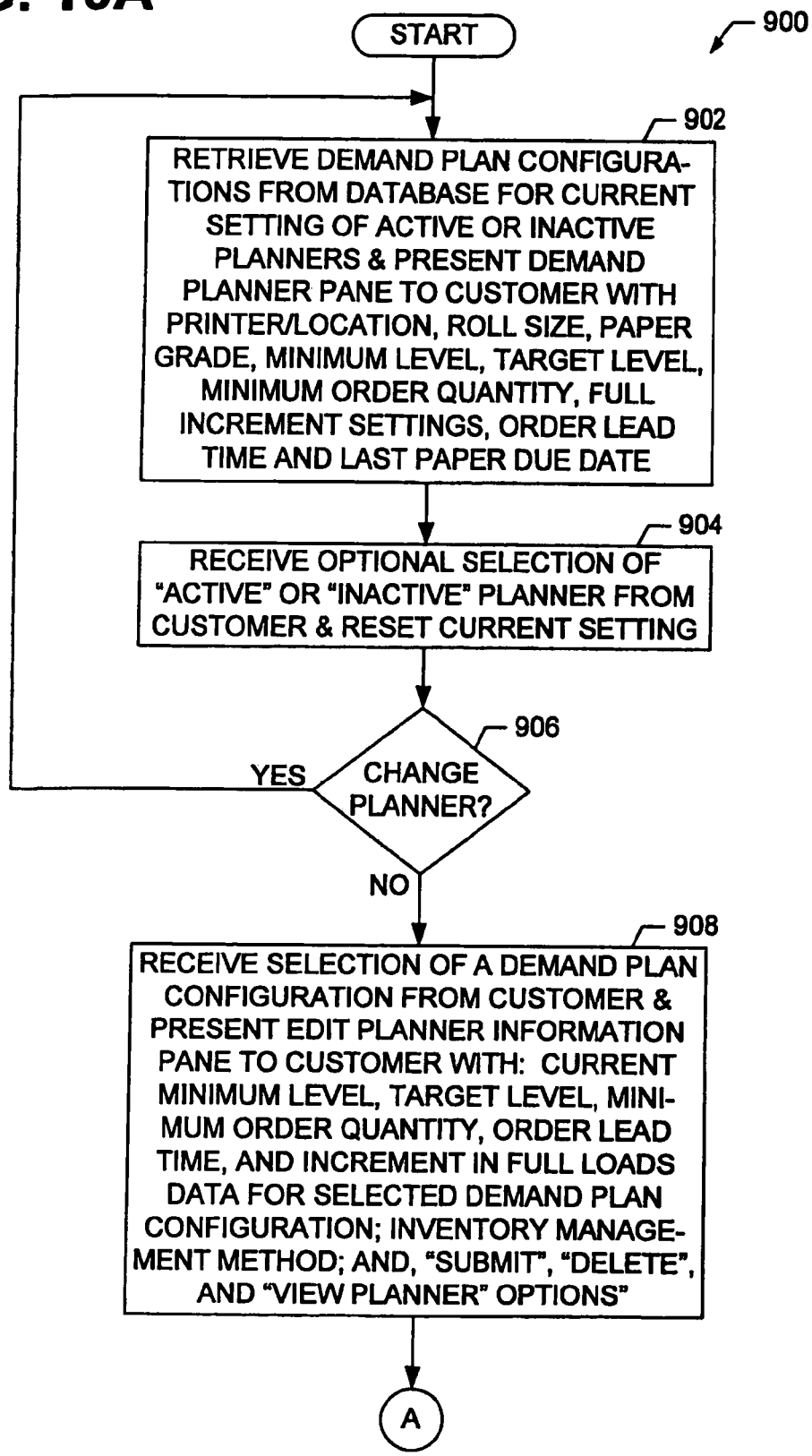
FIGS. 19A and 19B display a flowchart representation of a demand planner method of the system of FIG. 1.
Figure 19B:
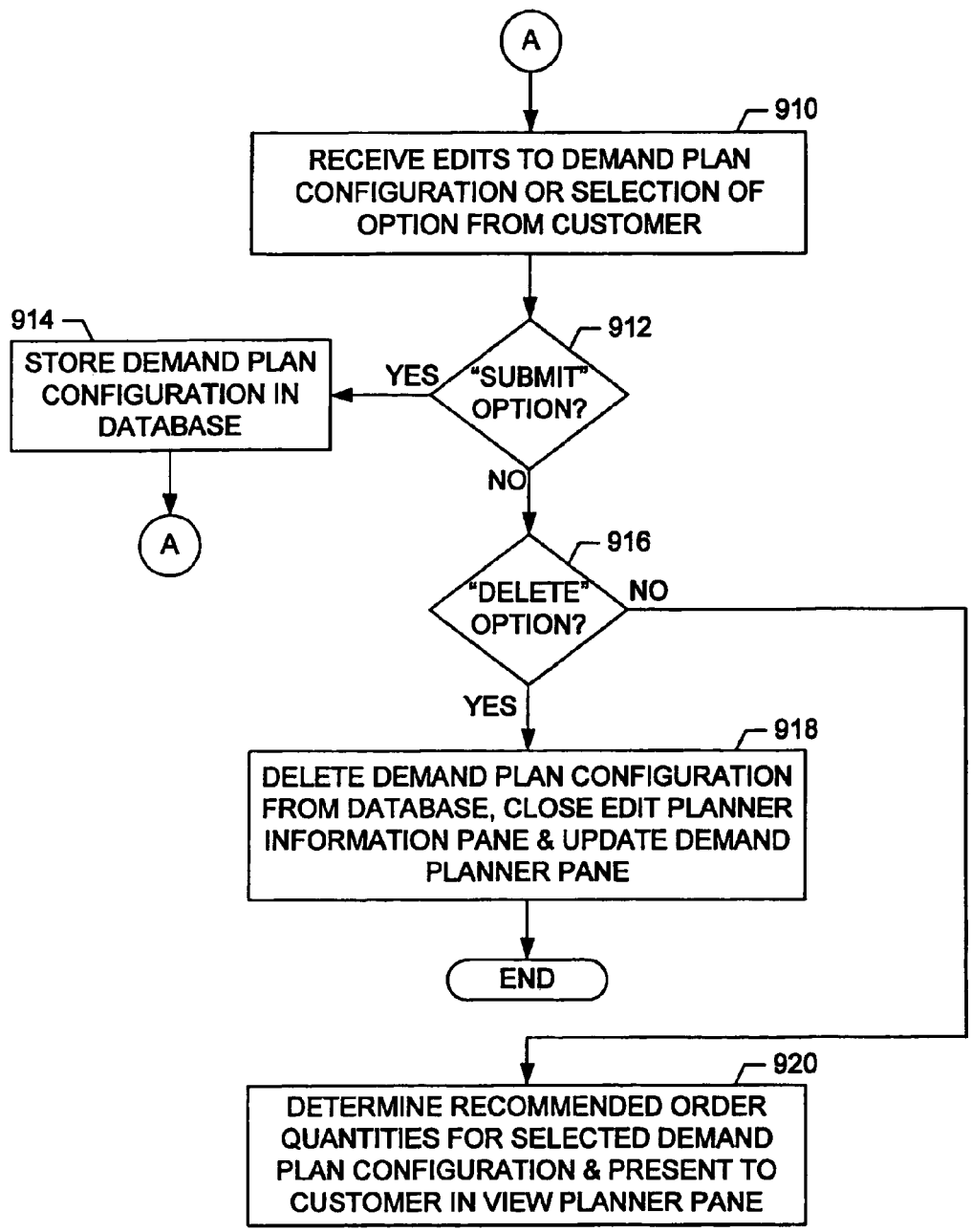

FIGS. 19A and 19B display a flowchart representation of a method 900 of the demand planner 238 according to the preferred embodiment of the present invention. After starting, the applications server 108, at step 902, retrieves demand plan configurations and associated paper configurations from database 200 for the current setting of a planner status (i.e., which indicates whether to retrieve demand plan configuration data for associated paper configurations which are "active" or "inactive") and presents the retrieved data in a demand planner pane of the customer manager's web page as seen in FIG. 20. The retrieved data is presented in a line item list format with each line representing a demand plan configuration and including the printer/location, roll size, paper grade, minimum level, target level, minimum order quantity, increment in full loads indicator, order lead time, and last paper due date. Then, at step 904, the applications server 108 may receive an optional selection of a new planner status and resets the value of the planner status. Next, at step 906, the applications server 108 determines whether a new planner status selection was received and if so, branches back to step 902 to retrieve and present demand plan configuration data associated with paper configurations having an active or inactive status matching the selected planner status. If there has been no selection of a new planner status, the applications server 108 advances to step 908 where it receives the selection of a demand configuration plan from the demand planner pane. Upon such receipt, the applications server 108 presents an edit planner pane (see FIG. 21) populated with the current settings of the minimum level, target level, minimum order quantity, order lead time, increment in full loads indicator, and inventory management method (i.e., "issue on floor" or "weight on floor" based on the current value of the minimum level) for the selected demand configuration plan. The applications server 108 also presents "submit", "delete", and "view planner options" in the edit planner pane.

Continuing at step 910, the applications server 108 receives edits to the displayed demand plan configuration or the selection of an option from the customer. The applications server 108 determines, at step 912, whether the "submit" option was selected and, if so, the applications server 108 stores the current settings of the demand plan configuration data in database 200 at step 914 and returns to step 910 to await further customer input. If the applications server 108 determines that the "submit" option was not selected by the customer, the applications server 108 advances to step 916 where it decides if the customer has selected the "delete" option. If so, the applications server 108, at step 918, deletes the demand plan configuration from database 200, closes the edit planner pane, and updates the demand planner pane to remove the deleted demand plan configuration from the list of line items. If the applications server 108 decides, at step 916, that the customer has not selected the "delete" option, the applications server 108 branches to step 920 where it determines recommended order quantities for the paper of the paper configuration associated with the selected demand plan configuration on a week-by-week basis. The applications server 108 then presents the recommended order quantities on a week-by-basis in a view planner pane with corresponding values of estimate usages, actual quantities needed, actual quantities ordered, shipments, usages completed, adjustments to inventory, inventory quantities, actual levels, target levels, and minimum levels.

The customer manager's paper migrator module 240 (also sometimes referred to herein as the "paper migratory 240") enables a customer to migrate an existing paper configuration, which is made up of a specific printer, paper grade, and roll size, to future issues of any publication. The scope of the migration (i.e., how many issues are affected) is controlled by the selection of a range of paper due dates to which the migration is then applied. Because the changes made during migration effect future orders, a migration will effect the recommended orders generated by the recommended orders viewer 248.

Figure 22A:
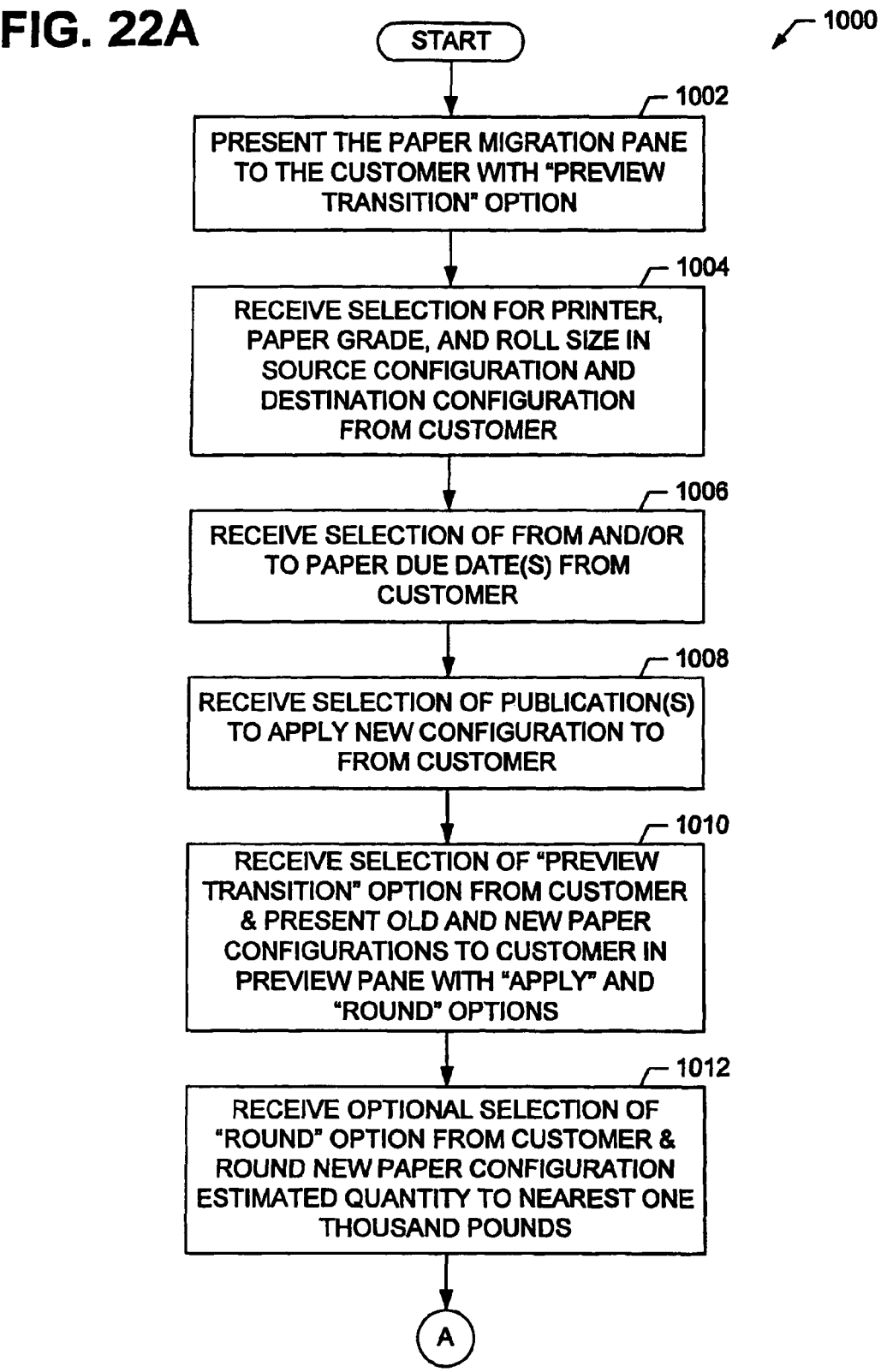
Figure 23:
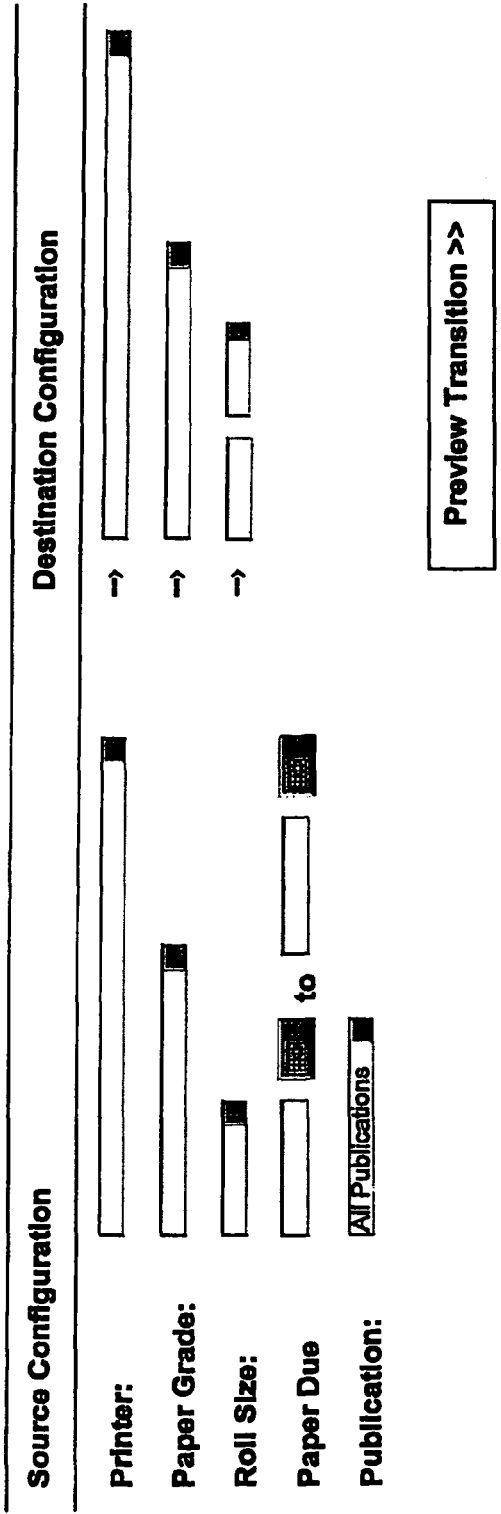
FIG. 23 displays a pictorial representation of a paper migration pane of the system of FIG. 1.

FIGS. 22A and 22B display a flowchart representation of a method 1000 of the paper migrator 240 according to the preferred embodiment of the present invention. After starting, the applications server 108, at step 1002, presents an empty paper migration pane on the customer manager's web page (see FIG. 23). The paper migration pane has source and destination configuration fields for printer, paper grade, and roll size, has paper due date from and to fields, has a publication field, and has a "preview" option available for selection by the customer. Then, at step 1004, the applications server 108 receives inputs from the customer for the printer, paper grade, and roll size source and destination configuration fields. Next, at step 1006, the applications server 108 receives inputs for the paper due date from and/or to fields from the customer. Subsequently, at step 1008, the applications server 108 receives, from the customer, input of the publication(s) to apply the new configuration to.

Upon receiving a selection of the "preview" option from the customer at step 1010, the applications server 108 presents the old and new paper configurations to the customer in a preview pane with "apply" and "round" options (see FIG. 24). At step 1012, the applications server 108 receives a selection of the "round" option from the customer and rounds the estimated quantity of the new paper configuration to the nearest one thousand pounds. Finally, at step 1014, the applications server 108 receives a selection of the "apply" option from the customer and, in response thereto, applies the previewed transition and stores the new paper configuration in database 200. The applications server 108 also presents a message to the customer informing the customer that the migration is complete before ending execution according to method 1000.

The customer manager's inventory viewing module 242 (also sometimes referred to herein as the "inventory viewer 242") enables a customer to view inventory information for a particular paper configuration that is housed at a particular printer/location. The inventory information may be viewed at a summary level or at a detailed transaction level. The inventory information of the summary level view is grouped by printer/location (i.e., current inventory levels are displayed for each combination of paper grade and roll size carried by that printer). The inventory information of the detailed transaction level is presented for an input date range and shows procurement, consumption, and adjustment activity for a particular paper grade. The inventory viewer 242 also enables a customer to adjust the inventory levels with adjustments being categorized as auction, scrap, seconds house, or other. Notes may also be input for an adjustment.

Figure 25B:
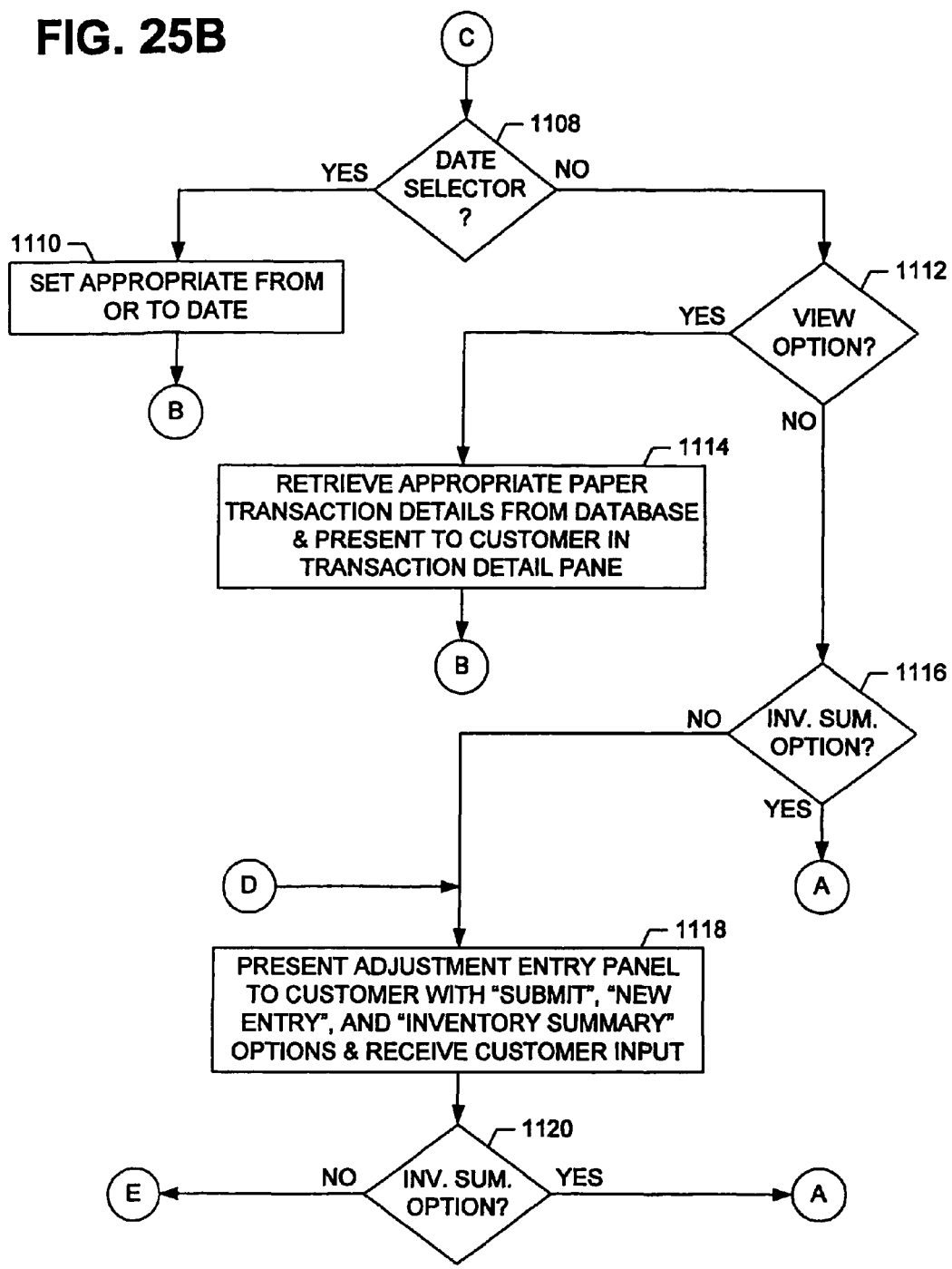
Figure 25C:
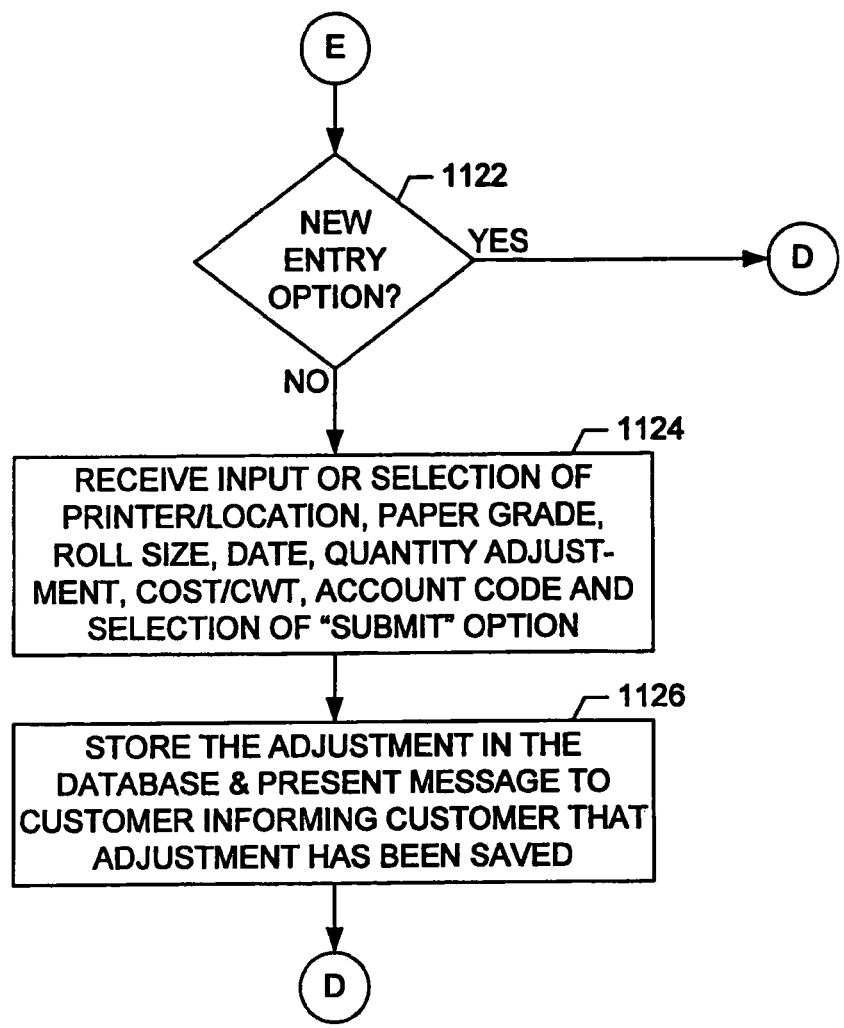

FIGS. 25A, 25B and 25C display a flowchart representation of a method 1100 of the inventory viewer 242 according to the preferred embodiment of the present invention. After starting, the applications server 108, at step 1102, retrieves inventory information from database 200 and presents the inventory information to the customer in an inventory summary by plant pane of the customer manager's web page (see FIG. 26). The inventory information is presented in line item form grouped by printer/location, with each line item corresponding to a paper grade and roll size and including the current inventory level in pounds. Continuing at step 1104, the applications server 108 receives the selection of a paper configuration from the customer and retrieves transaction information for the selected paper configuration from database 200. The applications server 108 presents the transaction information to the customer in a transaction detail pane of the customer manager's web page. The transaction detail pane has from and to date selectors which enable the customer to select from and to dates for viewing of transaction information between desired dates. The transaction detail pane also has "view", "new adjustment entry", and "inventory summary" options.

At step 1106, the applications server 108 receives the selection of a date selector or an option from the customer. The application server 108, at step 1108, determines whether a date selector was selected by the customer and if so, branches to step 1110 where it receives and sets the appropriate from or to date according to the selected date before returning to await input at step 1106. If the applications server determines, at step 1108, that a date selector was not selected by the customer, the applications server 108 advances to step 1112 where it ascertains whether the "view" option was selected by the customer. If the "view" option was selected, the applications server 108 branches to step 1114 where it retrieves appropriate paper transaction details from database 200 and presents them to the customer in the transaction detail pane (see FIG. 27). Then, the applications server 108 returns to step 1106 to await further customer input.

If at step 1112, the applications server 108 ascertains that the "view" option was not selected by the customer, the applications server 108 moves to step 1116 of method 1100 where it decides whether the "inventory summary" option was selected by the customer. If so, the applications server 108 branches back to step 1102 to once again display inventory summary information. If the applications server 108 decides, at step 1116, that the customer did not select the "inventory summary" option, the applications server 108 advances to step 1118 where it presents an adjustment entry panel, of the customer manager's web page to the customer with "submit", "new entry", and "inventory summary" options and receives input from the customer.

At step 1120, the applications server 108 determines whether the customer selected the "inventory summary" option and if so, branches back to step 1102 to again present inventory summary information to the customer. If not, the applications server 108 proceeds to step 1122 where it ascertains whether the customer selected the "new entry" option. If the customer selected the "new entry" option, the applications server 108 loops back to step 1118 to redisplay the adjustment entry panel. If the applications server 108 ascertains, at step 1122, that the customer did not select the "new entry" option, the applications server 108 branches to step 1124 where it receives customer input or selection of a printer/location, paper grade, roll size, date, quantity adjustment, cost/cwt, account code, and selection of the "submit" option (see FIG. 28). Responsive thereto, the applications server 108 stores the adjustment in database 200 and presents a message to the customer informing the customer that the adjustment has been saved. Then, the applications server 108 loops back to step 1118 to await further customer input.

The customer manager's alert configuration module 244 (also sometimes referred to herein as the "alert configurator 244") is selectable for execution from the customer manager web page's dashboard and enables a customer to configure threshold level settings which trigger the generation and display of warnings and urgent alerts by the alert viewer 246 (described below). Warnings and urgent alerts are generated for over consumption of paper, under consumption of paper, days before the L.D.C., and days after the L.D.C. For over consumption, a warning or urgent alert is issued for all publications whose paper consumption (i.e., actual usage) of a paper grade was over the planned estimated usage by the configured percentage. Alternatively, for under consumption, a warning or urgent alert is issued for all publications whose paper consumption of a paper grade was under the planned estimated usage by the configured percentage. Similarly, for days before the L.D.C. a warning or urgent alert is issued for all orders whose L.D.C. date falls before the number of configured days. Alternatively, for days after the L.D.C., a warning or urgent alert is issued for all orders whose L.D.C. date falls after the number configured days.

Figure 29A:
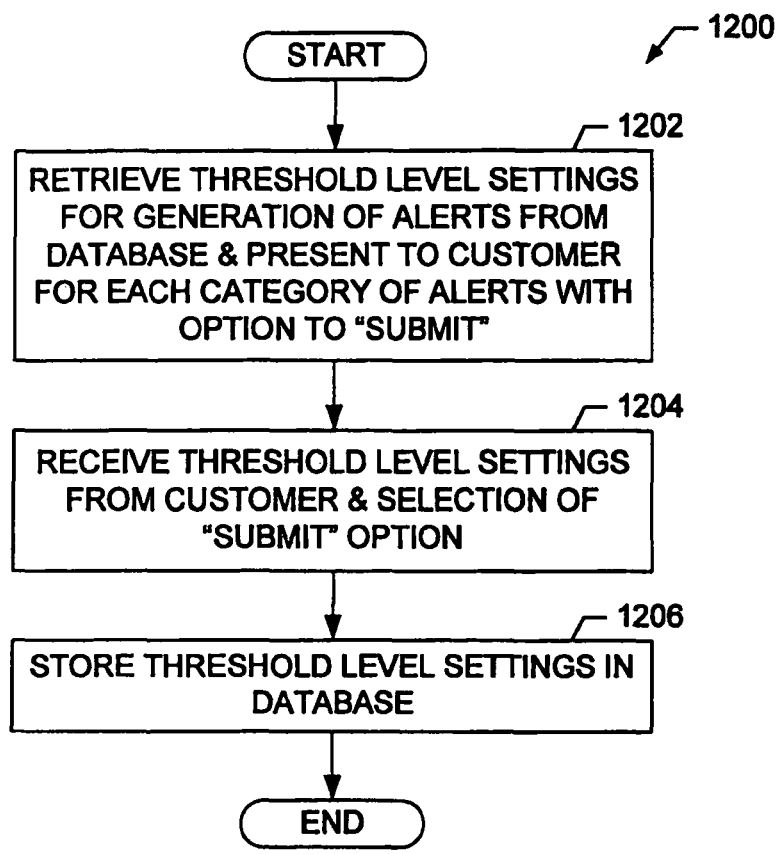
FIG. 29A displays a flowchart representation of an alert configurator method of the system of FIG. 1.
Figure 29B:
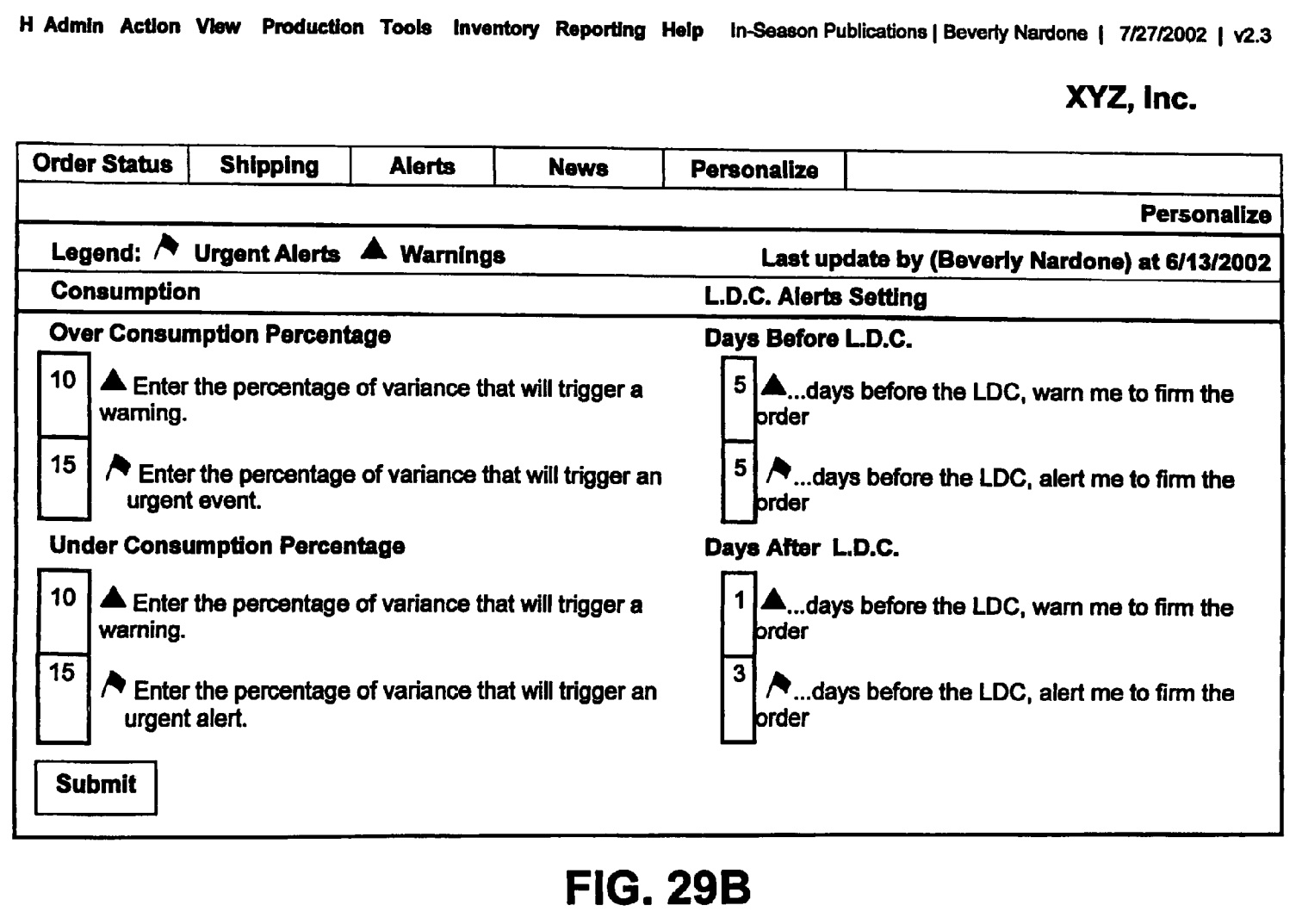

FIG. 29A displays a flowchart representation of a method 1200 of the alert configurator 244 according to the preferred embodiment of the present invention. After starting, the applications server 108, at step 1202, retrieves any existing threshold level settings for the generation of alerts from database 200 and presents them to the customer for each category of alerts with an option to "submit" (see FIG. 29B). Then, at step 1204, the applications server 108 receives threshold level settings from the customer and selection of the "submit" option. Next, at step 1206, the applications server 1206 stores the threshold level settings in database 200 before ending execution according to method 1200.

The customer manager's view alerts module 246 (also sometimes referred to herein as the "alert viewer 246") is selectable for execution from the customer manager web page's dashboard and generates warning and urgent alerts for over consumption of paper, under consumption of paper, days before the L.D.C., and days after the L.D.C. The alert viewer 246 also allows a customer to view and remove alerts.

Figure 30:
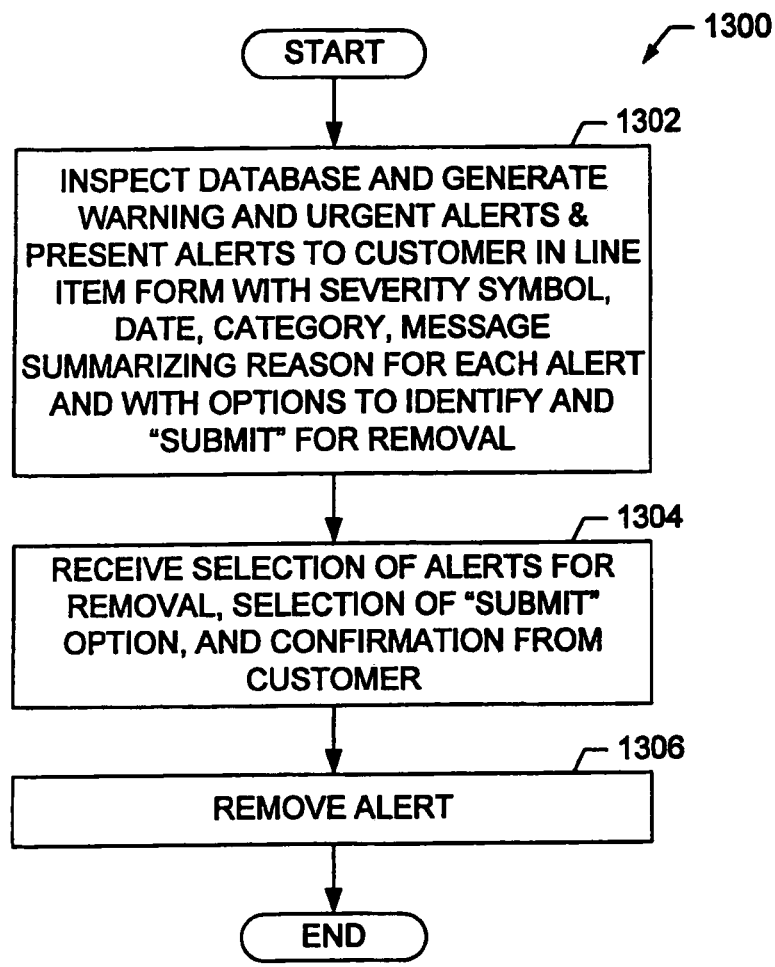
FIG. 30 displays a flowchart representation of an alert viewer method of the system of FIG. 1.

FIG. 30 displays a flowchart representation of a method 1300 of the alert viewer 246 according to the preferred embodiment of the present invention. After starting, the applications server 108, at step 1302, inspects database 200 and generates warning and/or urgent alerts using threshold level settings previously received and stored in database 200 to detect orders where: actual usage of paper for a publication is greater than the estimated usage by a percentage larger than that of the threshold level settings for warning and/or urgent alerts associated with over consumption; actual usage of paper for a publication is less than the estimated usage by a percentage larger than that of the threshold level settings for warning and/or urgent alerts associated with under consumption; the L.D.C. date is prior to the current date by a number of days greater than that of the threshold level settings for warning and/or urgent alerts; and, the L.D.C. date is after the current date by a number of days greater than that of the threshold level settings for warning and/or urgent alerts. Upon detection of such orders, the applications server 108 presents them to the customer in an alert viewer pane of the customer manager's web page (see FIG. 31) with each order being represented as a line item entry having a symbol associated with the severity of the alert (i.e., a warning alert symbol or an urgent alert symbol). Each line item entry also includes the date, category (i.e., consumption or L.D.C.), a message summarizing the reason for the alert, and a selection box for use by the customer in selecting alerts. The alert view pane includes a "submit" option.

Continuing at step 1304, the applications server 108 receives the selection of one or more alerts from the customer for removal and receives selection of the "submit" option. The applications server 108 requests confirmation from the customer that the selected alerts are to be removed and, subsequently, receives such confirmation from the customer. Then, at step 1306, the applications server 108 removes the alert from the alert viewer pane.

The customer manager's recommended order viewing module 248 (also sometimes referred to herein as the "recommended order viewer 248") generates recommended purchase orders for the purchase of paper which should be placed by the customer within the next ninety days based on information (i.e., in order to avoid paper being received by a printer after a paper due date), including, without limitation, order lead times for suppliers, the paper configurations of purchase schedules, demand plan configurations associated in a one-to-one correspondence therewith, paper inventories on hand at printers, pending orders for paper, shipments of paper actually received by printers, actual consumption of paper by printers, the inventory management method used to determine how much paper must be kept on hand at a printer's location, and various other information. The customer may select recommended purchase orders, at the customer's discretion, for conversion into actual purchase orders and placement with suppliers.

Figure 32A:
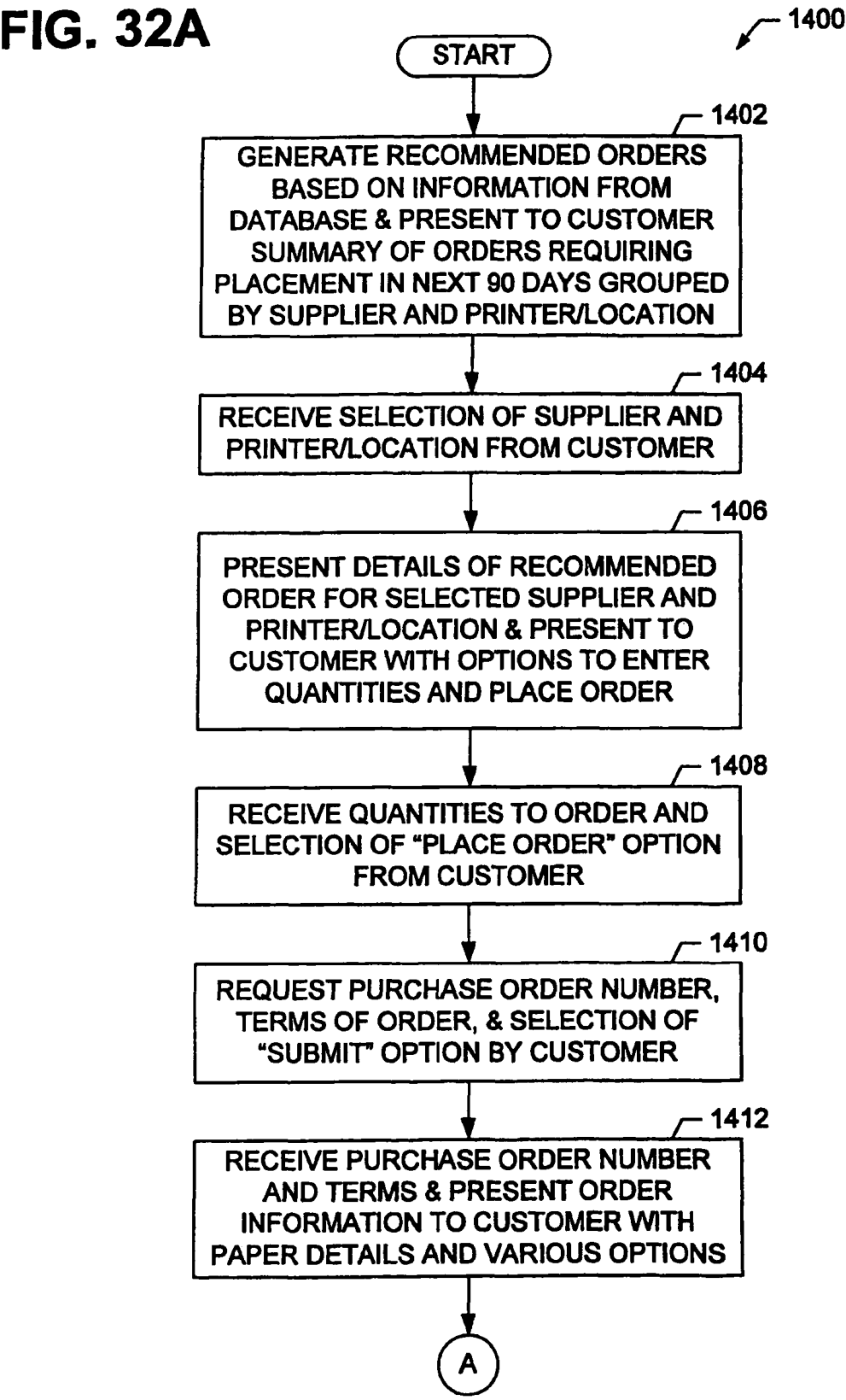
FIGS. 32A and 32B display a flowchart representation of a recommended order viewer of the system of FIG. 1.
Figure 32B:
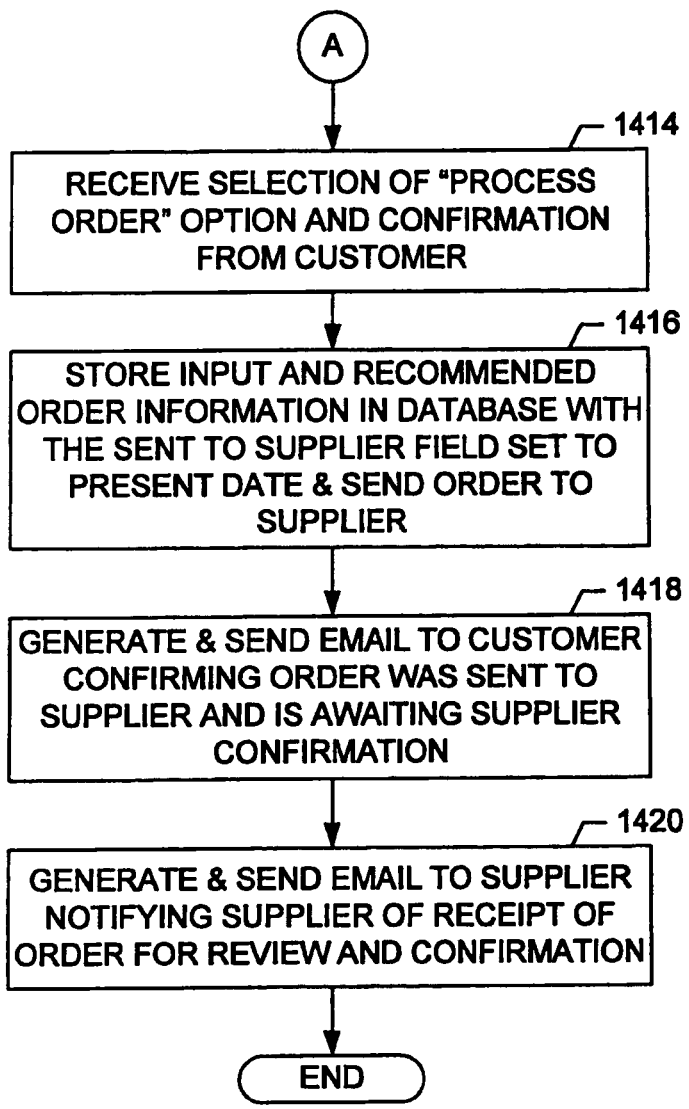

FIGS. 32A and 32B display a flowchart representation of a method 1400 of the recommended order viewer 248 according to the preferred embodiment of the present invention. After starting, the applications server 108, at step 1402, generates recommended purchase orders through execution of the recommended order generator 250 described in more detail below and based upon information previously stored in database 200. Upon completion of the recommended order generation process, the applications server 108 presents the recommended purchase orders to the customer in a line item format in a recommended order summary pane of the customer manager 202 with each line item grouping recommended purchase orders for a particular combination of paper supplier and printer/location (see FIG. 33). Then, at step 1404, the applications server 108 receives a selection of a paper supplier and printer/location combination from the customer. Next, at step 1406, the applications server 108 presents details associated with recommended purchase orders for the selected combination of paper supplier and printer/location with options to enter actual quantities to order and to place orders (see FIG. 34). Such details, preferably, include the paper grade, roll size, actual quantity of paper required, recommended order quantity, paper due date, and number of days left to order the paper if the paper is to be delivered to the printer before the paper due date.

Continuing at step 1408, the applications server 108 receives quantities of paper to order from the customer and selection of the "place order" option. In response, the applications server 108 presents an edit purchase order pane (see FIG. 35) on the customer manager's web page for the receipt of a purchase order number and order terms from the customer at step 1410. Next, at step 1412, the applications server 108 receives a purchase order number and terms from the customer and presents the order's details in an order detail pane (see FIG. 36) on the customer's web page with various options which enable editing of the order and processing of the order. Upon receiving selection of the "process order" option and a confirmation of that selection from the customer at step 1414, the applications server 108, at step 1416, stores the input order quantity, purchase order number, terms, and information of the recommended purchase order as an actual purchase order in database 200 with the actual purchase order's "sent to supplier" field set to the present date, and sends the actual purchase order to the associated supplier. Then, at step 1418, the applications server 108 generates and sends an email to the customer confirming that the order was sent to the supplier and is awaiting supplier confirmation. Next, at step 1420, the applications server 108 generates and sends an email to the supplier notifying the supplier of the supplier's receipt of the purchase order for review and confirmation.

The customer manager's recommended order generation module 250 (also sometimes referred to herein as the "recommended order generator 250") enables the demand planner 238 and recommended order viewer 248 to generate, for each demand plan configuration associated with an active paper configuration, recommended orders on a week-by-week basis that may be converted (i.e., in the case of the recommended order viewer 248) into pre-submitted purchase orders. It should be remembered that each demand plan configuration is associated in one-to one correspondence with a paper configuration of a production schedule. Also, each demand plan configuration includes a minimum level, target level, minimum order quantity, order lead time, an increment in full loads indicator and an order lead time.

Figure 37A:
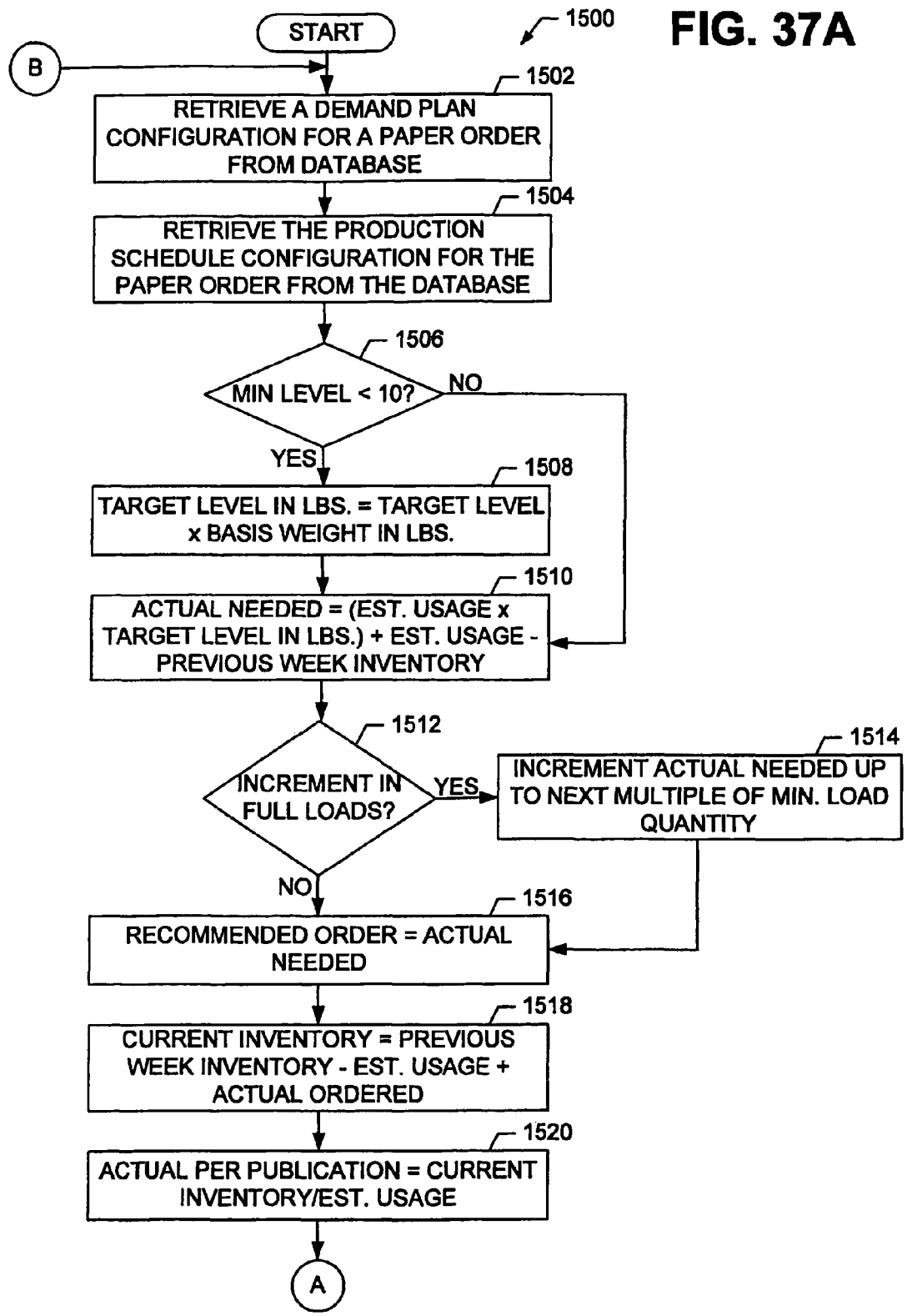
FIGS. 37A and 37B display a flowchart representation of a recommended order generator method of the system of FIG. 1.
Figure 37B:
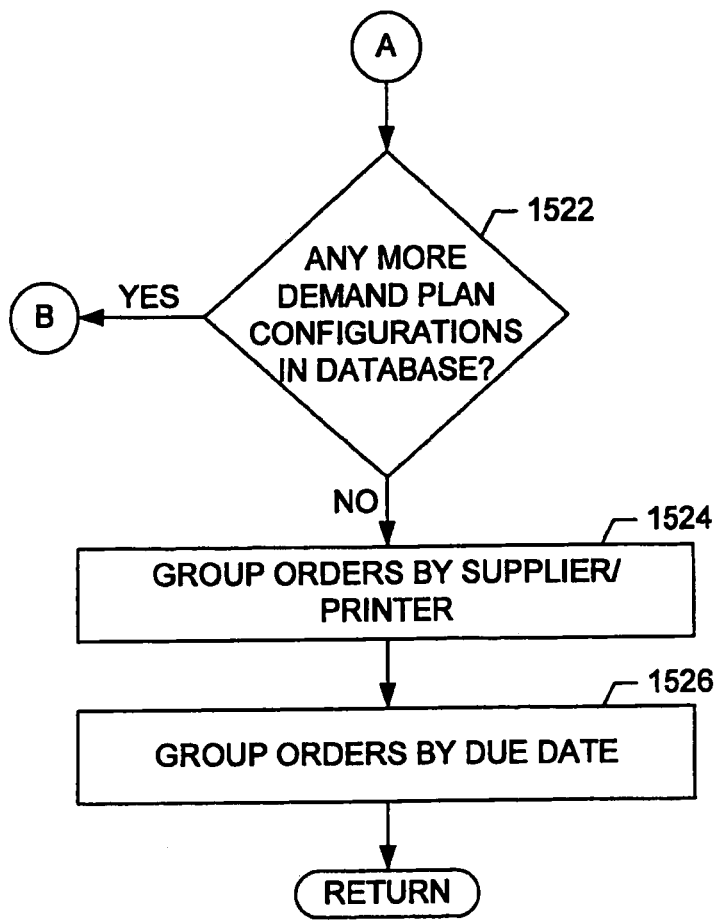

FIGS. 37A and 37B display a flowchart representation of a method 1500 of the recommended order generator 250 according to the preferred embodiments of the present invention. After starting, the applications server 108, at respective steps 1502 and 1504, retrieves demand plan configurations and associated paper configurations from database 200 for a current setting of orders to be placed in "X" number of days (i.e., next 1-5 days, next 5-15 days, next 15-30, next 31-60 next 61-90, after 90 days). Then, at step 1506, if the retrieved minimum level is less than 10. The issue on floor method has been selected for use as the inventory management to be used and, hence, as the target level. Therefore, at step 1508, applications server 108 multiplies the target level, represented in the amount of issues on floor, by the basis weight (i.e., the weight of the paper necessary for one issue) to obtain the target level in pounds. Next, at step 1510, the applications server 108 calculates the actual needed amount of paper by first multiplying the estimated usage by the target level in pounds, then by adding the estimated usage and subtracting the previous week's inventory level. Continuing at step 1512, the applications server 108 decides whether the customer has selected to increment the amount of paper need in full loads. As described above, the increment in full loads indicator determines whether paper quantities must be ordered in multiples of the minimum order quantity. If the increment in full loads indicator is set to "yes", the applications server 108 determines that the actual needed quantity must be rounded up to the next multiple of minimum load quantity. Then, at step 1514, the recommended order quantity will equal the actual needed quantity. If the increment in full loads indicator is set to "no", the applications server 108 continues at step 1516.

Continuing with step 1518, the application server 108 calculates the current week's inventory by subtracting the estimated usage from the previous week's inventory and then adding the actual ordered quantity. At step 1520, the applications server 108 calculates the actual inventory per publication by dividing the current inventory by the estimated usage. The actual per publication quantity must be between the target level and the minimum level for an optimum amount of inventory at the end of a week. If the applications server 108 decides, at step 1522, that there are more demand plan configurations in the database 200, then the applications server 108 loops back to step 1502.

If there are no more demand plan configurations in database 200, the applications server 108 groups the orders with matching supplier/printer combinations for presentation on adjacent line items in a row/column table at step 1524. For example, each row may specify a combination of supplier and printer. At step 1526, the applications server 108 groups the orders by paper due date for presentation in a row/column table. For example, the number of orders that need to be placed are specified in columns such as a past due column representing the "X" number of orders that need to be placed for the current supplier/printer combination that are past due: Other examples of due date columns are "today", "1-5 days", "6-15 days", "16-30 days", "31-60 days", "61-90 days" and all orders that need to be placed within the next 90 days. Next, at step 126, the applications server 108 provides the recommended orders to the recommended order viewer 248 or demand planner 238, as appropriate.

In addition to the plurality of software modules specifically identified and described above with reference to the figures, the customer manager 202 further includes various modules which are accessible to a customer via the customer manager's menu bar and/or dashboard. Once selected by a customer, these additional modules provide additional capabilities and functionality to the customer. These modules comprise: an order viewing module, an in-transit shipment viewing module, and a received shipments viewing module. The order viewing module enables a viewer to review pending orders having order status of pre-submitted, awaiting supplier confirmation, and supplier confirmed by retrieving such orders and their details from database 200 and presenting the retrieved order information to the customer via various panes of the customer manager's web page. The in-transit shipment viewing module allows a customer to review paper shipments which are in-transit between a supplier and a printer by retrieving information related to orders which are in-transit from database 200 and by presenting the retrieved order information to the customer via various panes of the customer manager's web page. The received shipment viewing module enables a customer to review paper shipments which have been received by a printer by retrieving information related to orders which have been received from database 200 and by presenting the retrieved order information to the customer via various panes of the customer manager's web page.

The supplier manager 204 comprises a plurality of software modules, or procedures, having associated methods, when executed by the applications server 108, enable a supplier to perform a number of tasks associated with: confirming purchase orders received from customers; entering and/or editing expected ship dates, L.D.C. dates, and mill order numbers associated with purchase orders; entering and/or editing manifest information associated with purchase orders; monitoring of in-transit and received shipments; and, various other activities related to the receipt of purchase orders and distribution of paper to printers. Such software modules include, preferably, an order confirmation editing module 260, an awaited information editing module 262, and a manifest editing module 264. The various software modules are accessible to and selectable by a supplier upon establishing a session with the supplier manager 204 (i.e., by connecting the world wide web address for the supplier manager 204 and validly logging-in) from the supplier manager's home page (see FIG. 4B) via the page's pull-down menus and dashboard. Once selected by a supplier, the respective methods of the modules are executed by the applications server 108.

The supplier manager's order confirmation editing module 260 (also sometimes referred to herein as the "order confirmation editor 260") enables a supplier to confirm receipt of a purchase order to a customer. Upon the confirmation of a purchase order, the status of the purchase order is updated to "supplier confirmed" to reflect the confirmation. In addition, the date of confirmation is stored in the order's supplier approval field.

Figure 38:
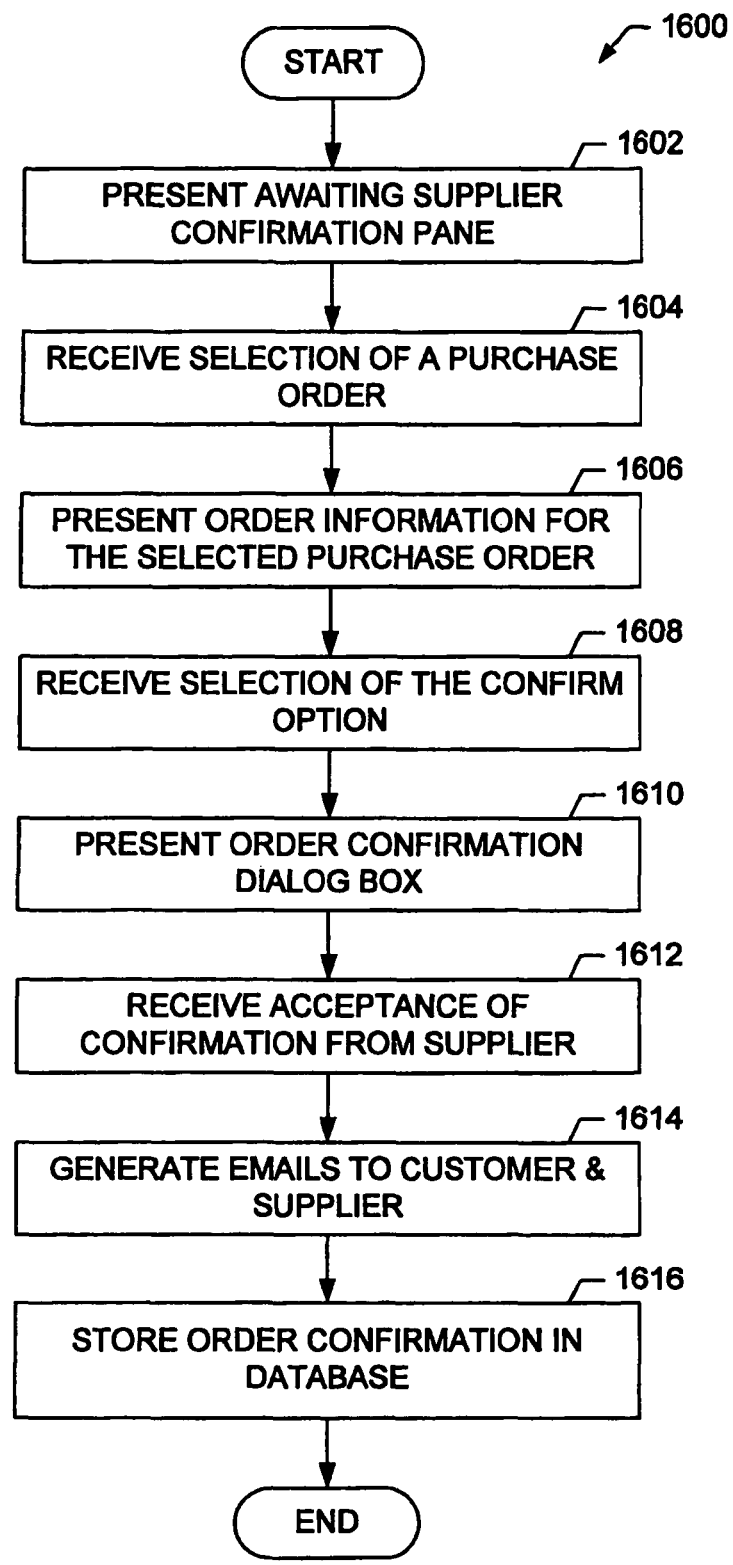
FIG. 38 displays a flowchart representation of an order confirmation editor method of the system of FIG. 1.

FIG. 38 displays a flowchart representation of a method 1600 of the order confirmation editor 260 according to the preferred embodiments of the present invention. After starting, the applications server 108, at step 1602, presents an awaiting supplier confirmation pane on the supplier manager's web page. Purchase orders received by the supplier, but awaiting supplier confirmation are displayed in the pane in a line item manner with each line corresponding to a purchase order. Each line item, preferably, includes the customer's name, the printer's name, the customer's purchase order number, the paper due date, the roll size, the paper grade, and the mill order number. At step 1604, the applications server 108 receives a selection of a purchase order that the supplier desires to confirm. In response, the applications server 108, at step 1606, presents an order information pane in the supplier manager's web page which includes order information for the selected purchase order. The order information includes billing information, skipping information and trading partners, which includes the customer's name and the printer's name. Additionally, the order information includes fields for the customer's purchase order number, the L.D.C. date, the firmed order date, the paper due date and the press date. Paper details include fields for the quantity ordered (in pounds), the quantity shipped (in pounds), paper grade, roll size, stencil, expected ship date, price/cwt, total price, terns, supplier order number, distributor purchase order number, complete date and total number of manifests. The pane has a "submit" option and includes order options to "add notes", "view notes", "confirm order" and "view order transaction". The pane further includes "change" and "supplier order #'s" options.

Continuing at step 1608, the applications server 108 receives a selection for the "confirm" order option from the supplier. Then, at step 1610, the applications server 108 presents an order confirmation dialog box with a dialog message and an "OK" option. For example, the dialog message may be a "confirm this order?" prompt. Next, the applications server 108 receives a selection from the supplier to confirm the order at step 1612 and generates an email to the customer, at step 1614, notifying the customer that the purchase order has been confirmed by the supplier. The applications server 108 also generates an email to the supplier verifying that the confirmation has been sent to the customer. At step 1616, the application server 108 stores the order confirmation to database 200.

The supplier manager's awaited information editing module 262 (also sometimes referred to herein as the "awaited information editor 262") enables a supplier to input or edit an expected ship date, L.D.C. date, or a mill order number for a customer purchase order. FIG. 39 displays a flowchart representation of a method 1700 of the awaited information editor 262 according to the preferred embodiments of the present invention. After starting, the applications server 108, at step 1702, presents an awaiting information pane on the supplier manager's web page. The awaiting information pane includes a line item representation of purchase orders arranged by paper configuration. The pane may include columns presenting the customer name, printer name, customer purchase order number, L.D.C. date, expected ship date, paper due date, roll size, paper grade and supplier order number. Next, at step 1704, the applications server 108 receives a selection of a purchase order from the supplier. The applications server 108 presents the order information associated with the purchase order in an order information pane at step 1706. The order information pane, preferably, includes order information fields including billing information, shipping information and trading partners, which includes fields for customer name and printer name. The order information pane also includes fields for customer purchase order, L.D.C. date, firmed order date, paper due date and press date. The paper details include quantity ordered (in pounds), quantity shipped (in pounds), paper grade, roll size, stencil, expected ship date, price/cwt, total price, terms, supplier order number, distributor purchase order, complete date and total number of manifests. The pane includes a field for receiving a supplier input for the L.D.C. date and a "submit" option. The pane also includes order options to "add notes", "view notes", "confirm order" and "view order transaction". The pane further includes "change", and "supplier order #'s" options.

Continuing at step 1708, if the applications server 108 receives a selection to change the L.D.C. date, the applications server 108 branches to step 1714. If not, then the applications server 108 receives a selection for the "change" option at step 1710. The applications server 108 presents a change item pane at step 1712 which enables the supplier to input an expected ship date, an L.D.C. date, or a mill order number. Next, at step 1714, the applications server 108 receives a change item input, either in the change item pane for the expected ship date or the supplier order number or in the order information pane for the L.D.C. date. Continuing at step 1716, the applications server 108 receives a submit selection and in response thereto, stores the order with input or edited information in database 200. The applications server 108 presents an order information updated pane to confirm the information edit at step 1718. Then, at step 1720, the applications server 108 generates a customer email notification to inform the customer of the information edit substantially simultaneously with the confirmation.

The supplier manager's manifest editing module 264 (also sometimes referred to herein as the "manifest editor 264") enables a supplier to add a new manifest and manifest detail to a purchase order. The manifest editor is used to retrieve, review and add manifest information to an existing purchase order that has been confirmed. Manifest information includes the date shipped, bill of lading and transportation mode.

Figure 40A:
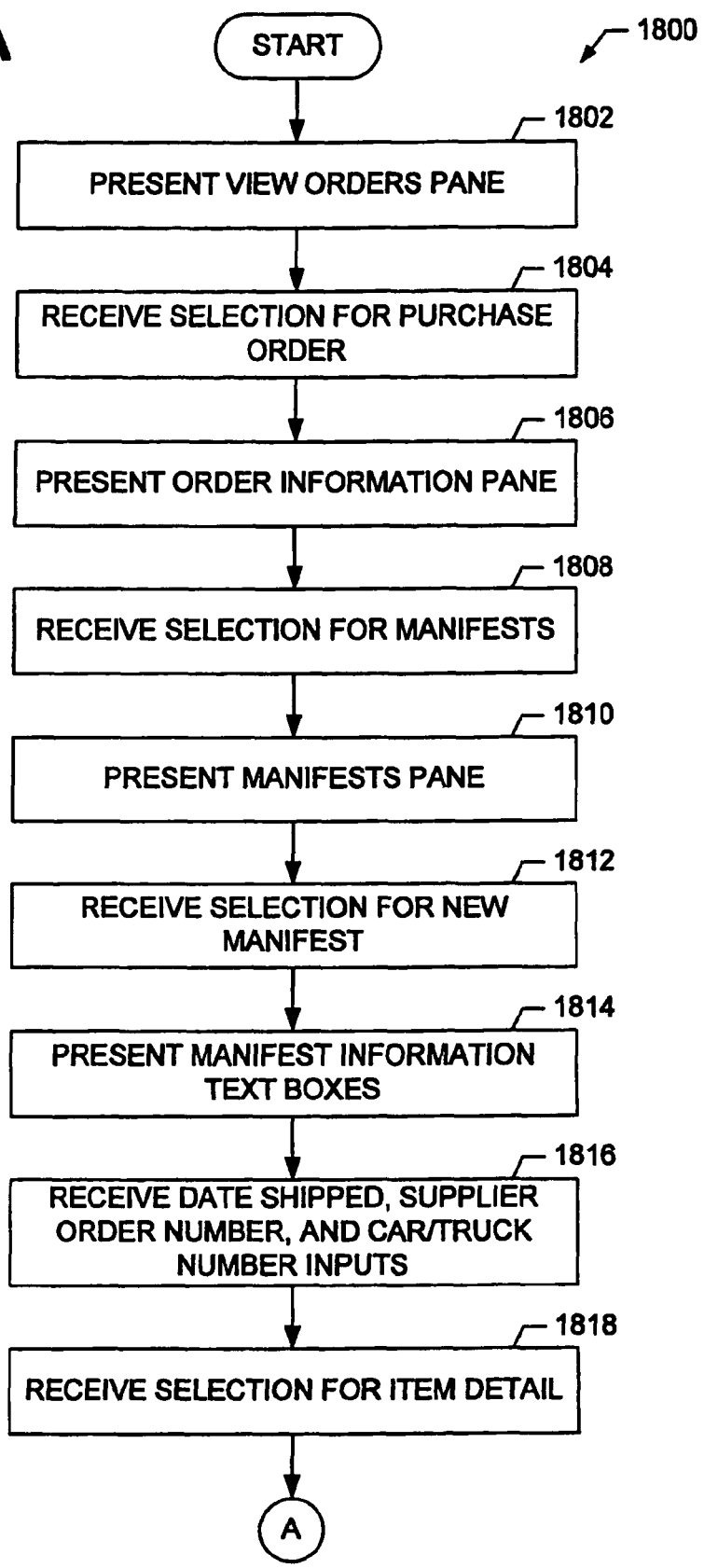
FIGS. 40A and 40B display a flowchart representation of a manifest editor method of the system of FIG. 1.
Figure 40B:
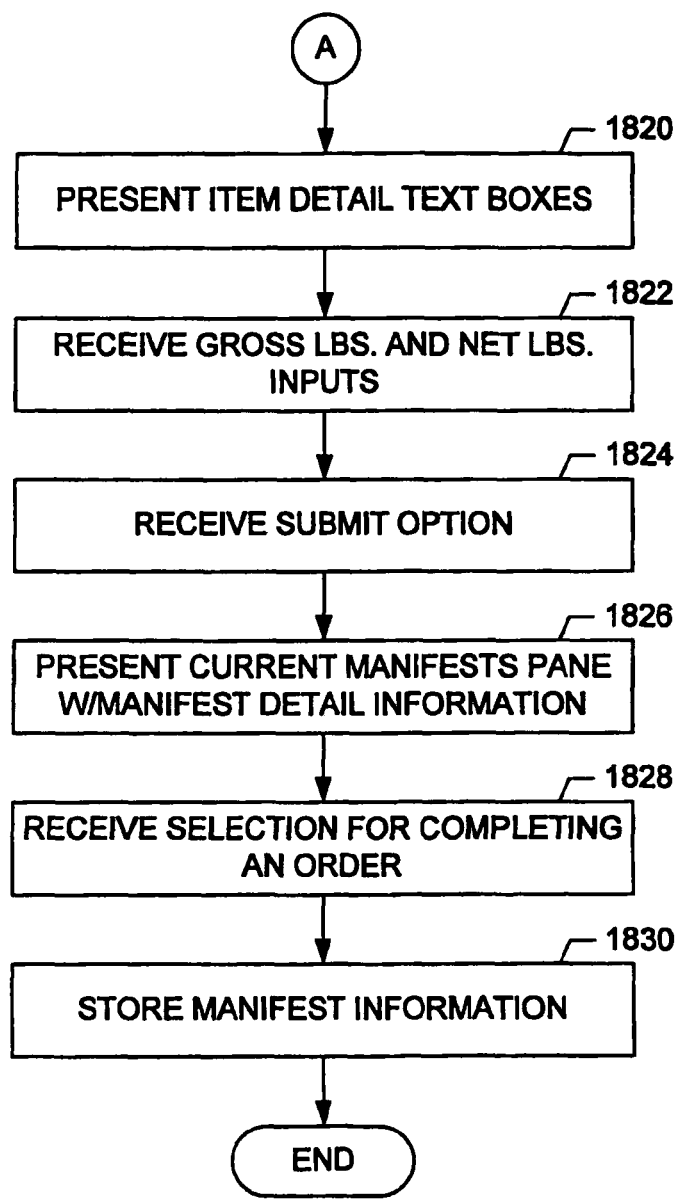

FIGS. 40A and 40B display a flowchart representation of a method 1800 of the manifest editor 264 according to the preferred embodiments of the present invention. After starting, the applications server 108, at step 1802, presents a viewing supplier confirmed orders pane on the supplier manager's web page. The viewing supplier confirmed orders pane presents a line item representation of the supplier confirmed orders arranged by customer and printer combination. The viewing supplier confirmed orders pane includes columns representing the customer, printer, customer purchase order, L.D.C. date, expected ship date, paper due date, roll size, paper grade and supplier order number. Next, at step 1802, the applications server 108 receives a selection of a purchase order in the pane from the supplier. In response, the applications server 108 presents the order information pane at step 1804. The order information pane includes order information fields including billing information, shipping information and trading partners, which includes fields for customer name and printer name. The order information includes fields for customer purchase order, L.D.C. date, firmed order date, paper due date and press date. The paper details include quantity ordered (in pounds), quantity shipped (in pounds), paper grade, roll size, stencil, expected ship date, price/cwt, total price, terms, supplier order number, distributor purchase order, complete date and total number of manifests. The pane also has a field for receiving a supplier input for L.D.C. date and a "submit" option. The pane also includes order options to "add notes" and "view order transaction". The pane further includes "change", "manifest" and "supplier order #'s" options.

Continuing at step 1806, the applications server 108 receives a selection for the "manifest" option. Then, at step 1810, the applications server 108 presents the manifests pane. The manifests pane includes fields for the receipt of supplier input for date ready, date shipped, date received, shipped from, bill of lading, transportation mode, car/truck number, route, supplier order number, and active status. The pane also includes "void", and "new manifest" options and a "complete" check box for each line item.

The applications server 108 receives a selection for new manifest at step 1810. At step 1812, the applications server 108 presents manifest information textboxes to the supplier. The manifest information textboxes include fields for receiving a supplier input for the date shipped, supplier order number and the car/truck number. The textboxes also include an "item detail" option. Then, at step 1814, the applications server 108 receives date shipped, supplier order number and car/truck number inputs. At step 1816, the applications server 108 receives a selection for the item detail option. The applications server 108 presents the item detail text boxes at step 1818. The item detail textboxes include fields for receiving a supplier input including gross lbs. and net lbs. At step 1820, the application server 108 receives gross lbs. and net lbs. inputs from the supplier. At step 1822, the application server 108 receives the "submit" option from the supplier. Then, at step 1824, the application server 108 presents the current manifest pane with the submitted manifest detail information. At step 1826, the application server 108 receives a selection of the complete checkbox for completing the manifest edits. In response, the application server 108 stores the manifest information in database 200.

The printer manager 206 comprises a plurality of software modules, or procedures, having associated methods, when executed by the applications server 108, enable a printer to perform a number of tasks associated with: receiving shipments of paper from suppliers, and entering and/or editing actual usages of paper and the dates of such usage. Such software modules include, preferably, a shipment receiving module 280, and a paper usage editing module 282. The various software modules are accessible to and selectable by a printer upon establishing a session with the printer manager 206 (i.e., by connecting the world wide web address for the printer manager 206 and validly logging-in) from the printer manager's home page (see FIG. 4C) via the page's pull-down menus and dashboard. Once selected by a printer, the respective methods of the modules are executed by the applications server 108.

The printer manager's shipment receiving module 280 (also sometimes referred to herein as the "shipment receiver 280") enables a printer to receive shipments, and to retrieve and review information on in-transit shipments. In-transit shipments may be sorted by customer, supplier, customer purchase order, date shipped, paper due date, roll size, paper grade, gross pounds, net pounds, bill of lading, car/truck number, or transportation mode to provide the printer with improved access capabilities.

Figure 41:
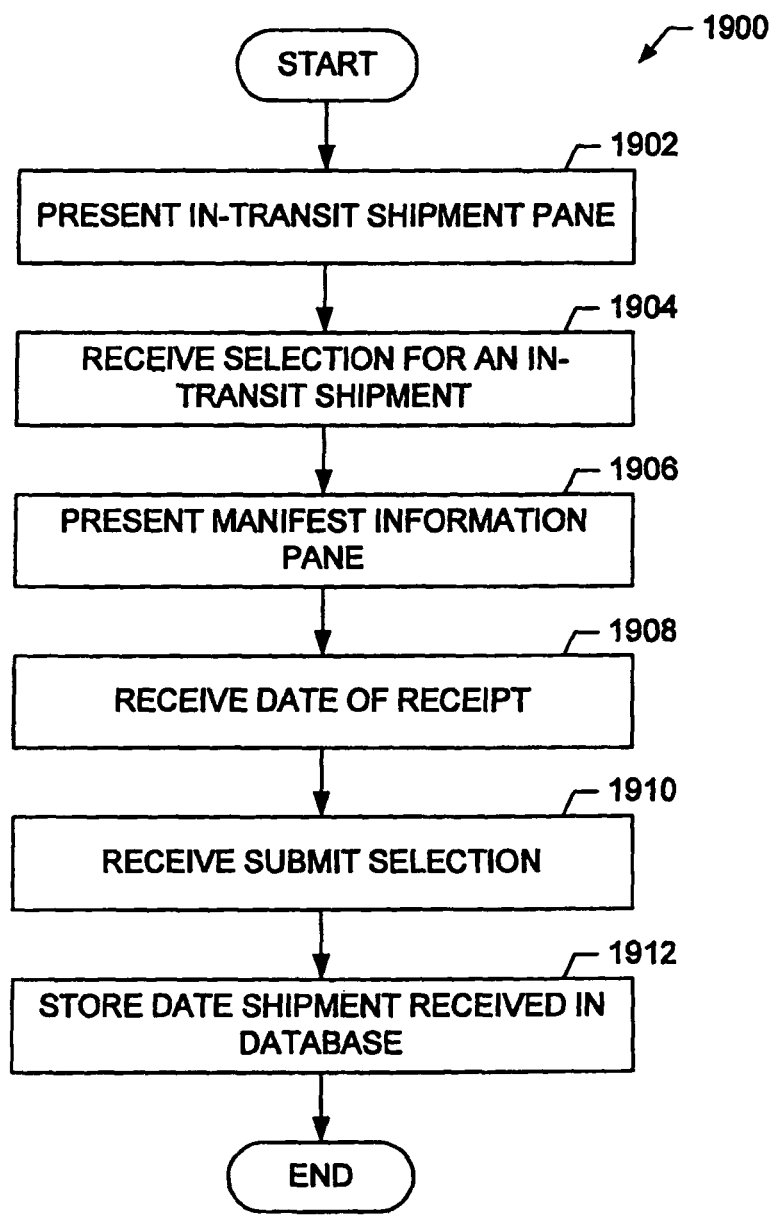
FIG. 41 displays a flowchart representation of a shipment receiver method of the system of FIG. 1.

FIG. 41 displays a flowchart representation of a method 1900 of the shipment receiver 280 according to the preferred embodiment of the present invention. After starting, the applications server 108, at step 1902, presents an in-transit shipments pane in the printer web page. The in-transit shipments pane includes in-transit shipments in line item format with each line including, preferably, the customer name, the customer purchase order, date shipped, paper due, paper grade, roll size, gross weight (in pounds), net weight (in pounds), bill of lading, stencil, car/truck number, and transportation mode. At step 1904, the applications server 108 receives a selection for an in-transit shipment from the printer. In response, the applications server 108 presents a manifest information pane at step 1906. The manifest information pane, preferably, includes: ship to, supplier, and customer fields; and, transportation information including fields for shipped from (location), bill of lading, shipment complete, route, transportation mode and car/truck number. The manifest information pane also includes shipping details with fields for unit ID, pack type, units, lineal (feet), gross (pounds) and net (pounds). The pane also includes a manifest option field that includes a field for the receipt of printer input of a date of receipt. The pane also includes a "submit" option.

Continuing at step 1908, the applications server 108 receives a date of receipt input by the supplier. At step 1910, the applications server 108 receives selection of the "submit" option from the supplier to receive the shipment. Then, at step 1912, the applications server 108 stores the date of receipt of the shipment in database 200.

The printer manager's paper usage editing module 282 (also referred to herein as the "paper usage editor 282") enables a printer to enter actual paper usage information, including actual usage and the actual usage date, into database 200 for each completed order. The paper usage editor 282 may also issue alerts if actual usage figures result in an over or under consumption of a paper grade.

FIG. 42 displays a flowchart representation of a method 2000 of the paper usage editor 282 according to the preferred embodiment of the present invention. After starting, the applications server 108, at step 2002, presents the paper usage editor pane to the printer. The paper usage editor pane includes a list of print jobs presented in line item format by publication, paper due date, press date, issue, roll size, paper grade, and estimated usage. The applications server 108 receives a selection, at step 2004, of a job from the list. In response, the applications server 108 presents an actual pane at step 2006. The actual usage pane includes fields for issue date, publication, estimated usage and contractual usage. The pane also includes fields for inputs of actual usage and actual usage date, as well as "add" and "cancel" options. Continuing at step 2008, the applications server 108 receives an actual usage input from the printer. At step 2010, the applications server 108 receives an actual usage date from the printer. Next, the applications server 108 receives the selection of the "add" option from the printer at step 2012 and, in response thereto, stores the actual usage and actual usage date in database 200 at step 2014. At step 2016, the applications server 108 determines whether the actual usage received was over or under the estimated usage amount by a specific percentage designated by the customer via the customer manager 202. If so, the applications server 108 presents an alert to the printer at step 2018. If the actual usage received was not over/under the estimated usage amount by the specific percentage, the applications server 108 ends operation according to method 2000.

Whereas this invention has been described in detail with particular reference to a preferred embodiment, it is understood that variations and modifications can be effected within the spirit and scope of the invention, as described herein before and as defined in the appended claims. The corresponding structures, materials, acts, and equivalents of all means or step plus function elements, if any, in the claims below are intended to include any structure, material, or acts for performing the functions in combination with other claimed elements as specifically claimed.

What is claimed is:

1. A system for managing multiparty, multilevel production and distribution of paper inventory comprising:
    a host server operable for data communication via a communication network,
    wherein said host server is configured to receive from said communication network input data related to one or more printing tasks and input data related to paper for use in completing said one or more printing tasks, and
    wherein said host server is configured, based at least in part upon said input data, to determine an estimate of a quantity of said paper to order for completing said one or more printing tasks.

2. The system according to claim 1, wherein said one or more printing tasks comprise supplying an issue of a printed publication.

3. The system according to claim 2, wherein said input data related to said issue of said printed publication includes at least one parameter representative of a total surface area of said paper required for said issue of said printed publication.

4. The system according to claim 3, wherein said input data includes a number of pages of said paper in said issue of said printed publication.

5. The system according to claim 3, wherein said input data includes a circulation of said issue of said printed publication.

6. The system according to claim 3, wherein said input data includes a page size of pages of said paper in said issue of said printed publication.

7. The system according to claim 3, wherein said input data includes a basis weight of said paper.

8. The system according to claim 2, wherein said input data related to said paper for use in supplying said issue of said printed publication includes at least one parameter representative of a physical characteristic of said paper.

9. The system according to claim 8, wherein said input data includes a basis weight of said paper.

10. The system according to claim 1, wherein said host server is configured to determine, based at least in part upon said input data, an initial estimate of a quantity of said paper to order and to increase said initial estimate to account for waste.

11. The system according to claim 10, wherein said host server is further configured to receive from said communication network a waste factor for use in increasing said initial estimate to account for waste.

12. The system according to claim 1, wherein said communication network comprises the Internet.

13. The system according to claim 1,
    wherein said host server is configured to receive from said communication network input data representing a request that said estimate be rounded, and
    wherein said host server is configured to round said estimate in response to said request.

14. The system according to claim 2, wherein said host server is configured to generate a production schedule for said printed publication.

15. The system according to claim 14, wherein said host server is configured to receive from said communication network a specification of said paper for said production schedule.

16. The system according to claim 15,
    wherein said host server is configured to receive from said communications network input data representing a request that said estimate be included for said paper in said specification, and
    wherein said host server is configured to include said estimate for said paper in said specification.

17. The system according to claim 15, wherein said host server is configured to automatically generate an order for said paper from said specification.

18. The system according to claim 17, wherein said host server is configured to communicate an electronic mail message via said communication network corresponding to the generation of said order for said paper.

19. The system according to claim 14, wherein said host server is configured to enable monitoring of shipping of said paper.

20. A method for managing multiparty, multilevel production and distribution of paper inventory comprising:
    receiving, at a host server, input data related to one or more printing tasks from a communications network;
    receiving, at the host server, input data related to a paper for use in completing the one or more printing tasks from the communications network;
    determining, based at least in part upon the input data, an estimate of a quantity of the paper to order for completing the one or more printing tasks.

* * * * *